US012563167B2

(12) United States Patent
Dallal et al.

(10) Patent No.: US 12,563,167 B2
(45) Date of Patent: Feb. 24, 2026

(54) COMPANION DEVICE ASSISTED MULTI-VIEW VIDEO CODING

(71) Applicant: QUALCOMM Incorporated, San Diego, CA (US)

(72) Inventors: Yehonatan Dallal, Kfar Saba (IL); Gideon Shlomo Kutz, Ramat Hasharon (IL); Shay Landis, Hod Hasharon (IL); Idan Michael Horn, Hod Hasharon (IL)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/306,136

(22) Filed: Apr. 24, 2023

(65) Prior Publication Data
US 2024/0357070 A1 Oct. 24, 2024

(51) Int. Cl.
*H04N 13/194* (2018.01)
*H04N 13/122* (2018.01)
(Continued)

(52) U.S. Cl.
CPC ......... *H04N 13/194* (2018.05); *H04N 13/122* (2018.05); *H04N 13/128* (2018.05);
(Continued)

(58) Field of Classification Search
CPC ... H04N 13/122; H04N 13/128; H04N 13/194
See application file for complete search history.

(56) References Cited

U.S. PATENT DOCUMENTS 6,560,370 B2 5/2003 Ribas-Corbera et al.
6,667,698 B2 12/2003 Apostolopoulos et al.
(Continued)

FOREIGN PATENT DOCUMENTS

EP 2737699 B1 * 10/2018 ........... H04N 19/136
EP 2172901 B1 6/2019
(Continued)

OTHER PUBLICATIONS

C. Goektug Guerler, K. Tolga Bagci, & A. Murat Tekalp, "Adaptive Stereoscopic 3D Video Streaming", 17 Proc. of IEEE Int'l Conf. on Image Processing 2409--2412 (Sep. 2010) (Year: 2010).*
(Continued)

*Primary Examiner* — David N Werner
(74) *Attorney, Agent, or Firm* — Shumaker & Sieffert, P.A.

(57) ABSTRACT
A device is configured obtain a first set of multiview pictures, wherein the first set of multiview pictures includes first pictures and second pictures, the first pictures being from a first viewpoint and the second pictures being from a second viewpoint; transmit first encoded video data to a receiving device, wherein the first encoded video data is based on the first set of multiview pictures; receive multiview encoding cues from the receiving device; obtain a second set of multiview pictures of the video data, wherein the second set of multiview pictures includes third pictures and fourth pictures, the third pictures being from the first viewpoint and the fourth pictures being from the second viewpoint; perform, based on the multiview encoding cues, a multiview encoding process on the second set of multiview pictures to generate second encoded video data; and transmit the second encoded video data to the receiving device.

20 Claims, 27 Drawing Sheets

(51) Int. Cl.

| | |
|---|---|
| *H04N 13/128* | (2018.01) |
| *H04N 13/332* | (2018.01) |
| *H04N 19/597* | (2014.01) |
| *H04N 13/20* | (2018.01) |
| *H04N 13/30* | (2018.01) |
| *H04N 13/366* | (2018.01) |

(52) U.S. Cl.

CPC ......... *H04N 13/332* (2018.05); *H04N 19/597* (2014.11); *H04N 13/20* (2018.05); *H04N 13/30* (2018.05); *H04N 13/366* (2018.05)

(56) References Cited

U.S. PATENT DOCUMENTS

| | | | |
|---|---|---|---|
| 6,850,571 | B2 | 2/2005 | Tardif |
| 9,014,499 | B2 | 4/2015 | Rane et al. |
| 11,431,962 | B2 | 8/2022 | Berliner |
| 11,457,224 | B2 | 9/2022 | Budilovsky |
| 11,553,184 | B2 | 1/2023 | Budilovsky et al. |
| 2002/0116184 | A1 | 8/2002 | Gottsman et al. |
| 2002/0186783 | A1 | 12/2002 | Opas et al. |
| 2004/0203708 | A1 | 10/2004 | Khan et al. |
| 2005/0157794 | A1 | 7/2005 | Kim et al. |
| 2006/0020560 | A1 | 1/2006 | Rodriguez et al. |
| 2007/0098063 | A1 | 5/2007 | Reznic et al. |
| 2009/0238269 | A1* | 9/2009 | Pandit .................. H04N 19/176 375/E7.243 |
| 2009/0245372 | A1 | 10/2009 | Yamasaki |
| 2009/0262835 | A1 | 10/2009 | Srinivasan et al. |
| 2009/0281811 | A1 | 11/2009 | Oshikiri et al. |
| 2010/0111198 | A1 | 5/2010 | Lakus-Becker et al. |
| 2010/0239003 | A1 | 9/2010 | Lakus-Becker et al. |
| 2010/0241924 | A1 | 9/2010 | Nishi |
| 2011/0316984 | A1* | 12/2011 | Akeley ............... H04N 13/128 348/51 |
| 2012/0147140 | A1 | 6/2012 | Itakura et al. |
| 2013/0002816 | A1* | 1/2013 | Hannuksela ........... H04N 19/14 348/43 |
| 2013/0044183 | A1 | 2/2013 | Jeon et al. |
| 2014/0078249 | A1* | 3/2014 | Wang ..................... H04N 19/70 348/43 |
| 2014/0153660 | A1 | 6/2014 | Vaman |
| 2014/0252236 | A1* | 9/2014 | Cottrell .................... G01C 3/04 250/341.8 |
| 2015/0009410 | A1 | 1/2015 | Ikushima et al. |
| 2015/0043656 | A1* | 2/2015 | Choi ..................... H04N 19/46 375/240.26 |
| 2015/0117516 | A1 | 4/2015 | Bracha et al. |
| 2015/0117526 | A1* | 4/2015 | Choi ..................... H04N 19/30 375/240.12 |
| 2016/0026253 | A1* | 1/2016 | Bradski ............... H04N 13/128 345/8 |
| 2018/0035134 | A1 | 2/2018 | Pang et al. |
| 2018/0098069 | A1 | 4/2018 | Ueki et al. |
| 2018/0152205 | A1 | 5/2018 | Kim et al. |
| 2018/0270464 | A1* | 9/2018 | Harviainen .......... H04N 13/344 |
| 2019/0110041 | A1 | 4/2019 | Cole et al. |
| 2019/0141316 | A1 | 5/2019 | Lan et al. |
| 2019/0158815 | A1 | 5/2019 | He et al. |
| 2019/0305868 | A1 | 10/2019 | Myung et al. |
| 2019/0320157 | A1* | 10/2019 | Hwang ................ H04N 13/178 |
| 2019/0372822 | A1 | 12/2019 | Woodsum |
| 2020/0014904 | A1* | 1/2020 | Wetzstein ............ H04N 7/0117 |
| 2020/0296350 | A1 | 9/2020 | Oh |
| 2020/0313744 | A1 | 10/2020 | Hindy et al. |
| 2021/0194559 | A1 | 6/2021 | Li et al. |
| 2021/0321072 | A1* | 10/2021 | Oh ........................ H04N 13/194 |
| 2021/0385423 | A1 | 12/2021 | Oh et al. |
| 2022/0060732 | A1* | 2/2022 | Wang .................... H04N 19/423 |
| 2022/0150543 | A1* | 5/2022 | Fleureau .............. H04N 19/162 |
| 2022/0159228 | A1 | 5/2022 | Schwarz et al. |
| 2022/0279204 | A1 | 9/2022 | Malayath et al. |
| 2022/0345756 | A1 | 10/2022 | Kroon et al. |
| 2023/0090317 | A1 | 3/2023 | Kyung et al. |
| 2023/0097425 | A1* | 3/2023 | Choi ...................... H04N 19/88 375/240.26 |

FOREIGN PATENT DOCUMENTS

| | | | | |
|---|---|---|---|---|
| KR | 100795482 B1 * | 1/2008 | ............. H04N 19/13 |
| WO | 9113506 A1 | 9/1991 | |
| WO | 03063505 A1 | 7/2003 | |
| WO | 2018169923 A1 | 9/2018 | |
| WO | 2019218269 A1 | 11/2019 | |
| WO | WO-2022246999 A1 * | 12/2022 | ........... H04N 19/597 |

OTHER PUBLICATIONS

J.R. Ohm, K. Grueneberg, E. Hendriks, M. Ebroul Izquierdo, D. Kalivas, M. Karl, D. Papadimatos, & A. Redert, "A realtime hardware system for stereoscopic videoconferencing with viewpoint adaptation", 14 Signal Processing: Image Communication 147--171 (Nov. 1998) (Year: 1998).*

Alvarado A., "On Bit-Interleaved Coded Modulation with QAM Constellations", Department of Signals and Systems Communication Systems Group Chalmers University of Technology Goteborg, Sweden 2008, 52 Pages.

Co-pending U.S. Appl. No. 18/306,131, inventor Berger; Peer, filed Apr. 24, 2023.

Co-pending U.S. Appl. No. 18/306,142, inventor Berger; Peer, filed Apr. 24, 2023.

ITU-T H.264, Series H: Audiovisual and Multimedia Systems, Infrastructure of Audiovisual Services—Coding of Moving Video, Advanced Video Coding for Generic Audiovisual Services, The International Telecommunication Union, Jun. 2011, 674 Pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Jakubczak S., et al., "A Cross-Layer Design for Scalable Mobile Video", ACM 2012 Conference on Computer Supported Cooperative Work Companion, Cscw'12, ACM, USA, Sep. 19, 2011 (Sep. 19, 2011), pp. 289-300, XP058600591, DOI: 10.1145/2030613. 2030646, ISBN: 978-1-4503-1051-2.

Morvan Y., "Acquisition, Compression and Rendering of Depth and Texture for Multi-View Video", 2009, 220 Pages.

Tan B., et al., "An Optimal Resource Allocation for Superposition Coding-Based Hybrid Digital-Analog System", IEE Internet of Things Journal, vol. 4, No. 4, Aug. 2017, pp. 945-956, XP055413227,DOI: 10.11 09/JIOT.2017.2680407.

Bock A.M., "MPEG Decoders and Post-processing" In: "Video Compression Systems—From First Principles to Concatenated Codecs", Jul. 2, 2009, Institution of Engineering & Technology, XP093188265, pp. 159-167, Section 11.4.

Borchert S., et al., "On Extrapolating Side Information in Distributed Video Coding (Abstract)", 26. Picture Coding Symposium, Nov. 7, 2007-Nov. 9, 2007, Lisbon, Nov. 7, 2007, 4 Pages, XP030080455, The whole document.

Co-pending U.S. Appl. No. 18/640,692, inventors Amit; Bar-Or Tillinger et al., filed Apr. 19, 2024.

Co-pending U.S. Appl. No. 18/643,550, filed Apr. 23, 2024.

Dalai M., et al., "Video Compression for Camera Networks: a Distributed Approach", Department of Electronics for Automation, Oct. 2, 2008, 31 Pages.

Mizuochi T., et al., "Forward Error Correction" In: "High Spectral Density Optical Communication Technologies", Jan. 1, 2010, Springer Berlin Heidelberg, XP093189121, pp. 303-333, Section 17.4, The 3rd and 4th paragraphs.

Morbee M., et al., "Rate Allocation Algorithm for Pixel-Domain Distributed Video Coding Without Feedback Channel", 2007 IEEE

(56)  References Cited

OTHER PUBLICATIONS

International Conference on Acoustics, Speech and Signal Processing, Piscataway, NJ, USA, Apr. 15, 2007, pp. I-521-I-524, XP031462913, abstract Section 1, Section 2, Section 3.

Skorupa J., et al., "Efficient Low-Delay Distributed Video Coding", IEEE Transactions on Circuits and Systems for Video Technology, IEEE, USA, vol. 22, No. 4, Apr. 1, 2012, pp. 530-544, XP011440418, The whole document.

Slowack J., et al "Distributed Video Coding With Feedback Channel Constraints", IEEE Transactions on Circuits and Systems for Video Technology, IEEE, USA, vol. 22, No. 7, Jul. 1, 2012, pp. 1014-1026, XP011449341, The whole document.

Tsai D-C., et al., "Dynamic Key Block Decision with Spatio-Temporal Analysis for Wyner-Ziv Video Coding", 2007 IEEE International Conference on Image Processing, Jan. 1, 2007, pp. VI-425-VI-428, XP093189057, abstract, sections 1-3.

Verbist F., et al., "Transform-Domain Wyner-Ziv Video Coding for 1K-Pixel Visual Sensors", 2013 Seventh International Conference on Distributed Smart Cameras (ICDSC), IEEE, Oct. 29, 2013, 6 pages, XP032580817, The whole document.

Wong K-W., et al., "An Efficient Low Bit-Rate Video-Coding Algorithm Focusing on Moving Regions", IEEE Transactions on Circuits and Systems for Video Technology, IEEE, USA, vol. 11, No. 10, Oct. 1, 2001, XP001102706, pp. 1128-1134, Section II.

Kubasov D., et al., "A Hybrid Encoder/Decoder Rate Control for Wyner-Ziv Video Coding with a Feedback Channel", Multimedia Signal Processing, MMSP 2007, IEEE 9th Workshop on, IEEE, Piscataway, NJ, USA, Oct. 1, 2007, pp. 251-254, XP031197824, the whole document.

International Search Report and Written Opinion—PCT/US2024/021712—ISA/EPO—Aug. 13, 2024.

Lee S-C., et al., "Toward Enhancing the Distributed Video Coder Under a Multiview Video Codec Framework", Journal of Electronic Imaging, SPIE—International Society for Optical Engineering, US, vol. 25, No. 6, Nov. 1, 2016, p. 63022, XP060082754, Abstract, Section I, pp. 1-20.

Yaqoob A., et al., "A Survey on Adaptive 360° Video Streaming: Solutions, Challenges and Opportunities", IEEE Communications Surveys & Tutorials, IEEE, USA, vol. 22, No. 4, Jul. 3, 2020, pp. 2801-2838, XP011821402, Section I, Figure 1.

Zhang L., et al., "3D-HEVC Test Model 5", 5. JCT-3V Meeting, AT, Jul. 27, 2013-Aug. 2, 2013, Vienna, The Joint Collaborative Team on 3D Video Coding Extension Development of ISO/IEC JTC 1/SC 29/WG 11 And ITU-T SG. 16 WP3, No. JCT3V-E1005, Sep. 14, 2013, pp. 1-50, XP030131385, Sections 2.2.2.2 and 2.2.5, pp. 1-50.

* cited by examiner

400

OBTAIN VIDEO DATA

402

PERFORM VIDEO ENCODING
TO GENERATE ENCODED
VIDEO DATA

404

PERFORM CHANNEL
ENCODING TO GENERATE
ERROR CORRECTION DATA

406

TRANSMIT ENCODED VIDEO
DATA AND ERROR
CORRECTION DATA

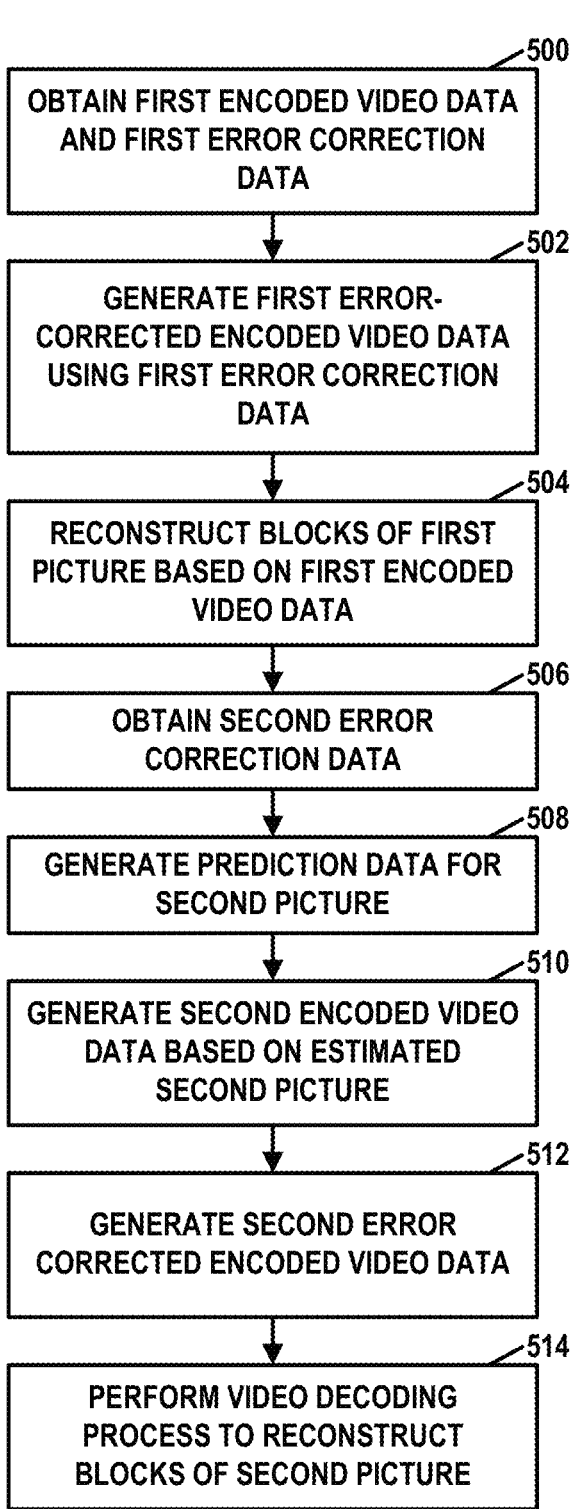

500

OBTAIN FIRST ENCODED VIDEO DATA AND FIRST ERROR CORRECTION DATA

502

GENERATE FIRST ERROR-CORRECTED ENCODED VIDEO DATA USING FIRST ERROR CORRECTION DATA

504

RECONSTRUCT BLOCKS OF FIRST PICTURE BASED ON FIRST ENCODED VIDEO DATA

506

OBTAIN SECOND ERROR CORRECTION DATA

508

GENERATE PREDICTION DATA FOR SECOND PICTURE

510

GENERATE SECOND ENCODED VIDEO DATA BASED ON ESTIMATED SECOND PICTURE

512

GENERATE SECOND ERROR CORRECTED ENCODED VIDEO DATA

514

PERFORM VIDEO DECODING PROCESS TO RECONSTRUCT BLOCKS OF SECOND PICTURE

| DCT BLOCK | DCT BLOCK | DCT BLOCK | DCT BLOCK |
| DCT BLOCK | DCT BLOCK | DCT BLOCK | DCT BLOCK |
| DCT BLOCK | DCT BLOCK | DCT BLOCK | DCT BLOCK |
| DCT BLOCK | DCT BLOCK | DCT BLOCK | DCT BLOCK |
| DCT BLOCK | DCT BLOCK | DCT BLOCK | DCT BLOCK |
| DCT BLOCK | DCT BLOCK | DCT BLOCK | DCT BLOCK |

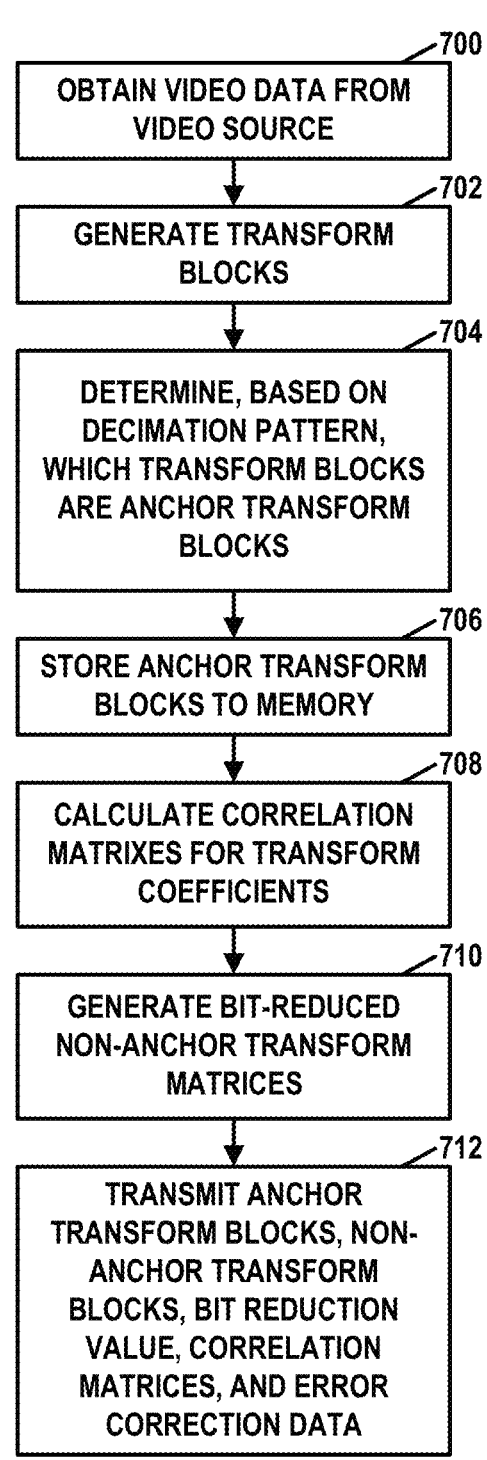

700
OBTAIN VIDEO DATA FROM
VIDEO SOURCE

702
GENERATE TRANSFORM
BLOCKS

704
DETERMINE, BASED ON
DECIMATION PATTERN,
WHICH TRANSFORM BLOCKS
ARE ANCHOR TRANSFORM
BLOCKS

706
STORE ANCHOR TRANSFORM
BLOCKS TO MEMORY

708
CALCULATE CORRELATION
MATRIXES FOR TRANSFORM
COEFFICIENTS

710
GENERATE BIT-REDUCED
NON-ANCHOR TRANSFORM
MATRICES

712
TRANSMIT ANCHOR
TRANSFORM BLOCKS, NON-
ANCHOR TRANSFORM
BLOCKS, BIT REDUCTION
VALUE, CORRELATION
MATRICES, AND ERROR
CORRECTION DATA

FIG. 7

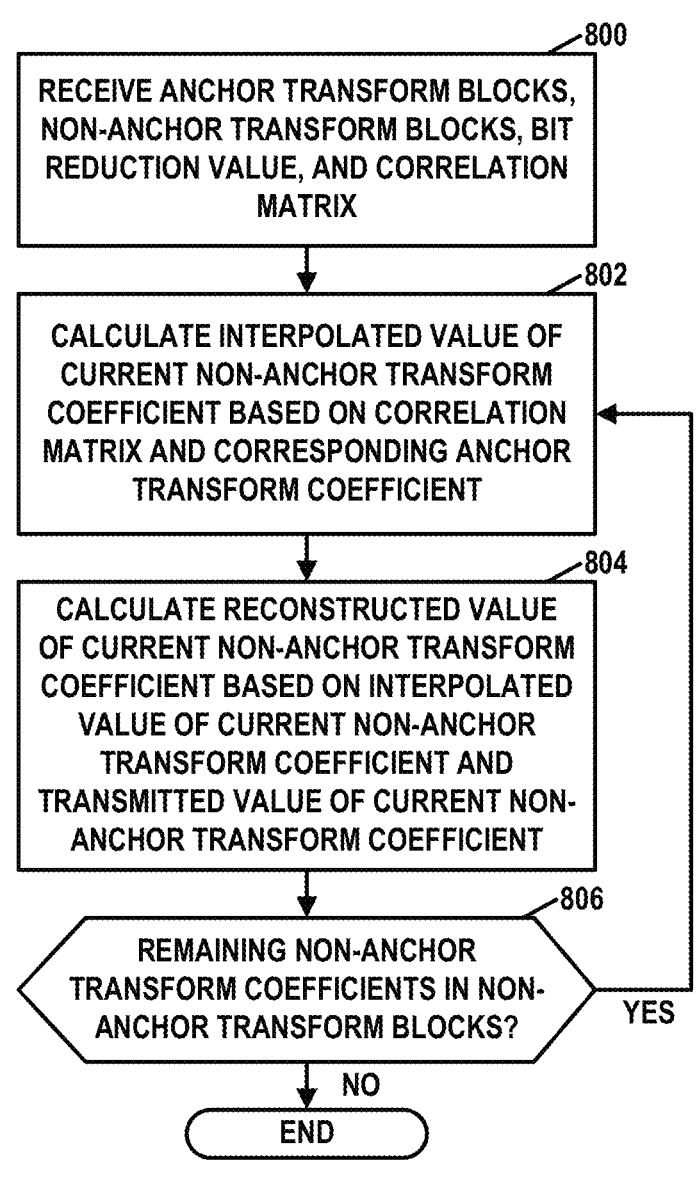

RECEIVE ANCHOR TRANSFORM BLOCKS, NON-ANCHOR TRANSFORM BLOCKS, BIT REDUCTION VALUE, AND CORRELATION MATRIX

CALCULATE INTERPOLATED VALUE OF CURRENT NON-ANCHOR TRANSFORM COEFFICIENT BASED ON CORRELATION MATRIX AND CORRESPONDING ANCHOR TRANSFORM COEFFICIENT

CALCULATE RECONSTRUCTED VALUE OF CURRENT NON-ANCHOR TRANSFORM COEFFICIENT BASED ON INTERPOLATED VALUE OF CURRENT NON-ANCHOR TRANSFORM COEFFICIENT AND TRANSMITTED VALUE OF CURRENT NON-ANCHOR TRANSFORM COEFFICIENT

REMAINING NON-ANCHOR TRANSFORM COEFFICIENTS IN NON-ANCHOR TRANSFORM BLOCKS?

YES

NO

END

| DCT BLOCK | ~~DCT BLOCK~~ | ~~DCT BLOCK~~ | DCT BLOCK | DCT BLOCK | ~~DCT BLOCK~~ |
| DCT BLOCK | DCT BLOCK | ~~DCT BLOCK~~ | DCT BLOCK | ~~DCT BLOCK~~ | DCT BLOCK |
| DCT BLOCK | ~~DCT BLOCK~~ | DCT BLOCK | DCT BLOCK | DCT BLOCK | ~~DCT BLOCK~~ |
| ~~DCT BLOCK~~ | DCT BLOCK | DCT BLOCK | DCT BLOCK | DCT BLOCK | ~~DCT BLOCK~~ |

FIG. 9

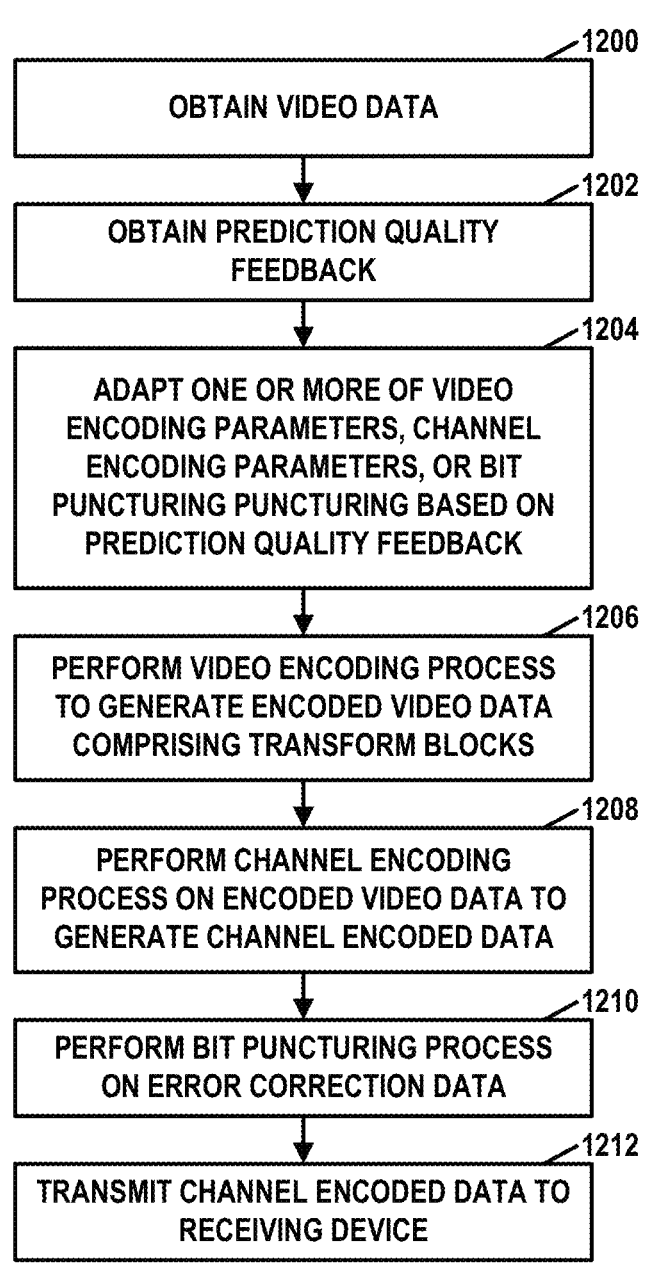

1200

OBTAIN VIDEO DATA

1202

OBTAIN PREDICTION QUALITY
FEEDBACK

1204

ADAPT ONE OR MORE OF VIDEO
ENCODING PARAMETERS, CHANNEL
ENCODING PARAMETERS, OR BIT
PUNCTURING PUNCTURING BASED ON
PREDICTION QUALITY FEEDBACK

1206

PERFORM VIDEO ENCODING PROCESS
TO GENERATE ENCODED VIDEO DATA
COMPRISING TRANSFORM BLOCKS

1208

PERFORM CHANNEL ENCODING
PROCESS ON ENCODED VIDEO DATA TO
GENERATE CHANNEL ENCODED DATA

1210

PERFORM BIT PUNCTURING PROCESS
ON ERROR CORRECTION DATA

1212

TRANSMIT CHANNEL ENCODED DATA TO
RECEIVING DEVICE

FIG. 12

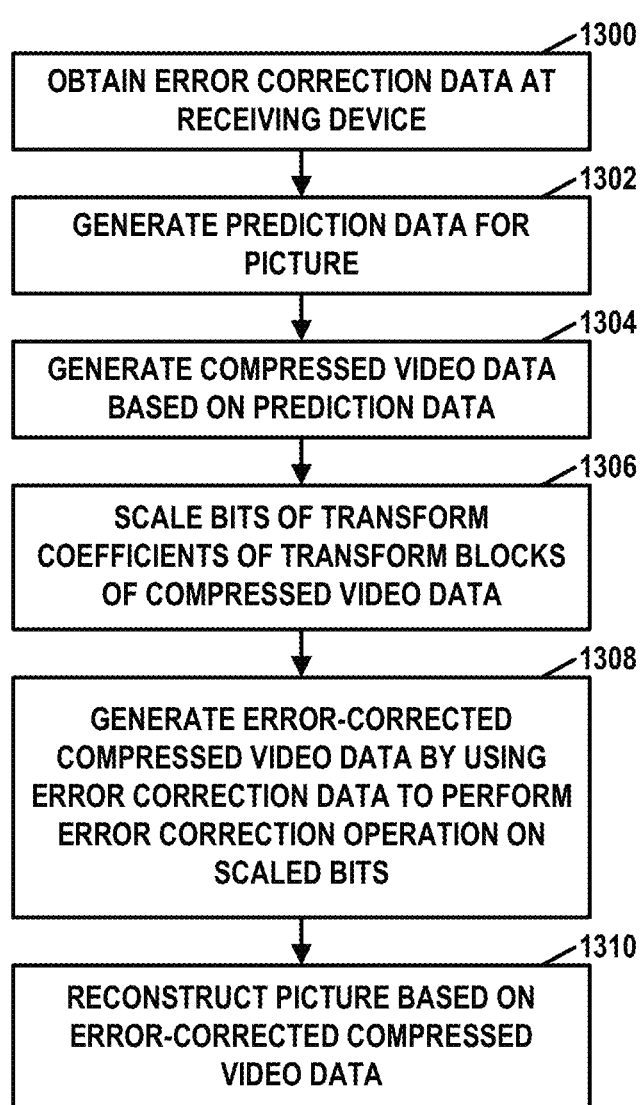

1300
OBTAIN ERROR CORRECTION DATA AT
RECEIVING DEVICE

1302
GENERATE PREDICTION DATA FOR
PICTURE

1304
GENERATE COMPRESSED VIDEO DATA
BASED ON PREDICTION DATA

1306
SCALE BITS OF TRANSFORM
COEFFICIENTS OF TRANSFORM BLOCKS
OF COMPRESSED VIDEO DATA

1308
GENERATE ERROR-CORRECTED
COMPRESSED VIDEO DATA BY USING
ERROR CORRECTION DATA TO PERFORM
ERROR CORRECTION OPERATION ON
SCALED BITS

1310
RECONSTRUCT PICTURE BASED ON
ERROR-CORRECTED COMPRESSED
VIDEO DATA

FIG. 13

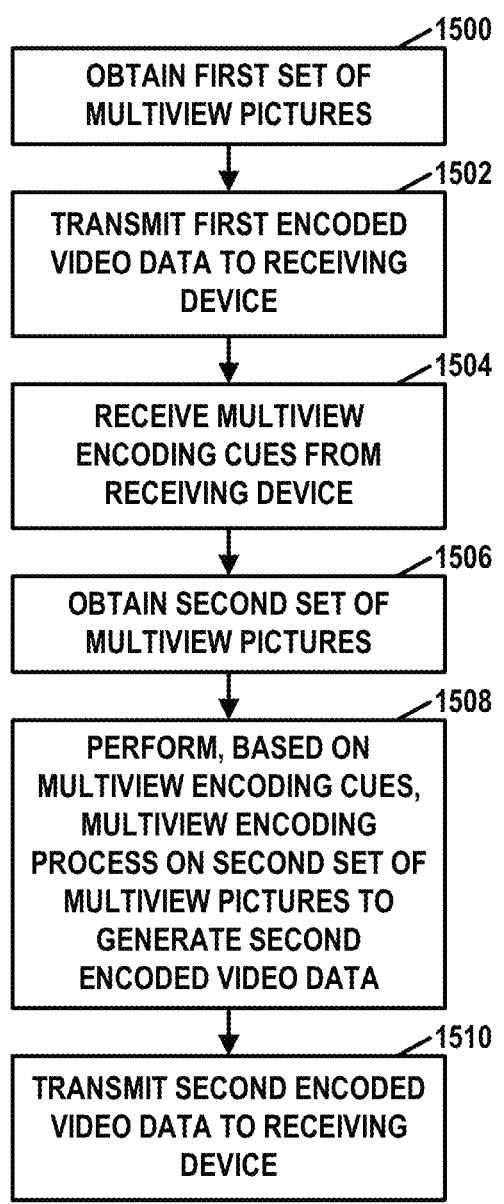

1500
OBTAIN FIRST SET OF
MULTIVIEW PICTURES

1502
TRANSMIT FIRST ENCODED
VIDEO DATA TO RECEIVING
DEVICE

1504
RECEIVE MULTIVIEW
ENCODING CUES FROM
RECEIVING DEVICE

1506
OBTAIN SECOND SET OF
MULTIVIEW PICTURES

1508
PERFORM, BASED ON
MULTIVIEW ENCODING CUES,
MULTIVIEW ENCODING
PROCESS ON SECOND SET OF
MULTIVIEW PICTURES TO
GENERATE SECOND
ENCODED VIDEO DATA

1510
TRANSMIT SECOND ENCODED
VIDEO DATA TO RECEIVING
DEVICE

FIG. 15

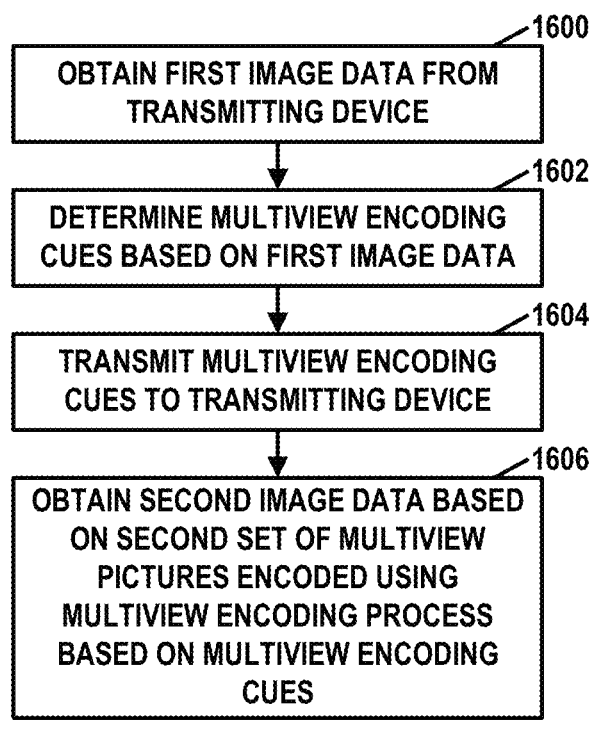

┌─────────────────────────────┐ ⟋1600
│ OBTAIN FIRST IMAGE DATA FROM │
│     TRANSMITTING DEVICE      │
└─────────────────────────────┘
                │
                ▼
┌─────────────────────────────┐ ⟋1602
│ DETERMINE MULTIVIEW ENCODING │
│ CUES BASED ON FIRST IMAGE DATA │
└─────────────────────────────┘
                │
                ▼
┌─────────────────────────────┐ ⟋1604
│   TRANSMIT MULTIVIEW ENCODING │
│  CUES TO TRANSMITTING DEVICE  │
└─────────────────────────────┘
                │
                ▼
┌─────────────────────────────┐ ⟋1606
│ OBTAIN SECOND IMAGE DATA BASED │
│  ON SECOND SET OF MULTIVIEW   │
│  PICTURES ENCODED USING       │
│ MULTIVIEW ENCODING PROCESS    │
│ BASED ON MULTIVIEW ENCODING   │
│            CUES               │
└─────────────────────────────┘

FIG. 16

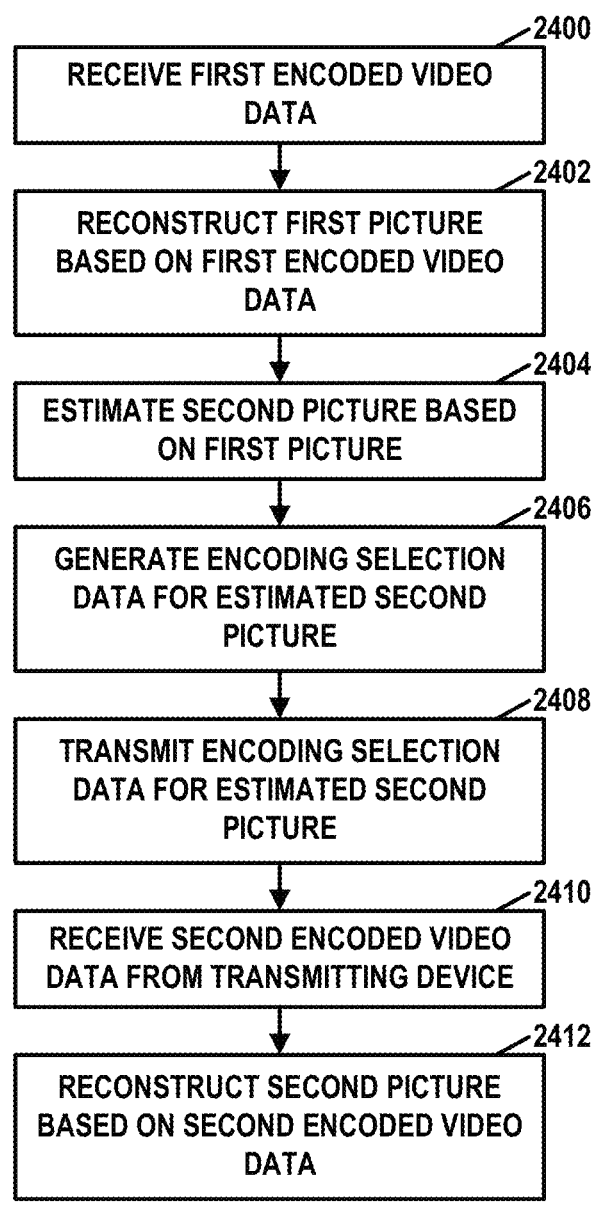

RECEIVE FIRST ENCODED VIDEO DATA — 2400

RECONSTRUCT FIRST PICTURE BASED ON FIRST ENCODED VIDEO DATA — 2402

ESTIMATE SECOND PICTURE BASED ON FIRST PICTURE — 2404

GENERATE ENCODING SELECTION DATA FOR ESTIMATED SECOND PICTURE — 2406

TRANSMIT ENCODING SELECTION DATA FOR ESTIMATED SECOND PICTURE — 2408

RECEIVE SECOND ENCODED VIDEO DATA FROM TRANSMITTING DEVICE — 2410

RECONSTRUCT SECOND PICTURE BASED ON SECOND ENCODED VIDEO DATA — 2412

FIG. 24

COMPANION DEVICE ASSISTED MULTI-VIEW VIDEO CODING

TECHNICAL FIELD

This disclosure relates to video encoding and decoding.

BACKGROUND

The popularity of virtual reality (VR), augmented reality (AR), and mixed reality (MR) technologies is growing at a fast pace and is expected to be widely adopted for applications other than gaming, such as healthcare, education, social, retail and many more. VR, AR, and MR may be collectively referred to as extended reality (XR). Because of this growing popularity, there is an increase demand for XR devices, such as XR goggles, with high quality of 3D graphics, higher video resolution, and low latency responses.

SUMMARY

This disclosure describes techniques for processing video data in a transmitting device and a receiving device. The transmitting device may be an XR device or other type of device. The receiving device may be a user equipment (UE) device, such as a smartphone or tablet. The transmitting device may perform a limited video encoding process video data to generate encoded video data. The transmitting device may apply channel encoding to the encoded video data to generate error correction data. The transmitting device may transmit the error correction data and at least some of the encoded video data to the receiving device. The receiving device may estimate video data based on one or more previously reconstructed pictures. The receiving device may then encode the estimated video data. The receiving device may use one or more coding tools to encode the estimated video data that were not used by the transmitting device when performing the limited video encoding process on the video data. The receiving device may use the error correction data and the predicted video data to regenerate portions of the encoded video data that the transmitting device did not send. This process may avoid the need to send portions of the encoded video data.

In one example, this disclosure describes a method of decoding video data includes obtaining, at a receiving device and from a transmitting device, error correction data, wherein the error correction data provides error correction information and is generated based on encoded video data of one or more blocks of a picture of the video data; generating, at the receiving device, prediction data for the picture using one or more coding tools not used for generating the encoded video data of the one or more blocks, wherein the prediction data for the picture comprises predictions of the blocks of the picture based at least in part on blocks of one or more previously reconstructed pictures of the video data; generating, at the receiving device, encoded video data based on the prediction data for the picture; generating, at the receiving device, error-corrected encoded video data using the error correction data to perform an error correction operation on the encoded video data; and performing, at the receiving device, a reconstruction operation that reconstructs the blocks of the picture based on the error-corrected encoded video data, wherein the reconstruction operation is controlled by values of one or more parameters.

In another example, this disclosure describes a method of encoding video data includes obtaining, at a transmitting device, video data from a video source; generating, at the transmitting device, based on a set of parameters, encoded video data of a first picture of the video data and encoded video data of a second picture of the video data; performing, at the transmitting device, channel encoding on the encoded video data of the first picture and the encoded video data of the second picture to generate error correction data for the first picture and error correction data for the second picture; and transmitting, at the transmitting device, the encoded video data of the first picture, error correction data for the first picture, and error correction data for the second picture.

In another example, this disclosure describes a method of encoding video data includes obtaining, at a transmitting device, video data from a video source; generating, at the transmitting device, transform blocks based on the video data; determining, at the transmitting device, which of the transform blocks are anchor transform blocks; calculating, at the transmitting device, a correlation matrix for a transform block set; generating, at the transmitting device, bit-reduced non-anchor transform matrixes; and transmitting, at the transmitting device, the anchor transform blocks, the non-anchor transform blocks, and the correlation matrix to a receiving device.

In another example, this disclosure describes a device includes a memory configured to store video data; a communication interface; and one or more processing implemented in circuitry and coupled to the memory, the one or more processors configured to perform the methods.

In another example, this disclosure describes a device for processing video data includes a memory configured to store video data; and a communication interface configured to obtain error correction data from a transmitting device, wherein the error correction data provides error correction information regarding a picture of the video data; one or more processing implemented in circuitry and coupled to the memory, the one or more processors configured to: generate prediction data for the picture, wherein the prediction data for the picture comprises predictions of blocks of the picture based at least in part on one or more previously reconstructed pictures of the video data; generate encoded video data based on the prediction data for the picture, wherein the encoded video data includes transform blocks that comprises transform coefficients; scale bits of the transform coefficients of the transform blocks based on reliability values for bit positions; generate error-corrected encoded video data using the error correction data to perform an error correction operation on the scaled bits of the transform coefficients of the transform blocks; and reconstruct the picture based on the error-corrected encoded video data.

In another example, this disclosure describes a device for processing video data includes a memory configured to store video data; and one or more processing implemented in circuitry and coupled to the memory, the one or more processors configured to: obtain video data; obtain prediction quality feedback, wherein the prediction quality feedback is based on reliability of estimated pictures generated by a receiving device; adapt one or more of video encoding parameters or channel encoding parameters based on the prediction quality feedback; perform a video encoding process to generate encoded video data based on one or more pictures of the obtained video data, wherein the video encoding process is controlled by the video encoding parameters; perform a channel encoding process on the encoded video data to generate channel encoded data, wherein the channel encoding process is controlled by the channel encoding parameters; and a communication interface configured to transmit the channel encoded data to the receiving device.

In another example, this disclosure describes a method of processing video data includes obtaining error correction data at a receiving device and from a transmitting device, wherein the error correction data provides error correction information regarding a picture of the video data; generating, at the receiving device, prediction data for the picture, wherein the prediction data for the picture comprises predictions of blocks of the picture based at least in part on one or more previously reconstructed pictures of the video data; generating, at the receiving device, encoded video data based on the prediction data for the picture, wherein the encoded video data includes transform blocks that comprises transform coefficients; scaling, at the receiving device, bits of the transform coefficients of the transform blocks based on reliability values for bit positions; generating, at the receiving device, error-corrected encoded video data using the error correction data to perform an error correction operation on the scaled bits of the transform coefficients of the transform blocks; and reconstructing, at the receiving device, the picture based on the error-corrected encoded video data.

In another example, this disclosure describes a method of processing video data includes obtaining video data; obtaining prediction quality feedback, wherein the prediction quality feedback is based on reliability of estimated pictures generated by a receiving device; adapting one or more of video encoding parameters or channel encoding parameters based on the prediction quality feedback; performing a video encoding process to generate encoded video data based on one or more pictures of the obtained video data, wherein the video encoding process is controlled by the video encoding parameters; performing a channel encoding process on the encoded video data to generate channel encoded data, wherein the channel encoding process is controlled by the channel encoding parameters; and transmitting the channel encoded data to the receiving device.

In another example, this disclosure describes a device includes a memory configured to store video data; and one or more processors implemented in circuitry and coupled to the memory, the one or more processors configured to: obtain a first set of multiview pictures of the video data, wherein the first set of multiview pictures includes first pictures and second pictures, the first pictures being from a first viewpoint and the second pictures being from a second viewpoint; transmit first encoded video data to a receiving device, wherein the first encoded video data is based on the first set of multiview pictures; receive multiview encoding cues from the receiving device; obtain a second set of multiview pictures of the video data, wherein the second set of multiview pictures includes third pictures and fourth pictures, the third pictures being from the first viewpoint and the fourth pictures being from the second viewpoint; perform, based on the multiview encoding cues received from the receiving device, a multiview encoding process on the second set of multiview pictures to generate second encoded video data, wherein the multiview encoding process reduces inter-view redundancy between the third pictures and the fourth pictures; and transmit the second encoded video data to the receiving device.

In another example, this disclosure describes a device includes a memory configured to store video data; and one or more processors implemented in circuitry and coupled to the memory, the one or more processors configured to: obtain first encoded video data from a transmitting device, wherein the first encoded video data is based on a first set of multiview pictures of the video data, the first set of multiview pictures includes first pictures and second pictures, the first pictures being from a first viewpoint and the second pictures being from a second viewpoint; determine multiview encoding cues based on the first encoded video data; transmit the multiview encoding cues to the transmitting device; obtain second encoded video data from the transmitting device, wherein the second encoded video data is based on a second set of multiview pictures that includes third pictures and fourth pictures, the second encoded video data being encoded using a multiview encoding process that reduces inter-view redundancy between the third pictures and the fourth pictures based on the multiview encoding cues.

In another example, this disclosure describes a method of processing video data includes obtaining a first set of multiview pictures of the video data, wherein the first set of multiview pictures includes first pictures and second pictures, the first pictures being from a first viewpoint and the second pictures being from a second viewpoint; transmitting first encoded video data to a receiving device, wherein the first encoded video data is based on the first set of multiview pictures; receiving multiview encoding cues from the receiving device; obtaining a second set of multiview pictures of the video data, wherein the second set of multiview pictures includes third pictures and fourth pictures, the third pictures being from the first viewpoint and the fourth pictures being from the second viewpoint; performing, based on the multiview encoding cues received from the receiving device, a multiview encoding process on the second set of multiview pictures to generate second encoded video data, wherein the multiview encoding process reduces inter-view redundancy between the third pictures and the fourth pictures; and transmitting the second encoded video data to the receiving device.

In another example, this disclosure describes a method of processing video data includes obtaining first encoded video data from a transmitting device, wherein the first encoded video data is based on a first set of multiview pictures of the video data, the first set of multiview pictures includes first pictures and second pictures, the first pictures being from a first viewpoint and the second pictures being from a second viewpoint; determining multiview encoding cues based on the first encoded video data; transmitting the multiview encoding cues to the transmitting device; obtaining second encoded video data from the transmitting device, wherein the second encoded video data is based on a second set of multiview pictures that includes third pictures and fourth pictures, the second encoded video data being encoded using a multiview encoding process that reduces inter-view redundancy between the third pictures and the fourth pictures based on the multiview encoding cues.

In another example, this disclosure describes a device includes means for obtaining a first set of multiview pictures of video data, wherein the first set of multiview pictures includes first pictures and second pictures, the first pictures being from a first viewpoint and the second pictures being from a second viewpoint; means for transmitting first encoded video data to a receiving device, wherein the first encoded video data is based on the first set of multiview pictures; means for receiving multiview encoding cues from the receiving device; means for obtaining a second set of multiview pictures of the video data, wherein the second set of multiview pictures includes third pictures and fourth pictures, the third pictures being from the first viewpoint and the fourth pictures being from the second viewpoint; means for performing, based on the multiview encoding cues received from the receiving device, a multiview encoding process on the second set of multiview pictures to generate second encoded video data, wherein the multiview encoding process reduces inter-view redundancy between the third pictures and the fourth pictures; and means for transmitting the second encoded video data to the receiving device.

In another example, this disclosure describes a device includes means for obtaining first encoded video data from a transmitting device, wherein the first encoded video data is based on a first set of multiview pictures of the video data, the first set of multiview pictures includes first pictures and second pictures, the first pictures being from a first viewpoint and the second pictures being from a second viewpoint; means for determining multiview encoding cues based on the first encoded video data; means for transmitting the multiview encoding cues to the transmitting device; means for obtaining second encoded video data from the transmitting device, wherein the second encoded video data is based on a second set of multiview pictures that includes third pictures and fourth pictures, the second encoded video data being encoded using a multiview encoding process that reduces inter-view redundancy between the third pictures and the fourth pictures based on the multiview encoding cues.

In another example, this disclosure describes a device includes a memory configured to store video data; and one or more processors implemented in circuitry and coupled to the memory, the one or more processors configured to: encode a first set of pictures of the video data to generate first encoded video data; transmit the first encoded video data to a receiving device; receive, from the receiving device, a decimation pattern indication that indicates a decimation pattern determined based on the first set of pictures, the decimation pattern being a pattern of encoded video data non-transmission; encode a second set of pictures of the video data to generate second encoded video data; apply the decimation pattern to the second encoded video data to generate decimated video data; and transmit the decimated video data to the receiving device.

In another example, this disclosure describes a device includes a memory configured to store video data; and one or more processors implemented in circuitry and coupled to the memory, the one or more processors configured to: receive, from a transmitting device, first encoded video data; perform a decoding process to reconstruct a first set of pictures based on the first encoded video data; determine, based on the first set of pictures, a decimation pattern that indicates a pattern of encoded video data non-transmission; transmit, to the transmitting device, a decimation pattern indication that indicates the determined decimation pattern; receive, from the transmitting device, decimated video data, wherein the decimated video data comprises second encoded video data to which the decimation pattern has been applied, wherein the second encoded video data is generated based on a second set of pictures of the video data; and perform the decoding process to reconstruct the second set of pictures based on the second encoded video data.

In another example, this disclosure describes a method includes encoding a first set of pictures of video data to generate first encoded video data; transmitting the first encoded video data to a receiving device; receiving, from the receiving device, a decimation pattern indication that indicates a decimation pattern determined based on the first set of pictures, the decimation pattern being a pattern of encoded video data non-transmission; encoding a second set of pictures of the video data to generate second encoded video data; applying the decimation pattern to the second encoded video data to generate decimated video data; and transmitting the decimated video data to the receiving device.

In another example, this disclosure describes a method includes receiving, from a transmitting device, first encoded video data; applying a decoding process to reconstruct a first set of pictures based on the first encoded video data; determining, based on the first set of pictures, a decimation pattern that indicates a pattern of encoded video data non-transmission; transmitting, to the transmitting device, a decimation pattern indication that indicates the determined decimation pattern; receiving, from the transmitting device, decimated video data, wherein the decimated video data comprises second encoded video data to which the decimation pattern has been applied, wherein the second encoded video data is generated based on a second set of pictures of the video data; and performing the decoding process to reconstruct the second set of pictures based on the second encoded video data.

In another example, this disclosure describes a device includes means for encoding a first set of pictures of video data to generate first encoded video data; means for transmitting the first encoded video data to a receiving device; means for receiving, from the receiving device, a decimation pattern indication that indicates a decimation pattern determined based on the first set of pictures, the decimation pattern being a pattern of encoded video data non-transmission; means for encoding a second set of pictures of the video data to generate second encoded video data; means for applying the decimation pattern to the second encoded video data to generate decimated video data; and means for transmitting the decimated video data to the receiving device.

In another example, this disclosure describes a device includes means for receiving, from a transmitting device, first encoded video data; means for performing a decoding process to reconstruct a first set of pictures based on the first encoded video data; means for determining, based on the first set of pictures, a decimation pattern that indicates a pattern of encoded video data non-transmission; means for transmitting, to the transmitting device, a decimation pattern indication that indicates the determined decimation pattern; means for receiving, from the transmitting device, decimated video data, wherein the decimated video data comprises second encoded video data to which the decimation pattern has been applied, wherein the second encoded video data is generated based on a second set of pictures of the video data; and means for performing the decoding process to reconstruct the second set of pictures based on the second encoded video data.

In another example, this disclosure describes a device includes a memory configured to store video data; and one or more processors implemented in circuitry and coupled to the memory, the one or more processors configured to: encode a first picture of the video data to generate first encoded video data; transmit the first encoded video data to a receiving device; receive, from the receiving device, encoding selection data for a second picture of the video data, wherein: the encoding selection data for the second picture indicate encoding selections used to encode an estimate of the second picture, and the second picture follows the first picture in decoding order; encode the second picture based on the encoding selection data for the second picture to generate second encoded video data; and transmit the second encoded video data to the receiving device.

In another example, this disclosure describes a device includes a memory configured to store video data; and one or more processors implemented in circuitry and coupled to the memory, the one or more processors configured to: receive first encoded video data from a transmitting device; reconstruct a first picture of the video data based on the first encoded video data; estimate a second picture of the video data based on the first picture, the second picture being a picture occurring after the first picture in decoding order; generate encoding selection data for the second picture, wherein the encoding selection data for the second picture indicate encoding selections used to encode the second picture; transmit, to the transmitting device, the encoding selection data for the second picture; receive second encoded video data from the transmitting device; and reconstruct the second picture based on the second encoded video data.

In another example, this disclosure describes a method of processing video data includes encoding a first picture of the video data to generate first encoded video data; transmitting the first encoded video data to a receiving device; receiving, from the receiving device, encoding selection data for a second picture of the video data, wherein: the encoding selection data for the second picture indicate encoding selections used to encode an estimate of the second picture, and the second picture follows the first picture in decoding order; encoding the second picture based on the encoding selection data for the second picture to generate second encoded video data; and transmitting the second encoded video data to the receiving device.

In another example, this disclosure describes a method of processing video data includes receiving first encoded video data from a transmitting device; reconstructing a first picture of the video data based on the first encoded video data; estimating a second picture of the video data based on the first picture, the second picture being a picture occurring after the first picture in decoding order; generating encoding selection data for the second picture, wherein the encoding selection data for the second picture indicate encoding selections used to encode the second picture; transmitting, to the transmitting device, the encoding selection data for the second picture; receiving second encoded video data from the transmitting device; and reconstructing the second picture based on the second encoded video data.

In another example, this disclosure describes a device includes means for encoding a first picture of video data to generate first encoded video data; means for transmitting the first encoded video data to a receiving device; means for receiving, from the receiving device, encoding selection data for a second picture of the video data, wherein: the encoding selection data for the second picture indicate encoding selections used to encode an estimate of the second picture, and the second picture follows the first picture in decoding order; means for encoding the second picture based on the encoding selection data for the second picture to generate second encoded video data; and means for transmitting the second encoded video data to the receiving device.

In another example, this disclosure describes a device includes means for receiving first encoded video data from a transmitting device; means for reconstructing a first picture of the video data based on the first encoded video data; means for estimating a second picture of the video data based on the first picture, the second picture being a picture occurring after the first picture in decoding order; means for generating encoding selection data for the second picture, wherein the encoding selection data for the second picture indicate encoding selections used to encode the second picture; means for transmitting, to the transmitting device, the encoding selection data for the second picture; means for receiving second encoded video data from the transmitting device; and means for reconstructing the second picture based on the second encoded video data.

The details of one or more examples are set forth in the accompanying drawings and the description below. Other features, objects, and advantages will be apparent from the description, drawings, and claims.

BRIEF DESCRIPTION OF DRAWINGS

FIG. 5 is a flowchart illustrating an example operation of a receiving device according to techniques of this disclosure.

FIG. 7 is a flowchart illustrating an example operation of a transmitting device for hybrid decimation of transform blocks according to techniques of this disclosure.

FIG. 8 is a flowchart illustrating an example operation of a receiving device for hybrid decimation of transform blocks according to techniques of this disclosure.

FIG. 9 is a conceptual diagram illustrating an example decimation pattern adaptively selected by a receiving device according to one or more techniques of this disclosure.

FIG. 12 is a flowchart illustrating an example operation of a transmitting device using scaled bits according to techniques of this disclosure.

FIG. 13 is a flowchart illustrating an example operation of a receiving device using scaled bits according to techniques of this disclosure.

FIG. 15 is a flowchart illustrating an example operation of a transmitting device for multiview processing according to techniques of this disclosure.

FIG. 16 is a flowchart illustrating an example operation of a receiving device for multiview processing according to techniques of this disclosure.

FIG. 24 is a flowchart illustrating an example operation of a receiving device in which the receiving device transmits encoding selection data according to techniques of this disclosure.

DETAILED DESCRIPTION

Figure 1:
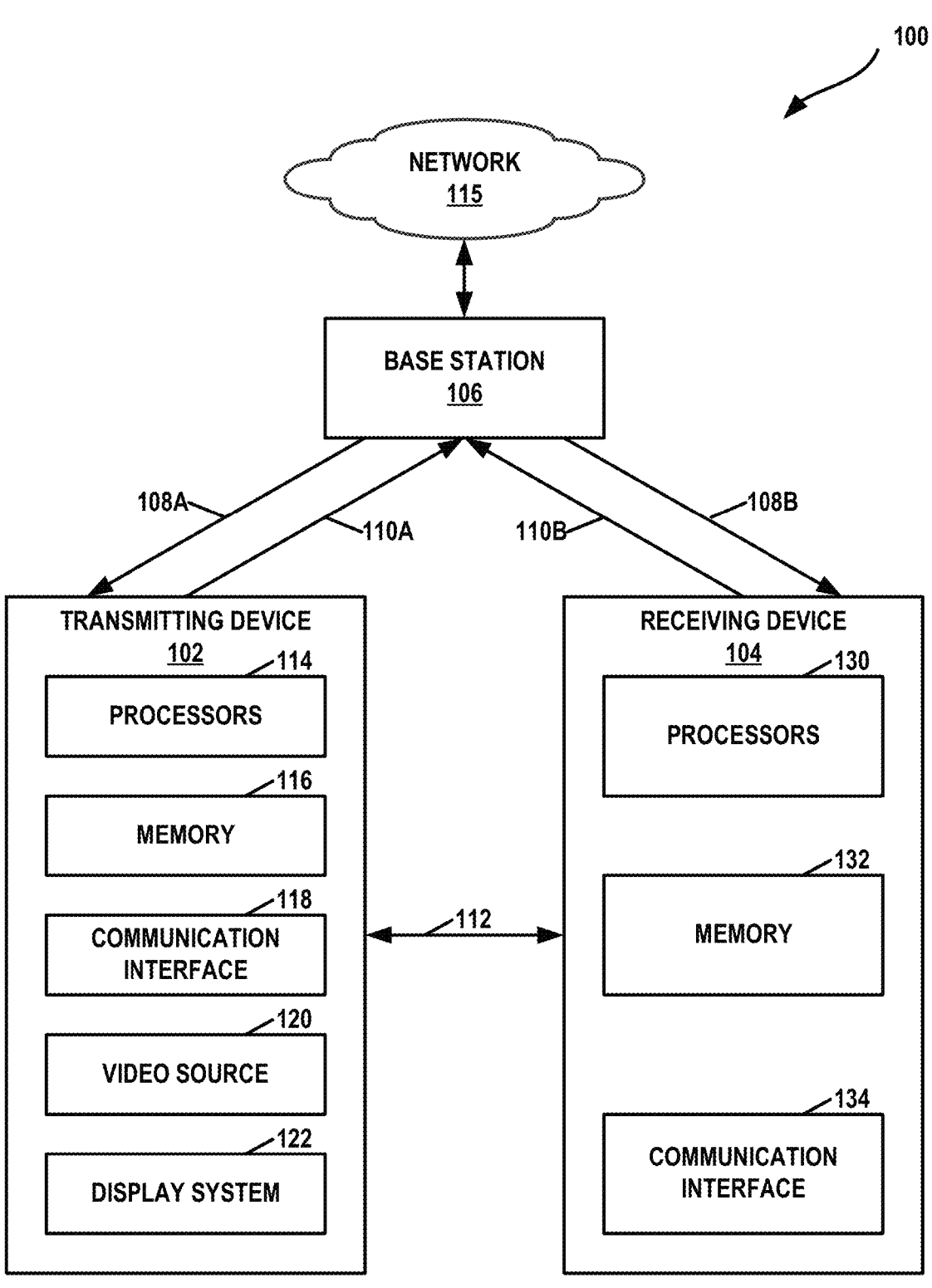
FIG. 1 is a block diagram illustrating an example system according to techniques of this disclosure.

While modern video encoding processes can significantly reduce the amount of data needed to represent video data, such video encoding processes are typically resource intensive and may involve many memory operations. Modern video encoding processes may therefore require complex processors, fast memory, and consume considerable energy. However, with some contemporary and future planned wireless communication systems, such as 5G and 6G wireless communication systems, wireless transmission bandwidth may be less of a constraint, especially when communicating over short distances such as the distances between devices on a person's body.

This disclosure describes techniques that may reduce the complexity of video encoding at a transmitting device using error correction that is performed as part of channel decoding using error correction data. A transmitting device may perform a limited video encoding process that generates encoded video data. The limited video encoding process typically uses coding tools, such as intra prediction, that are relatively less resource intensive. Because the video encoding process uses less complex coding tools, the resulting encoded video data may be larger than video data encoded using more complex and resource intensive coding tools. The error correction data is based on the encoded video data. The transmitting device may transmit the error correction data to a receiving device. It may not be necessary for the transmitting device to transmit all of the encoded video data of one or more pictures to the receiving device.

The receiving device may estimate a picture of the video data based on one or more previously reconstructed pictures. In some examples, to estimate the picture, the receiving device may extrapolate the content of blocks from the previously reconstructed pictures. The receiving device may then perform a full video encoding process on the estimated picture to generate estimated encoded video data for the picture. When performing the full video encoding process, the receiving device may use more complex coding tools, such as inter prediction, than the limited video encoding process performed by the transmitting device. The receiving device may perform a channel decoding process that generates error-corrected encoded video data based on the estimated encoded video data for the picture and the error correction data for the picture. In some circumstances, the channel decoding process may generate the error-corrected encoded video data based on the error correction data for the picture and a combination of the estimated encoded video data for the picture and encoded video data for the picture sent by the transmitting device. The receiving device may reconstruct the picture based on the error-corrected encoded video data. In this way, the receiving device may be able to reconstruct each picture of the video data even though the transmitting device did not transmit all of the encoded video data of the picture.

As further described in this disclosure, various techniques, such as applications of decimation patterns, may be applied that specify which transform blocks of the lightly encoded video data are not signaled or have reduced bit depths. Furthermore, in some examples of this disclosure, reliability values can be determined for bit positions, bits of transform coefficients of the transform blocks can be scaled using the reliability values, and the scaled values may be used in channel encoding and channel decoding.

As further described in this disclosure, the receiving device may determine a decimation pattern based on a first set of pictures. The decimation pattern is a pattern of encoded video data non-transmission. The receiving device may transmit, to the transmitting device, a decimation pattern indication that indicates the determined decimation pattern. The transmitting device may receive the decimation pattern indication from the receiving device and apply the indicated decimation pattern to encoded video data to generate decimated video data. The transmitting device may transmit the decimated video data to the receiving device. In this way, the techniques of this disclosure may further reduce resource consumption at the transmitting device while still avoiding transmitting excessive amounts of data. This may further increase coding efficiency.

FIG. 1 is a block diagram illustrating an example system 100 according to techniques of this disclosure. In the example of FIG. 1, system 100 includes a transmitting device 102, a receiving device 104, and a base station 106. Transmitting device 102 may be a device configured to perform include an extended reality (XR) device (e.g., an XR headset), a mobile device, a wearable device, a sensor device, an Internet of Things (IoT) device, intermediate networking device, or another type of device. In some examples, transmitting device 102 may be included in a robot or vehicle. Receiving device 104 may be a computing device, such as a mobile device (e.g., a mobile phone or tablet computer), personal computer, vehicle-based computing device, wireless base station, wearable computing device, intermediate network device, special-purpose device, Internet of Thing (IoT) device, or other type of device. In some examples, receiving device 104 is a device that a user of transmitting device 102 may have in addition to transmitting device 102.

Transmitting device 102 and receiving device 104 may communicate with base station 106. In some examples, transmitting device 102 and receiving device 104 may communicate with base station 106 using a 5th-generation (5G) wireless communication protocol, 6th-generation (6G) wireless communication protocol, WiFi protocol, Bluetooth protocol, or another type of wireless communication protocol. Base station 106 may transmit data from a network 115 to transmitting device 102 and receiving device 104 via wireless downlink channels 108A, 108B (collectively, "wireless downlink channels 108"). Base station 106 may receive data from transmitting device 102 and receiving device 104 for transmission to other devices connected to network 115 via wireless uplink channels 110A, 110B (collectively, "wireless uplink channels 110"). Transmitting device 102 and receiving device 104 may communicate directly with each other via a wireless sidelink channel 112. In other examples, transmitting device 102 and receiving device 104 may communicate via other types of channels. In other examples, transmitting device 102 and receiving device 104 may communicate via other types of channels.

In the example of FIG. 1, transmitting device 102 includes one or more processors 114, a memory 116, a communication interface 118, a video source 120, and a display system 122. Receiving device 104 includes one or more processors 130, a memory 132, and a communication interface 134. Processors 114 and processors 130 may include circuitry configured to perform various information processing tasks, including execution of computer-readable instructions. Processors 114 and processors 130 may include microprocessors, digital signal processors, and other types of circuitry. Memory 116 and memory 132 may be configured to store data, such as computer-readable instructions, video data, and other types of data. Communication interface 118 and communication interface 134 may be configured to send and receive data, e.g., via wireless downlink channels 108, wireless uplink channels 110, and wireless sidelink channel 112.

In general, video source 120 represents a source of video data (e.g., raw, unencoded video data). Video source 120 may include one or more video capture devices, such as a video camera, a video archive containing previously captured raw video, and/or a video feed interface to receive video from a video content provider. As a further alternative, video source 120 may generate computer graphics-based data as the source video, or a combination of live video, archived video, and computer-generated video.

In examples where transmitting device 102 is an XR device that presents MR and AR imagery to a user, video data from video source 120 may need to be analyzed so that display system 122 of transmitting device 102 is able to display virtual elements at the correct locations. Processing video data in this way may require significant computational resources. In other words, powerful processors and significant amounts of energy may be used when processing the video data. Because transmitting device 102 may be designed for wear on a user's head, it may be important to minimize the weight and power consumption of transmitting device 102, while supporting high-quality low-latency video.

Furthermore, in some examples, transmitting device 102 is an XR headset and transmitting device 102 may be configured to process pictures of the video data to generate virtual element data. Receiving device 104 may configured to transmit (and transmitting device 102 is configured to receive) the virtual element data. Transmitting device 102 may include a display system 122 configured to display one or more virtual elements in a XR scene based on the virtual element data.

Accordingly, it may be desirable to offload processing of the video data to a device other than transmitting device 102, such as receiving device 104. Receiving device 104 may, either permanently or on transitory basis, have greater resources than transmitting device 102. For example, receiving device 104 may be equipped with a larger battery and comparatively powerful processors. However, for receiving device 104 to process the video data, transmitting device 102 may need to transmit the video data to receiving device 104 via wireless sidelink channel 112. Because a very large number of bits may be required to represent unencoded high-quality video data, it would take a significant amount of time and energy for transmitting device 102 to transmit the unencoded high-quality video data to receiving device 104. The required time for transmission may undermine the goal of providing low-latency video to the user. The required energy for transmission may undermine the goal of minimizing power consumption. Encoding the video data using a video coding specification, such as H.264/Advanced Video Coding (AVC), H.265/High Efficiency Video Coding (HEVC), or H.266/Versatile Video Coding (VVC), may significantly reduce the amount of data required to represent the video data. However, the encoding process itself may introduce its own delays and power consumption demands.

This disclosure describes techniques that may address these problems. In accordance with a technique of this disclosure, transmitting device 102 and receiving device 104 may use a distributed video coding (DVC) process. The DVC process reduces the amount of encoding work performed by transmitting device 102 and shifts some of the encoding work to receiving device 104. Receiving device 104 may have more resources (e.g., computation power, access to power, etc.) than transmitting device 102 and so may be better equipped to perform the encoding work. In some examples, the DVC process may be used for load balancing computational tasks among devices. For example, a system may determine that it may be more efficient overall for receiving device 104 to perform specific video-related computational tasks than transmitting device 102.

In addition to the video encoding process, transmitting device 102 may perform channel encoding process to prepare the encoded video data for transmission to receiving device 104. The channel encoding process may generate error correction data for sequences of data within the encoded video data. Typically, receiving device 104 uses error correction data to correct errors introduced into the encoded video data during transmission. However, in accordance with techniques of this disclosure, transmitting device 102 may send the error correction data for some encoded video data, but not the encoded video data to which the error correction data corresponds. Receiving device 104 may estimate one or more subsequent pictures. Receiving device 104 may perform a video encoding process on the subsequent pictures to generate estimated encoded video data. The receiving device may use the estimated encoded video data and the received error correction data to generate error-corrected encoded video data. Receiving device 104 may then decode the error-corrected encoded video data to reconstruct the video data that transmitting device 102 did not send.

Thus, in some examples, receiving device 104 may obtain, from transmitting device 102, first encoded video data and first error correction data. The first encoded video data may represent one or more blocks of a first picture of the video data. The first error correction data may provide error correction information regarding the blocks of the first picture. Receiving device 104 may generate first error-corrected encoded video data using the first error correction data to perform an error correction operation on the first encoded video data. Additionally, receiving device 104 may perform a first reconstruction operation that reconstructs the blocks of the first picture based on the first encoded video data. The first reconstruction operation may be controlled by values of one or more parameters.

Furthermore, receiving device 104 may obtain second error correction data from transmitting device 102. The second error correction data may provide error correction information regarding one or more blocks of a second picture of the video data. Receiving device 104 may generate prediction data for the second picture. The prediction data for the second picture may comprise predictions of the blocks of the second picture of the video data based at least in part on the blocks of one or more previously reconstructed pictures, such as the first picture. Receiving device 104 may use one or more coding tools to generate the prediction data that were not used for generating the encoded video data for the second picture. Receiving device 104 may generate second encoded video data based on the prediction of the blocks of the second picture. Receiving device 104 may generate second error-corrected encoded video data using the second error correction data to perform the error correction operation on the second encoded video data. Receiving device 104 may perform a second reconstruction operation that reconstructs the blocks of the second picture based on the second error-corrected encoded video data. The second reconstruction operation is controlled by the values of the parameters.

Furthermore, in accordance with one or more techniques of this disclosure, receiving device 104 may receive a decimation pattern indication from receiving device 104. Receiving device 104 may determine a decimation pattern indication determined based on previously reconstructed pictures. The decimation pattern indication may indicate a pattern of encoded video data non-transmission. For example, the decimation pattern may indicate a pattern of skipping transmitting of encoded video data of full pictures. In some examples, the decimation pattern indicates a pattern of skipping transmission of encoded video data of specified regions within pictures. In some examples where the video data is multiview video data, the decimation pattern may indicate a pattern of skipping transmission of encoded video data of pictures from specified views.

Transmitting device 102 may perform a video encoding process on pictures of the video data. The video encoding process may compress the pictures less than a "heavy" or more complex compression operation, such as the compression operations described in H.264, H.265, and H.266 video coding standards. In addition to the video encoding process, transmitting device 102 may perform channel encoding process to prepare the encoded video data for transmission to receiving device 104. The channel encoding process may generate error correction data for sequences of data within the encoded video data. Typically, receiving device 104 uses error correction data to correct errors introduced into the encoded video data during transmission. However, receiving device 104 may also use the error correction data to restore information that was intentionally not transmitted to receiving device. Thus, transmitting device 102 may apply the decimation pattern to the second encoded video data to generate decimated video data. Transmitting device 102 may transmit the error correction data (which was generated based on the undecimated encoded video data) and the decimated video data to receiving device 104.

Receiving device 104 may obtain, from transmitting device 102, first encoded video data and first error correction data. The first encoded data may represent one or more blocks of a first picture of the video data. The first error correction data may provide error correction information regarding the blocks of the first picture. Receiving device 104 may generate first error-corrected encoded video data using the first error correction data to perform an error correction operation on the first encoded video data. Additionally, receiving device 104 may perform a first reconstruction operation that reconstructs the blocks of the first picture based on the first encoded video data. The first reconstruction operation may be controlled by values of one or more parameters.

Furthermore, receiving device 104 may obtain first error correction data and first encoded video data from transmitting device 102. Receiving device 104 may apply an error correction process to modify the first encoded video data based on the first error correction data to generate first error-corrected encoded video data. Receiving device 104 may also apply a decoding process to reconstruct a first set of pictures based on the first error-corrected encoded video data. Receiving device 104 may determine, based on the first set of pictures, a decimation pattern that indicates a pattern of encoded video data non-transmission. Receiving device 104 may transmit, to transmitting device 102, a decimation pattern indication that indicates the determined decimation pattern. Receiving device 104 may receive, from transmitting device 102, second error correction data and decimated video data. The decimated video data may comprise second encoded video data to which the decimation pattern has been applied. The second encoded video data is generated based on a second set of pictures of the video data. Receiving device 104 may apply the error correction process to modify the second encoded video data based on the second error correction data to generate second error-corrected encoded video data. Receiving device 104 may apply the decoding process to reconstruct the second set of pictures based on the second error-corrected encoded video data.

Figure 2:
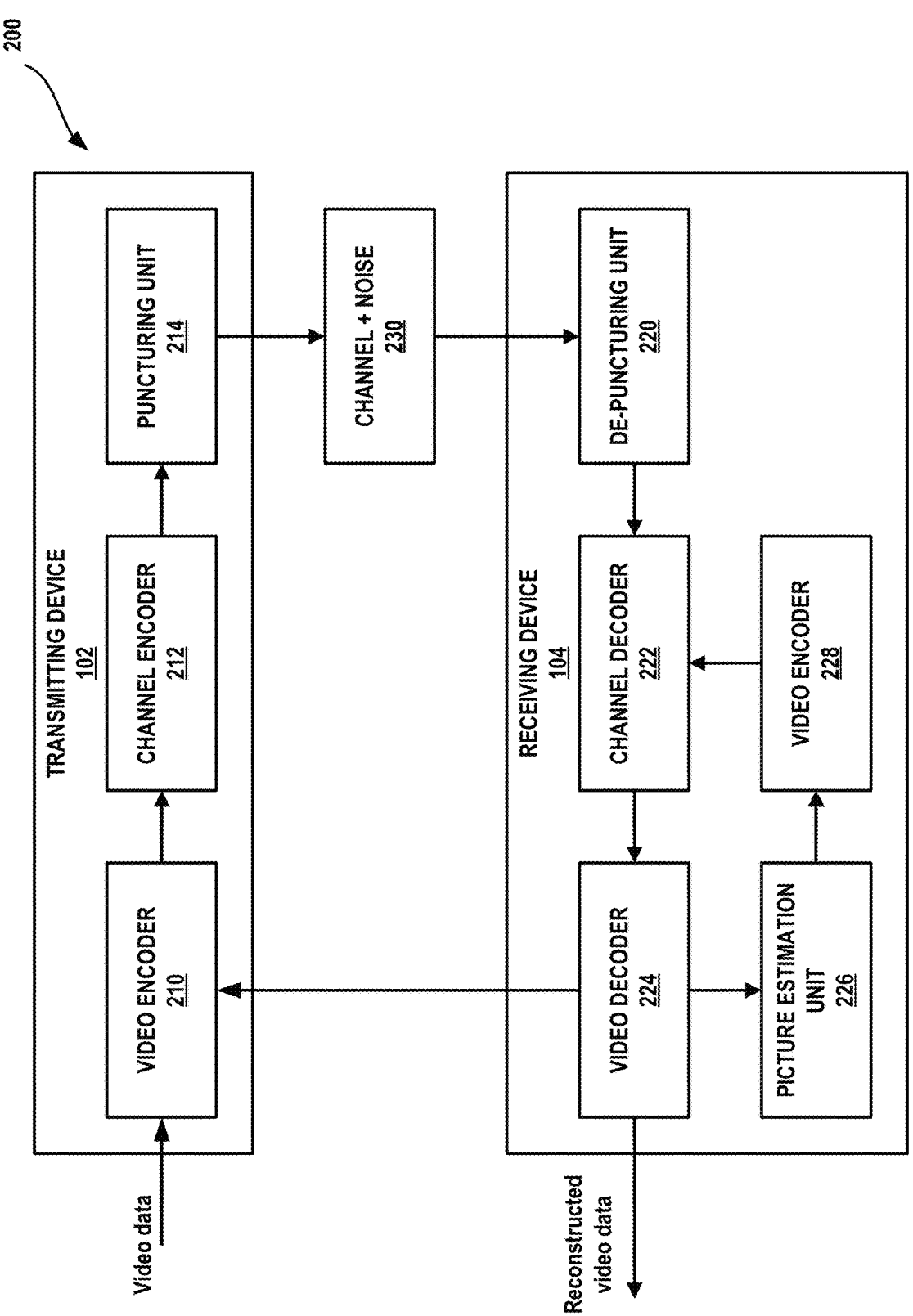
FIG. 2 is a block diagram illustrating example components of a transmitting device and a receiving device according to techniques of this disclosure.

FIG. 2 is a block diagram illustrating example components of a transmitting device and a receiving device according to techniques of this disclosure. System 200 includes transmitting device 102 and receiving device 104. Transmitting device 102 is configured to transmit encoded video data to receiving device 104. In the example of FIG. 2, transmitting device 102 includes a video encoder 210, a channel encoder 212, and a puncturing unit 214. Receiver device 104 includes a de-puncturing unit 220, a channel decoder 222, a video decoder 224, a picture estimation unit 226, and a video encoder 228. In other examples, transmitting device 102 and receiver device 104 may include more, fewer, or different units. Processors 114 (FIG. 1) of transmitting device 102 may implement video encoder 210, channel encoder 212, and puncturing unit 214. Processors 130 of receiving device 104 may implement de-puncturing unit 220, channel decoder 222, video decoder 224, picture estimation unit 226, and video encoder 228. Communication interface 118 (FIG. 1) may transmit and receive data on behalf of transmitting device 102. Communication interface 134 (FIG. 1) may transmit and receive data on behalf of receiving device 104.

Video encoder 210 of transmitting device 102 may receive video data from a video source (e.g., video source 120 (FIG. 1). The video data may include raw, unencoded video pictures, e.g., from video source 120. In some examples, a memory of transmitting device 102 (e.g., memory 116 (FIG. 1)) may store the video data. Video encoder 210 may perform a video encoding process on the video data to generate encoded video data. The video encoding process may be "limited" in the sense that the video encoding process may be relatively quick and consumes fewer resources than a more robust video compression process, such as H.264/AVC, H.265/HEVC, or H.266/ VVC. The video encoding process may not reduce the number of bits that represent the video data to the same extent as a more robust or full video encoding process.

Video encoder 210 may perform the limited video encoding process in one of a variety of ways. For instance, in some examples, video encoder 210 may perform a prediction process, such as an intra prediction process, on each picture of the video data to produce prediction data. Video encoder 210 may generate residual data based on the prediction data. For example, video encoder 210 may subtract samples of the prediction data from corresponding samples of the original pictures to determine samples of the residual data. A sample may be a value (such as a Y, Cb, or Cr value in a YCbCr color domain or a red, green, or blue value in an RGB color domain) indicating a color value.

Video encoder 210 may apply a transform, such as a discrete cosine transform (DCT), to the residual data to produce transform blocks that include transform coefficients. Additionally, video encoder 210 may quantize the transform coefficients. Video encoder 210 may apply entropy encoding, such as context adaptive binary arithmetic coding (CABAC) encoding or exponential Golomb-Rice coding to syntax elements representing the quantized transform coefficients. The encoded video data may include the entropy-encoded syntax elements. In some examples, video encoder 210 applies the transform and/or quantization directly to the video data without first using intra prediction. In some examples where video encoder 210 does not apply entropy encoding, the encoded video data includes the syntax elements representing quantized transform coefficients, non-quantized transform coefficients, or residual data.

In examples where video encoder 210 does not use inter picture prediction, fewer memory read requests may be needed as compared to a more robust video compression process that may need to read data regarding previously coded pictures from memory. Such memory read requests may be comparatively time and energy intensive.

In some examples where the video data is multiview video data, video encoder 210 may perform multiview video encoding to generate the prediction data. For example, video encoder 210 may use inter-view prediction to generate prediction data for blocks (e.g., macroblocks, coding units, etc.) of non-anchor pictures. In some instances, inter-view prediction may involve determining disparity vectors for the blocks that indicate lateral displacements between the blocks and corresponding blocks in pictures of one or more reference views.

Channel encoder 212 of transmitting device 102 may apply a channel encoding process to the encoded video data. The channel encoding process prepares the encoded video data for transmission on a wireless communication channel, such as channel 230. Channel 230 may be wireless sidelink channel 112 (FIG. 1) or another communication channel. The channel-encoded video data may include error correction data. Channel encoder 212 may generate the error correction data in various ways. For example, channel encoder 212 may generate the error correction data as convolutional codes or turbo codes. The error correction data may help receiving device 104 determine whether received encoded video data has been changed during transmission via channel 230 and may help receiving device 104 correct for such changes. A more detailed discussion of channel encoding and channel decoding is provided below with respect to FIG. 3.

Furthermore, in the example of FIG. 2, puncturing unit 214 of transmitted device 202 may apply a bit puncturing process to error correction data to generate bit-punctured error correction data. The bit puncturing process may reduce the number of bits in the error correction data. For example, puncturing unit 214 may perform an operation that removes bits from the error correction data according to a puncturing pattern.

Transmitting device 102 may transmit data, such as encoded video data and error correction data (e.g., bit-punctured error correction data), to receiving device 104 via channel 230. Channel 230 may introduce noise into the transmitted data. In some examples, channel 230 is a multipath channel and data transmitted in channel 230 may be time varying. Receiving device 104 may receive the noise-modified data. Receiving device 104 may store the noise-modified data at least temporarily in a memory, such as memory 132 (FIG. 1).

De-puncturing unit 220 may perform a de-puncturing operation on the received bit-punctured error correction data to reconstruct the error correction data. The de-puncturing operation may replace punctured symbols with neutral values as directed by the puncture pattern. The de-puncturing operation may generate erasure bits, which indicate the presence of neutral symbols in the error correction data.

Channel decoder 222 may apply a channel decoding process to generate error-corrected encoded video data based on the error correction data and encoded video data, such as encoded video data received from transmitting device and/or encoded video data generated by receiving device 104. For example, channel decoder 222 may change the values of bits encoded video data in accordance with any of a variety of error correction schemes, such low-density parity-check (LDPC) coding or forward error correction (FEC).

Video decoder 224 may perform a video decoding process to reconstruct pictures based on the error-corrected encoded video data. For example, video decoder 224 may apply an entropy decoding process to bits of the error-corrected encoded video data to obtain quantized transform coefficients. Video decoder 224 may apply an inverse quantization operation on the quantized transform coefficients, apply an inverse transform to the inverse quantized transform coefficients to generate residual data, generate prediction data to generate prediction data, and use the prediction data and the residual data to reconstruct the pictures of the video data. Video decoder 224 may generate the prediction data in the same manner as video encoder 210.

Picture estimation unit 226 may generate an estimate of a next picture of the video data. For example, picture estimation unit 226 may extrapolate the next picture from two or more previously reconstructed pictures. For instance, in this example, picture estimation unit 226 may partition a first previously reconstructed picture into blocks. For each block of the first previously reconstructed picture, picture estimation unit 226 may determine one or more corresponding blocks for the block in one or more additional previously reconstructed pictures. The corresponding blocks for the block may be the best available matches to the block. Picture estimation unit 226 may generate a prediction for the block based on the one or more corresponding blocks for the block. Picture estimation unit 226 may use uni-directional prediction or bi-directional prediction for generating the prediction. Thus, by generation a prediction for each block of the next picture, picture estimation unit 226 may generate an estimate of the next picture. In some examples, picture estimation unit 226 generate the next picture by applying global motion to a previously reconstructed picture.

In some examples, picture estimation unit 226 may re-encode a current picture that video decoder 224 has decoded. The next picture of the video data may be a picture that follows a picture in decoding order that video decoder 224 just decoded. In this example, picture estimation unit 226 may perform intra prediction or inter prediction on blocks of the current picture. When performing inter prediction on a block, picture estimation unit 226 may determine one or more motion vectors for the blocks. For instance, picture estimation unit 226 may determine that a specific block of the current picture has a motion vector having magnitude m relative to a reference block in a reference picture having a picture order count (POC) distance from the current picture of $p_1$. In this example, the current picture and the next picture may have a POC distance of $p_2$. Picture estimation unit 226 may determine a scale factor s as $p_2/p_1$. Picture estimation unit 226 may then scale the motion vector of the specific block by s(e.g., s*m). Picture estimation unit 226 may determine a location in the next picture indicated by the scaled motion vector and set the samples at the determined location to samples of the specific block of the current picture. Picture estimation unit 226 may repeat this process for each inter predicted block of the current picture.

In some examples, picture estimation unit 226 may apply one or more filters to the prediction data. For instance, picture estimation unit 226 may apply one or more deblocking filters, smoothing filters, adaptive loop filters, or other types of filters to the prediction data.

Video encoder 228 may perform the same limited video encoding process as video encoder 210 on the video data generated by picture estimation unit 226. For example, video encoder 228 may perform intra prediction to generation prediction data. Video encoder 228 may use the prediction data and the corresponding blocks of the video data generated by picture estimation unit 226 to generate residual data. Video encoder 228 may apply a transform (e.g., a DCT transform, DST transform, etc.) to the residual data to generate transform coefficients. Video encoder 228 may apply quantization to the transformed coefficients. Additionally, video encoder 228 may apply entropy encoding to syntax elements representing the transform coefficients.

Figures 3A, 3B:
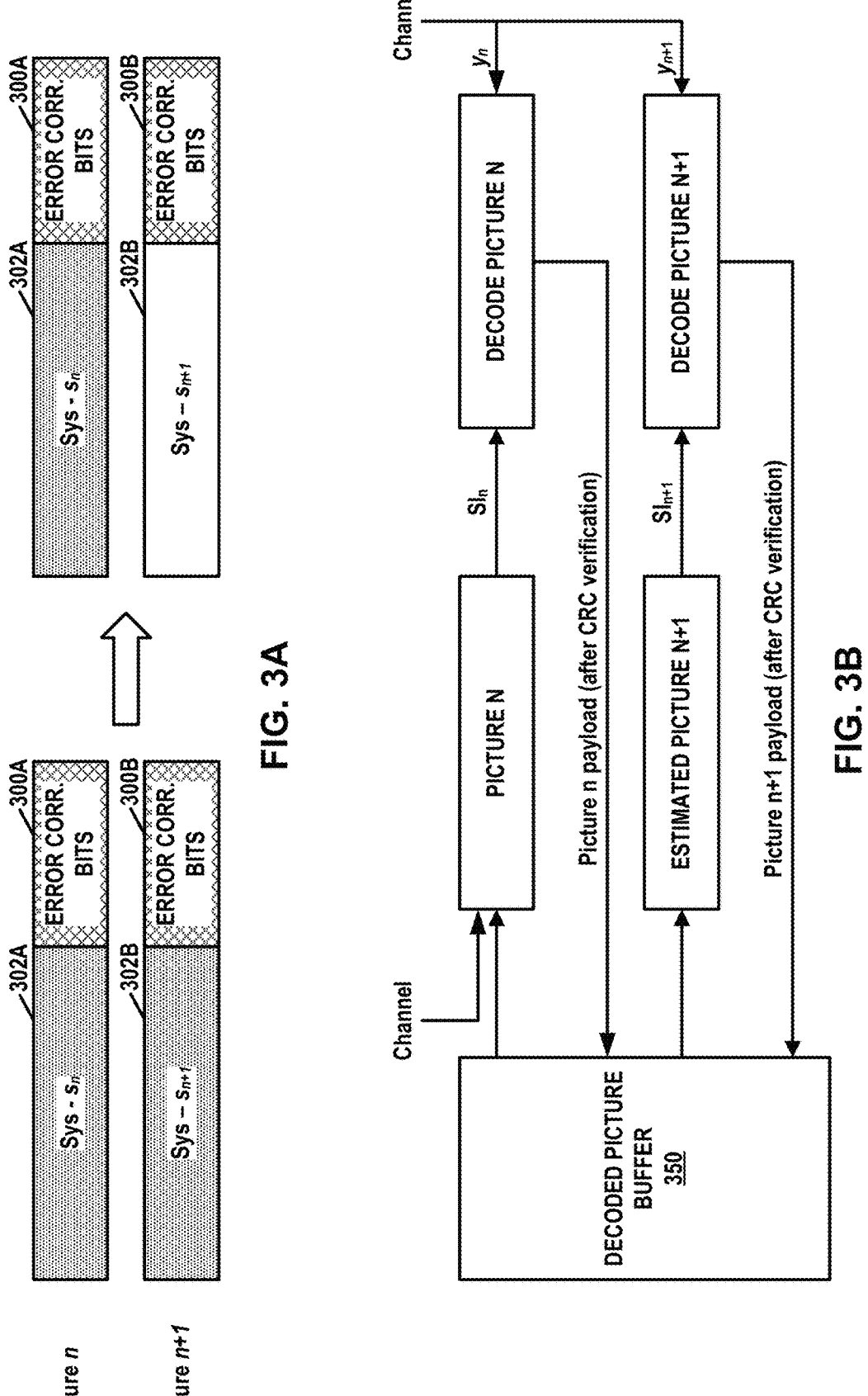
FIG. 3A is a conceptual diagram illustrating an example channel encoding process according to techniques of this disclosure.
FIG. 3B is a block diagram illustrating an example channel decoding process according to techniques of this disclosure.

As mentioned briefly above, channel decoder 222 may apply a channel decoding process to channel-encoded video data. FIG. 3A and FIG. 3B provide more information about the channel encoding process performed by channel encoder 212 and the channel decoding process performed by channel decoder 222.

Specifically, FIG. 3A is a block diagram illustrating an example channel encoding process according to techniques of this disclosure. For each picture of the encoded video data, channel encoder 212 of transmitting device 102 may apply a systematic coding operation, such as low-density parity-check (LDPC) coding operation, to systematic bits for a picture to generate error correction data for the picture. The systematic bits of the picture may include the encoded video data of the picture generated by video encoder 210.

In the example of FIG. 3A, error correction data is labeled "error corr.bits." For a picture n, channel encoder 212 may generate error correction data 300A based on systematic bits 302A. Similarly, for a picture n+1, channel encoder 212 may generate error correction data 300B based on systematic bits 302B. Channel encoder 212 may classify pictures of the video data as anchor video pictures and non-anchor pictures. Channel encoder 212 may classify the pictures such that anchor pictures occur on a periodic basis among the pictures. In some examples, channel encoder 212 may classify a picture as an anchor picture if channel decoder 222 receives an indication (e.g., from receiving device 104) that there is an error in the picture. For each of the anchor pictures, transmitting device 102 may transmit the encoded anchor picture and the error correction data for the anchor picture. However, for non-anchor pictures, transmitting device 102 may transmit only the error correction data for the non-anchor picture.

For instance, in the example of FIG. 3A, picture n may be an anchor picture and picture n+1 is a non-anchor picture. Accordingly, transmitting device 102 may transmit systematic bits 302A for picture n, error correction data 300A for picture n, and error correction data 300B for picture n+1, but not systematic bits 302B for picture n+1.

FIG. 3B is a block diagram illustrating an example channel decoding process according to techniques of this disclosure. As mentioned above, channel decoder 222 may perform a channel decoding process on encoded video data to reconstruct the encoded video data. When processing an anchor picture (e.g., picture n), channel decoder 222 may obtain systematic bits of the anchor picture (denoted SI, in FIG. 3B) and error correction data of the anchor picture (denoted y, in FIG. 3B) from de-puncturing unit 220. The systematic bits of the anchor picture may represent the encoded video data of the anchor picture. Channel decoder 222 may use the error correction data for the anchor picture to detect and/or correct errors in the systematic bits of the anchor picture. Video decoder 224 may use the resulting error-corrected encoded video data for the anchor picture to reconstruct the anchor picture. Receiving device 104 may store reconstructed pictures, including reconstructed anchor pictures and reconstructed non-anchor pictures in a decoded pictures buffer 350.

When processing a non-anchor picture, channel decoder 222 may obtain systematic bits (denoted $SI_{n+1}$) representing encoded video data of the non-anchor picture. Video encoder 228 of receiving device 104 may generate the encoded video data of the non-anchor picture based on video data generated by picture estimation unit 226. Channel decoder 222 may obtain the error correction data (denoted $y_{n+1}$ in FIG. 3B) for the non-anchor picture from de-puncturing unit 220. Channel decoder 222 may then perform the same channel decoding process that channel decoder 222 applied when processing an anchor picture. Thus, channel decoder 222 may use the error correction data of the non-anchor picture to detect and/or correct "errors" in the systematic bits for the non-anchor picture. However, the "errors" in the systematic bits for the non-anchor picture are not attributable to noise in channel 230 (as would be the case for errors in the systematic bits for anchor pictures. Rather, the "errors" in the systematic bits for the non-anchor picture may be due to differences between the predicted version of the non-anchor picture and the original version of the non-anchor picture. Thus, channel decoder 222 may use the transmitted error correction data for the non-anchor picture as a mechanism for "correcting" for prediction errors.

Video encoder 210 of transmitting device 102, video decoder 224 of receiving device 104, and video encoder 228 of receiving device 104 may perform video encoding processes and video decoding processes based on values of a set of one or more parameters. In other words, the values of the parameters may control various aspects of the video encoding process performed by video encoder 210 video encoder 228, and video decoder 224. In some examples, the parameters may include one or more of:

parameter indicating a color space (e.g., Red-Green-Blue, Y—Cb—Cr, etc.), pixel decimation parameters a parameter indicating a DCT size transmitted DCT coefficients a parameter indicating a number of bits per DCT coefficient quantization parameters (e.g., parameters indicating a quantization scheme, such as linear, Max-Lloyd, etc.)

Each of video encoder 210, video decoder 224, and video encoder 228 may need to use the same values of the parameters. Hence, in accordance with one or more techniques of this disclosure, transmitting device 102 may transmit values of the parameters to receiving device 104. Receiving device 104 may receive the transmitted values of the parameters. Video decoder 224 and video encoder 228 may use the values of the parameters in video decoding and video encoding processes.

In some examples, the transmitted values of the parameters are static or semi-static. For instance, in an example where the transmitted values of the parameters are static, transmitting device 102 may transmit the values of the parameters to receiving device 104 once and receiving device 104 may operate with the values of the parameters for an indefinite time period. In an example where the transmitted values of the parameters are semi-static, transmitting device 102 may occasionally update values of the parameters and retransmit the updated values of the parameters to receiving device 104.

Transmitting device 102 may transmit the values of the parameters in one of a variety of ways. For instance, in some examples, transmitting device 102 may transmit the values of the parameters to receiving device 104 using an Uplink Control Information (UCI)/Media Access Control-Control Element (MAC-CE) message, a Radio Resource Control (RRC) message, or another type of message.

In an example where transmitting device 102 transmits the values of the parameters to receiving device 104, video encoder 210 may segment each of the color components (e.g., R, G, and B components; Y, Cb, Cr components) of a picture of the video data into evenly sized (M×M) blocks. Examples of such blocks may include macroblocks (MBs) and largest coding units (LCUs). Video encoder 210 of transmitting device 102 may calculate a transform (e.g., a 2D-DCT) on each of the blocks, resulting in $M^2$ transform coefficients. Video encoder 210 may assign an ordering to the transform coefficients of the block. For instance, video encoder 210 may order the transform coefficients of the block according to a zigzag scanning order that starts from a most important transform coefficient (e.g., lowest frequency) and ends with a least important transform coefficient (e.g., highest frequency). Video encoder 210 may select the first Ne transform coefficients, where Ne is a parameter value indicating a quantity of transmitted transform coefficients. Video encoder 210 may discard the non-selected transform coefficients.

Additionally, video encoder 210 may quantize the selected transform coefficients. For example, where the selected transform coefficients have indexes i ranging from 0 to $N_c-1$, the parameters may include bit-width parameters (e.g., $B_i$, i=0, 1, . . . , $N_c-1$) corresponding to the different index values. For each of the selected transform coefficients $d_i$, video encoder 210 may quantize the selected transform coefficient $d_i$ using the following equation.

$$c_i = \text{round}(\alpha \ d_i \ B_i) \tag{1}$$

In the equation above, $c_i$ is the quantized version of transform coefficient $d_i$, $\alpha$ is a scaling constant, $B_i$ is the bit-width parameter for index i, and round is a function that rounds to the nearest integer. Thus, in an example where $B_0$ is 8, $B_1$ is 4, $B_2$ is 4, the quantized transform coefficients may be, for example, $c_0=00100011$, $c_1=0110$, $c_2=1001$, and so on.

Video encoder 228 of receiving device 104 may generate prediction data for the picture, generate residual data based on the prediction data, and apply one or more transforms to the residual data to generate transform blocks comprising transform coefficients. Video encoder 228 may need to use the same bit-width parameters as video encoder 210 so that the channel decoder 222 can correctly associate specific systematic bits with corresponding error correction data received from de-puncturing unit 220.

In some examples of this disclosure, receiving device 104 may determine values of one or more of the parameters without transmitting device 102 transmitting the values of these parameters to receiving device 104. Examples in which receiving device 104 determines values of one or more of the parameters without transmitting device 102 transmitting the values to receiving device 104 may enable a better compression-distortion tradeoff with lower control signaling overhead. For example, receiving device 104 may determine the number of DCT coefficients ($N_c$) without transmitting a value of $N_c$ to receiving device 104. For instance, in this example, receiving device 104 may determine the minimum value of $N_c$ that achieves a desired peak signal-to-noise ratio (P-SNR). In other words, receiving device 104 may determine the minimum value of $N_c$ that achieves the desired P-SNR as:

$$\hat{N}_c = \frac{\text{argmin}}{N_c} \frac{\sum_{i=0}^{N_c} |c_i|^2}{\sum_{j=N_c}^{M^2-1} |c_j|^2} > SNR_d \tag{2}$$

In the equation above, $c_i$ is a transform coefficient (e.g., a DCT coefficient) with index i, $SNR_d$ is the desired P-SNR, $M^2-1$ is largest the number of transform coefficients. In some examples, receiving device 104 may evaluate the number of transform coefficients (Ne) once per picture (or other segment) based on the robust prediction of the picture. Periodic reset of the values of the parameters may be applied to avoid error propagation.

In another example, receiving device 104 may determine numbers of quantization bits based on predicted pictures instead of receiving the numbers of quantization bits from transmitting device 102. For instance, in this example, receiving device 104 may calculate a probability distribution for quantized and unquantized coefficients:

$$p_{Q_i}(x) = \frac{1}{\#MBs} \sum_{MBs} (c_i == x), \ p_i(x) = \frac{1}{\#MBs} \sum_{MBs} (d_i == x) \tag{3}$$

In the equation above, $p_{Q_i}$ is the probability distribution for quantized coefficients, $p_i$ is the probability distribution for unquantized coefficients, $c_i$ is the quantized version of transform coefficient $d_i$.

Receiving device 104 may determine the number of quantization bits $B_i$ based on the entropy ratio of the quantized and non-quantized coefficients as follows:

$$B_i = \operatorname{argmin} \frac{\sum_x p_{Q_i}(x)\log(p_{Q_i}(x))}{\sum_x p_i(x)\log(p_i(x))} > \text{threshold} \qquad (4)$$

Receiving device 104 may therefore evaluate $B_i$ once per each picture (or segment) based on the prediction of the picture generated by picture estimation unit 226.

Figure 4:
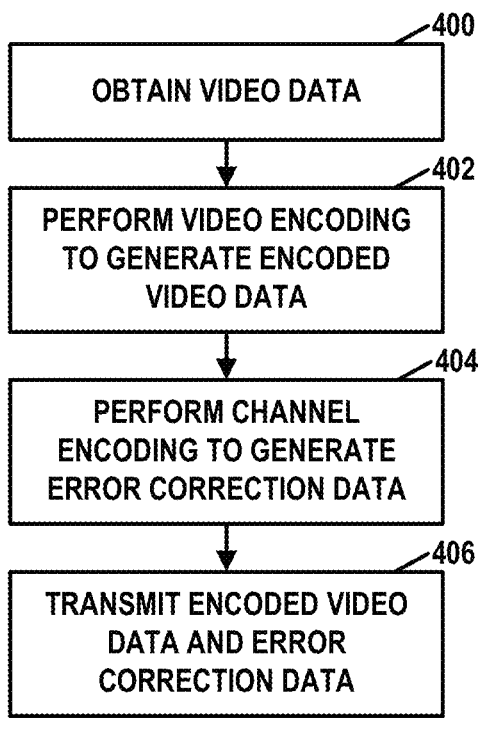
FIG. 4 is a flowchart illustrating an example operation of a transmitting device according to techniques of this disclosure.

FIG. 4 is a flowchart illustrating an example operation of transmitting device 102 according to techniques of this disclosure. In the example of FIG. 4, video encoder 210 of transmitting device 102 may obtain video data (400). For instance, video encoder 210 may obtain the video data from video source 120. Additionally, video encoder 210 may perform video encoding on the video data to generate encoded video data (402). For example, video encoder 210 may apply intra prediction to generate prediction data, generate residual data based on the prediction data and the original video data, and apply transforms (e.g., DCT) to blocks of the residual data to generate transform blocks. Video encoder 210 may quantize transform coefficients of the transform blocks. Furthermore, in some examples, video encoder 210 may apply entropy encoding to syntax elements representing the quantized transform coefficients. In some examples, video encoder 210 may implement a reconstruction loop that may apply entropy decoding, inverse quantization, and one or more inverse transforms to reconstruct the residual data. Video encoder 210 may apply use the prediction data and the reconstructed residual data to reconstruct the video data. In some examples, video encoder 210 applies one or more filters to the reconstructed video data, such as deblocking filters, adaptive loop filters, sample adaptive offset filters, and so on. Video encoder 210 may use the reconstructed video data as reference data for intra prediction.

Video encoder 210 may perform the video encoding process based on the values of one or more parameters. For example, video encoder 210 quantize transform coefficients according to the specific quantization parameters, use a particular color space, and so on.

Channel encoder 212 of transmitting device 102 may perform channel encoding on the encoded video data to generate error correction data (404). Transmitting device 102 may transmit the encoded video data and error correction data to receiving device 104, e.g., via channel 230 (406). In some examples, transmitting device 102 may selectively transmit parts of the encoded video data and transmit other parts of the encoded video data. For example, transmitting device 102 transmit encoded video data of some pictures and not transmit encoded video data of other pictures. In another example, transmitting device 102 may transmit encoded video data of some transform blocks of a picture and not encoded video data of other transform blocks of the picture. In some examples, transmitting device 102 may transmit a certain quantity of most significant bits of transform coefficients and not transmit less significant bits of the transform coefficients.

In some examples, transmitting device 102 may also transmit the values of one or more parameters to receiving device 104. The values of the parameters may control how receiving device 104 reconstructs the video data. For example, the parameters may include a transform size parameter that indicates a size of transform blocks in the encoded video data generated by video encoder 210. In this example, receiving device 104 may need to interpret the received encoded video data according to the same transform block size in order to properly reconstruct the video data. In other examples, the parameters may include a parameter indicating quantity of transform coefficients, bit-width parameters, and so on.

Thus, in the example of FIG. 4, transmitting device 102 may obtain video data from a video source. Transmitting device 102 may generate, based on a set of parameters, encoded video data of a first picture of the video data and encoded video data of a second picture of the video data. Transmitting device 102 may perform channel encoding on the encoded video data of the first picture and the encoded video data of the second picture to generate error correction data for the first picture and error correction data for the second picture. Transmitting device 102 may transmit the encoded video data of the first picture, error correction data for the first picture, and error correction data for the second picture. In some examples, transmitting device 102 may transmit, to receiving device 104, values of the parameters.

FIG. 5 is a flowchart illustrating an example operation of receiving device 104 according to techniques of this disclosure. In the example of FIG. 5, receiving device 104 may obtain, from transmitting device 102, first encoded video data and first error correction data (500). The first encoded data represents one or more blocks of a first picture of the video data. The first error correction data may provide error correction information regarding the blocks of the first picture.

Receiving device 104 may generate first error-corrected encoded video data using the first error correction data to perform an error correction operation on the first encoded video data (502). For example, channel decoder 222 of receiving device 104 may use the first error correction data to perform low-density parity-check (LDPC) coding on the first encoded video data. In other examples, channel decoder 222 may use the error correction data in other error correction algorithms, such as forward error correction (FEC) or turbo coding. Performing the error correction operation on the first encoded video data may remove errors introduced by noise in channel 230.

Video decoder 224 of receiving device 104 may perform a first reconstruction operation that reconstructs the blocks of the first picture based on the first error-corrected encoded video data (504). The first reconstruction operation is controlled by values of one or more parameters. For example, video decoder 224 may perform an inverse transform on transform blocks of the first error-corrected encoded video data to obtain residual data. Additionally, in this example, video decoder 224 may generate prediction data, e.g., using intra prediction. In this example, video decoder 224 may use the prediction data and the residual data to reconstruct the blocks of the first picture.

In some examples, video encoder 210 and video encoder 228 may generate the encoded video data using quantization parameters to quantize transform coefficients generated based on the prediction data for the picture. When performing the reconstruction operation, video decoder 224 may use the quantization parameters to inverse quantize transform coefficients of the error-corrected encoded video data. In some examples, transmitting device 102 and/or receiving device 104 may calculate the quantization parameters based on an entropy ratio of quantized transform coefficients and unquantized transform coefficients, e.g., as described above.

In some examples, the parameters include a transform size parameter. As part of generating encoded video data, video encoder 210 and video encoder 228 may apply, to sample domain data (e.g., predicted sample data or residual data) of a picture, a forward transform having a transform size indicated by the transform size parameter. As part of performing the reconstruction operation, video decoder 224 may apply, to transform coefficients of the error-corrected encoded video data, an inverse transform having the transform size indicated by the transform size parameter.

In some examples, the parameters include a parameter that indicates a quantity of transform coefficients. As part of generating encoded video data, video encoder 210 and video encoder 228 may include in the encoded video data, a set of transform coefficients that includes the indicated quantity of transform coefficients. When performing the reconstruction operation, video decoder 224 may parse, from the error-corrected encoded video data, a set of transform coefficients that includes the indicated quantity of transform coefficients. Furthermore, in some examples, receiving device 104 may receive the encoded video data and the error correction data from the transmitting device via a communication channel, receiving device 104 may apply an optimization process that determines the number of transform coefficients based on a signal-to-noise ratio of data transmitted on the communication channel, e.g., as discussed above.

In some examples, the parameters include bit-width parameters for a plurality of index values. For each respective index value of the plurality of index values, performing the reconstruction operation may comprise parsing a first set of bits from the error-corrected encoded video data. The first set of bits may indicate a transform coefficient having the respective index value and a quantity of bits in the first set of bits is equal to a bit-width indicated by the bit-width parameter for the respective index value. As part of generating the encoded video data, video encoder 210 and video encoder 228 may include a second set of bits in the encoded video data. The second set of bits may indicate a transform coefficient having the respective index value and the quantity of bits in the second set of bits is equal to the bit-width indicated by the bit-width parameter for the respective index value. Video decoder 224 may parse a third set of bits from the error-corrected encoded video data. The third set of bits may indicate a transform coefficient having the respective index value and a quantity of bits in the third set of bits is equal to the bit-width indicated by the bit-width parameter for the respective index value.

Other parameters may include one or more of: a color space, a transform size, quantization parameters, a number of transform coefficients in the first encoded video data, or a number of bits per transform coefficient in the first encoded video data.

Receiving device 104 may obtain second error correction data from transmitting device 102 (506). The second error correction data provides error correction information regarding one or more blocks of a second picture of the video data.

Additionally, picture estimation unit 226 of receiving device 104 may estimate the second picture based on one or more previously reconstructed pictures, such as the first picture (508). The estimated second picture includes predictions of the blocks of the second picture of the video data based at least in part on the blocks of the first picture. For example, picture estimation unit 226 may generate the prediction data using perform inter prediction, a combination of intra and inter prediction, or other video coding tools, e.g., as described elsewhere in this disclosure.

Video encoder 228 of receiving device 104 may generate second encoded video data based on the estimated second picture (510). For example, video encoder 228 of receiving device 104 may generate residual data based on the prediction data. For instance, video encoder 228 may perform intra prediction to generate second prediction data based on the estimated second picture. Video encoder 228 may then generate residual data by subtracting the second prediction data from the prediction data generated by picture estimation unit 226. Video encoder 228 may then generate transform blocks by applying one or more forward transforms to the residual data. Video encoder 228 may perform the same process and video encoder 210 of transmitting device 102 and accordingly may need to use the same parameters as video encoder 210.

Channel decoder 222 of receiving device 104 may perform the channel decoding process to generate second error-corrected encoded video data based on the second error correction data and the second encoded video data (512). Channel decoder 222 of receiving device 104 may perform the same process to generate the second error-corrected encoded video data as channel decoder 222 performed when generating the first error-corrected encoded video data.

Video decoder 224 of receiving device 104 may perform a second video decoding process to reconstruct the blocks of the second picture based on the second error-corrected encoded video data (514). The second reconstruction operation is controlled by the values of the parameters. Video decoder 224 may perform the second reconstruction operation in the same way as the first reconstruction operation. In this way, receiving device 104 may reconstruct video data of pictures (or blocks), without receiving all of the encoded video data of each of the pictures (or blocks).

As noted above, puncturing unit 214 of transmitting device 102 may perform a bit puncturing operation on the error correction data generated by channel encoder 212. Bit puncturing involves selectively discarding some of the error correction data before transmitting device 102 transmits the error correction data. The discarded bits are typically the least important for performing error correction. De-puncturing unit 220 of receiving device 104 may perform an inverse bit puncturing operation (i.e., a bit de-puncturing operation) that reverses the bit puncturing operation performed by puncturing unit 214. Puncturing unit 214 may perform the bit puncturing operation according to a set of one or more puncturing parameters. In different examples, the puncturing parameters may be predefined, static, or semi-static.

In accordance with one or more techniques of this disclosure, transmitting device 102 may perform a decimation procedure that may reduce memory bandwidth and may enhance compression. For example, video encoder 210 of transmitting device 102 may segment a picture of the video data into a grid of blocks (e.g., MBs, LCUs, etc.) and may generate transform blocks for each of the blocks. Transmitting device 102 may need to store to memory (e.g., memory 116) each transform block destined for transmission to receiving device 104. Transmitting device 102 may then retrieve the stored transform blocks from memory for channel encoding and ultimately for transmission. These writes to memory and reads from memory may increase time and energy requirements. These time and energy requirements may be directly related to the amount of data to be written and read. Accordingly, it may be advantageous to reduce the amount of data to be written to and read from memory.

Performing a decimation process may reduce the amount of data in transform blocks written to and read from memory. Performing the decimation process may also reduce the amount of data transmitted by transmitting device 102 to receiving device 104. In some examples, when video encoder 210 is encoding a current block of a current picture, video encoder 210 may generate a transform block for the current block. Additionally, channel encoder 212 of transmitting device 102 may determine, based on a decimation pattern, whether the current block is targeted for decimation. If the current block is targeted for decimation (i.e., the transform block is a "non-anchor transform block"), channel encoder 212 may the reduce the number of bits in the non-anchor transform block prior to storing the transform block to memory. If the current block is not targeted for decimation (i.e., the transform block is an "anchor block"), channel encoder 212 does not reduce the number of bits in the anchor block. Channel encoder 212 may perform the decimation process after generating the error correction data. Thus, the error correction data generated by channel encoder 212 (and potentially transmitted to receiving device 104) for non-anchor transform blocks may be based on the full set of bits of the transform blocks instead of the reduced number of bits.

Figure 6:
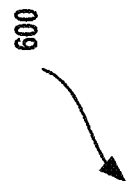
FIG. 6 is a conceptual diagram illustrating an example decimation pattern according to techniques of this disclosure.

FIG. 6 is a conceptual diagram illustrating an example decimation pattern 600 according to techniques of this disclosure. The example of FIG. 6 shows a grid of DCT blocks. A DCT block is a block of transform coefficients generated by applying a DCT transforms to video data, such as residual data or sample data. In other examples, the DCT blocks may be transform blocks generated using other types of transforms. In FIG. 6, "X" marks in decimation pattern 600 indicate DCT blocks targeted for decimation (i.e., non-anchor transform blocks). Thus, in the example of FIG. 6, decimation pattern 600 decimates the DCT blocks by 2 in the horizontal and vertical directions. In some examples, which may be referred to herein as "full" decimation, video encoder 210 may reduce the number of bits in the non-anchor transform block to zero.

Thus, in some examples, a decimation pattern defines a pattern of anchor transform blocks and non-anchor transform blocks in the picture. Receiving device 104 may receive systemic bits of the anchor transform blocks and not systemic bits of the non-anchor transform blocks. The systemic bits of the anchor transform blocks may represent transform coefficients in the anchor transform blocks. The systemic bits of the non-anchor transform blocks may represent reduced bit depth versions of original transform coefficients in the non-anchor transform blocks. The error correction data may include error correction data for the anchor transform blocks and error correction data for the non-anchor transform blocks. The error correction data for the non-anchor transform blocks are based on the original transform coefficients in the non-anchor transform blocks. As part of generating the error-corrected encoded video data, channel decoder 222 may use the error correction data for the anchor transform blocks to perform error correction on the systemic bits of the anchor transform blocks. Channel decoder 222 may use the error correction data for the non-anchor transform blocks to perform error correction on portions of the encoded video data corresponding to the non-anchor transform blocks. In some examples, receiving device 104 may determine the decimation pattern and send the decimation pattern to transmitting device 102.

In some examples, transmitting device 102 stores encoded bits (encoded video data and error correction data) in a cyclic buffer. Transmitting device 102 uses two parameters to select which bits in the cyclic buffer to transmit. The first parameter is a starting position and the second parameter indicates a number of consecutive bits to transmit. The starting position can only have a variety of values on order to support the selective transmission and non-transmission of system bits. The starting positions may be selected to skip transmission of specific systematic bits (i.e., bits of encoded video data) without skipping transmitting of error correction data. Thus, the decimation of non-anchor transform blocks may be accomplished simply by manipulating the first parameter and second parameter such that transmitting device 102 does not transmit bits of the non-anchor transform blocks.

In some examples, channel encoder 212 applies a hybrid decimation approach that does not reduce the number of bits in any of the targeted "non-anchor" transform blocks to zero but does reduce the number of bits in transform coefficients in the non-anchor transform blocks. For instance, in the example of FIG. 6, channel encoder 212 may reduce the number of bits in each transform coefficients in the "X"-marked DCT blocks by a predetermined number (e.g., 2, 4, 5, etc.). Channel encoder 212 does not reduce the number of bits of transform coefficients not targeted by the decimation pattern.

Channel decoder 222 of receiving device 104 may receive the remaining, reduced bits of the non-anchor transform blocks and the error correction data for the non-anchor transform blocks. As part of the channel decoding process, channel decoder 222 may use the error correction data for the non-anchor transform blocks to perform an error correction process that restores the bits of the non-anchor transform blocks that were removed. This error correction process may be the same error correction process that channel decoder 222 uses to correct errors introduced by noise in channel 230. To summarize, channel encoder 212 generates the error correction data because the error correction data are going to be needed to correct for the inevitable noise in channel 230, but these same error correction data are used for restoring bits as if the noise in channel 230 just so happened to corrupt the least significant bits of particular transform coefficients in particular transform blocks in particular pictures. Thus, the number of bits sent in channel 230 may effectively be reduced.

In some examples, channel encoder 212 may generate a correlation matrix based on a set of transform blocks of a picture prior to performing any decimation process on any non-anchor transform blocks in the set of transform blocks. The correlation matrix includes values that indicate a level of correlation between transform coefficients at corresponding positions within the transform blocks. For example, the correlation matrix may include a correlation value for the DC transform coefficients (i.e., top-left transform coefficients) of the set of transform blocks. If differences between the DC transform coefficients are relatively small, the correlation value for the DC transform coefficients may be relatively high. Conversely, if differences between the DC transform coefficients are relatively great, the correlation value for the DC transform coefficients may be relatively small. Each of the correlation values may be a value between 0 and 1.

In some examples, channel encoder 212 may calculate a correlation value for the DC transform coefficients using the following formula:

$$R_{yy}(l) = \lim_{N \to \infty} \frac{1}{N} y(n)\overline{y(n-l)} \qquad (5)$$

In equation (5) above, I represents the spacing between the transform blocks containing the DC coefficients and N represents the number of transform block the calculation is performed on. The function y is the transform coefficient. The line above the y represents conjugate. If each consecutive transform block is used, the spacing may be 1, if alternating transform blocks are used, the spacing may be 2, and so on. Channel encoder 212 may calculate correlation values for corresponding AC transform coefficients (i.e., non-DC transform coefficients) in the same way. In this disclosure, corresponding transform coefficients occupy the same locations within transform blocks. Thus, by calculating an autocorrelation value for each transform coefficient in a transform block, channel encoder 212 may generate a correlation matrix for the transform block. Channel encoder 212 may repeat the process of generating correlation matrixes for each transform block because channel encoder 212 will use transform coefficients from different transform blocks when calculating the correlation values.

Transmitting device 102 may transmit the correlation matrixes to receiving device 104 along with encoded video data and error correction data. Channel decoder 222 of receiving device 104 may use the correlation matrixes as part of the process to restore non-anchor transform blocks their original bit-widths. For instance, continuing the example of the DC transform coefficients, after applying the error correction process, channel decoder 222 may obtain a value of a non-anchor DC transform coefficient (i.e., a DC transform coefficient in a non-anchor transform block).

The error correction process may use the correlation value to estimate a non-anchor transform coefficient. For example, if we have all the even transform blocks as anchor transform blocks and non-even transform blocks as non-anchor transform blocks, channel decoder 222 may estimate the value of a non-anchor transform coefficient in transform block n by:

$$y[n] = (R_{yy}[1] * y[n+1] + R_{yy}[3] * y[n+3] + R_{yy}[3] * y[n+5] \dots )/ \qquad (6)$$
$$(R_{yy}[1] + R_{yy}[3] + R_{yy}[3] \dots )$$

In equation (6) above, $R_{yy}[1]$ indicates the correlation value in the correlation matrix for a transform block with index 1 (i.e., a non-even, non-anchor transform block), y[n+1] indicates a corresponding transform coefficient in an anchor transform block with index n+1. $R_{yy}[2]$ indicates a correlation value in the correlation matrix for a transform block with index 3, y[n+3] indicates a corresponding transform coefficient in an anchor transform block is index n+3, and so on. The number of transform blocks used in equation (6) may be configurable. In this way, the estimated values of a non-anchor transform coefficient may be considered to be a weighted average of corresponding transform coefficients in the anchor blocks weighted based on the correlation values in corresponding locations in the correlation matrices. In other words, channel decoder 222 may interpolate the value of the non-anchor transform coefficient according to the correlation matrices. Channel decoder 222 may output the calculated values of transform coefficients to video decoder 224. Channel decoder 222 may perform this process for other transform coefficients. Using correlation matrices in this way may improve the quality of the reconstructed video data.

In some examples, video encoder 210 may reduce the bit-widths of each transform coefficient in a targeted transform block by the same amount. In other examples, video encoder 210 may reduce the bit-widths of different transform coefficients in a target transform block by different amounts. In some examples, the amount by which video encoder 210 reduces the bit-width of a transform coefficient is related to a distance of the transform coefficient from an anchor transform block. An anchor transform block is a transform block not targeted by the decimation pattern.

FIG. 7 is a flowchart illustrating an example operation of transmitting device 102 for hybrid decimation of transform blocks according to techniques of this disclosure. In the example of FIG. 7, transmitting device 102 may obtain video data from video source 120 (FIG. 7) (700). Video encoder 210 of transmitting device 102 may generate transform blocks based on the video data (702). For example, video encoder 210 may generate prediction blocks by performing intra prediction on blocks of a picture of the video data. Video encoder 210 may use the prediction blocks to generate residual data. Video encoder 210 may generate transform blocks by applying a transform, such as a DCT, DST, or other transform, to the residual data. In other examples, video encoder 210 may generate the transform blocks by apply the transform directly to blocks of the video data.

Channel encoder 212 may then determine, based on a decimation pattern, which of the transform blocks are anchor transform blocks (704). For instance, in an example where channel encoder 212 uses the decimation pattern 600 of FIG. 6, video encoder 210 may determine that every other transform block in both the horizontal and vertical directions are anchor transform blocks. In other examples, channel encoder 212 may use other decimation patterns to determine which of the transform blocks are anchor transform blocks. Channel encoder 212 may store the anchor transform blocks to a memory of transmitting device 102 (e.g., memory 116 (FIG. 1)) (706).

Channel encoder 212 may calculate correlation matrixes for transform block sets (708). Each transform block set includes one or more anchor transform blocks and one or more non-anchor transform blocks. For example, each transform block set may correspond to a different row of transform blocks in FIG. 6. In another example, each transform block set may correspond to a group of 2 transform blocks by 2 transform blocks. The number of values in the correlation matrix for a transform block set is the same as the number of transform coefficients in each of the transform blocks individually. Each value in the correlation matrix corresponds to a different position within a transform coefficient block. For example, a value in position (0,0) of the correlation matrix corresponds to the transform coefficients at position (0,0) of each transform coefficient block in the transform block set, a value in position (0,1) of the correlation matrix corresponds to the transform coefficients at position (0,1) of each transform coefficient block in the transform block set, and so on. The transform coefficients at position (0,0) of the transform coefficient blocks may be referred to as DC coefficients and all other transform coefficients may be referred to as AC coefficients.

Additionally, channel encoder 212 may generate bit-reduced non-anchor transform matrixes (710). The non-anchor transform matrixes are transform matrixes other than the anchor transform matrixes. For instance, with reference to FIG. 6, the transform matrices marked with X may be non-anchor transform matrices. Transform coefficients in the bit-reduced non-anchor transform matrices may include fewer bits than in original versions of the non-anchor transform matrices. Transmitting device 102 may then transmit the anchor transform blocks, non-anchor transform blocks, bit reduction value, correlation matrices, and error correction data (712).

Channel encoder 212 may reduce the bits in the non-anchor transform coefficients in one of a variety of ways. For example, channel encoder 212 may determine a bit reduction value for each transform coefficient in the non-anchor transform coefficient block. In this example, to calculate the bit reduction value, channel encoder 212 may calculate an interpolated value of a transform coefficient according to the correlation matrices. Channel encoder 212 may calculate the interpolated value using equation (6), above. Channel encoder 212 may then subtract the interpolated value of the transform coefficient from the original value of the transform coefficient to calculate a first distortion value. Channel encoder 212 may then reduce the number of bits of the original value of the transform coefficient by one. Channel encoder 212 may subtract the interpolated value from the reduced-bit original value of the transform coefficient to calculate a second distortion value. Channel encoder 212 may determine, based on the first distortion value and the second distortion value, whether the second distortion value is acceptable. For example, channel encoder 212 may calculate a mean or max squared error from the interpolated value. Channel encoder 212 may determine that the second distortion value is acceptable by comparing the second distortion value to a predefined threshold.

If the second distortion value is acceptable, channel encoder 212 may reduce the number of bits of the original value of the transform coefficient value and repeat the process. If the second distortion value is not acceptable, channel encoder 212 may increase the number of bits of original value of the transform coefficient. The resulting number of bits by which the original value of the transform coefficient is reduced is the bit reduction value.

In some examples, channel encoder 212 may determine a bit reduction value for the non-anchor transform coefficient block as a whole. In this example, to calculate the bit reduction value for a transform coefficient blocks, channel encoder 212 may calculate an interpolated value of each transform coefficient according to the correlation matrices, e.g., as described above. Video encoder 210 may then subtract the interpolated values of the transform coefficients from the original values of the transform coefficient and use the resulting differences to calculate a first distortion value. For instance, video encoder 210 may calculate the first distortion value as a mean square error. Video encoder 210 may then reduce the number of bits of the original values of each of the transform coefficients by one. Video encoder 210 may subtract the interpolated values from the reduced-bit original values of the transform coefficient and use the resulting values to calculate a second distortion value (e.g., using mean square error). Channel encoder 212 may determine, based on the first distortion value and the second distortion value, whether the second distortion value is acceptable. If the second distortion value is acceptable, video encoder 210 may reduce the number of bits of the original values of the transform coefficient value again and repeat the process. If the second distortion value is not acceptable, video encoder 210 may increase the number of bits of original value of the transform coefficient. The resulting number of bits by which the original value of the transform coefficient is reduced is the bit reduction value.

Thus, in some examples, transmitting device 102 may obtain video data from a video source. Transmitting device 102 may generate transform blocks based on the video data. Transmitting device 102 may determine which of the transform blocks are anchor transform blocks. Transmitting device 102 may calculate a correlation matrix for a transform block set. Additionally, transmitting device 102 may generate bit-reduced non-anchor transform matrixes. Transmitting device 102 may transmit the anchor transform blocks, the non-anchor transform blocks, and the correlation matrix to a receiving device. In some examples, transmitting device 102 may receive an indication of the decimation pattern from receiving device 104.

FIG. 8 is a flowchart illustrating an example operation of receiving device 104 for hybrid decimation of transform blocks according to techniques of this disclosure. In the example of FIG. 8, receiving device 104 may receive anchor transform blocks, non-anchor transform blocks, one or more bit reduction values, and correlation matrices for the non-anchor blocks (800).

Furthermore, in the example of FIG. 8, channel decoder 222 of receiving device 104 may calculate an interpolated value of a current non-anchor transform coefficient (802). The current non-anchor transform coefficient is a transform coefficient of one of the non-anchor transform blocks. Channel decoder 222 may calculate the interpolated value of the current non-anchor transform coefficient based on the correlation matrix for the non-anchor blocks. Channel decoder 222 may calculate the interpolated value of the current non-anchor transform coefficient in one of a variety of ways. For instance, in some examples, channel decoder 222 may apply a machine-learned model that takes one or more non-anchor transform coefficients (including the current non-anchor transform coefficient), one or more anchor transform coefficients, and the correlation matrix for the non-anchor transform coefficient block as input. In this example, the machine-learned model may output the interpolated value of the current non-anchor transform coefficient. In this example, the machine learned model may be implemented as a neural network model, a support vector machine, a regression model, or another type of machine learned model.

In another example, the correlation matrices may include values indicating correlation between the current non-anchor transform coefficient and each corresponding anchor transform coefficient in one or more anchor transform coefficient blocks. Video decoder 224 may calculate the interpolated value of the current non-anchor transform coefficient as:

$$t_{int} = \frac{1}{n}\sum_i^n c_i a_i \qquad (7)$$

In the equation above, $t_{int}$ is the current non-anchor transform coefficient, $a_i$ is an anchor transform coefficient, $c_i$ is a correlation value indicating a correlation between the current non-anchor transform coefficient and $a_i$, n indicates a number of anchor transform coefficients from which the current non-anchor transform coefficient is derived. In this example, the values of $c_0$ to $c_n$ may add up to 1.

Additionally, video decoder 224 may calculate a reconstructed value of the non-anchor transform coefficient (804). Video decoder 224 may calculate the reconstructed value of the non-anchor transform coefficient based on the interpolated value of the current non-anchor transform coefficient and a transmitted value of the non-anchor transform coefficient. The transmitted value of the non-anchor transform coefficient is included in the received non-anchor transform blocks. In some examples, video decoder 224 calculates the reconstructed value of the non-anchor transform coefficient as an average of the interpolated value of the current non-anchor transform coefficient and the transmitted value of the non-anchor transform coefficient.

Video decoder 224 may determine whether there are any remaining non-anchor transform coefficients in the non-anchor transform blocks (806). If there are one or more remaining non-anchor transform coefficients in the non-anchor transform blocks ("YES" branch of 806), video decoder 224 may repeat steps 802-806 with another of the non-anchor transform coefficients. Video decoder 224 may continue to do so until there are no remaining non-anchor transform coefficients ("NO" branch of 806). In this way, video decoder 224 may calculate reconstructed values for each of the non-anchor transform coefficients.

In this way, receiving device 104 may receive systemic bits of the anchor transform blocks, systemic bits of the non-anchor transform blocks, and a correlation matrix. The systemic bits of the anchor transform blocks may represent transform coefficients in the anchor transform blocks. The systemic bits of the non-anchor transform blocks may represent reduced bit depth versions of original transform coefficients in the non-anchor transform blocks. As part of performing the reconstruction operation, receiving device 104 may, for each non-anchor transform coefficient in the non-anchor transform blocks, calculate an interpolated value of the non-anchor transform coefficient based on the correlation matrix and a corresponding anchor transform coefficient. Receiving device 104 may calculate, at the receiving device, a reconstructed value of the non-anchor transform coefficient based on the interpolated value of the non-anchor transform coefficient and a value of the non-anchor transform coefficient in the error-corrected encoded video data.

In some examples, receiving device 104 may adaptively select the decimation pattern used for reducing or eliminating bits of particular transform blocks. In such examples, receiving device 104 may communicate the selected decimation pattern back to transmitting device 102. Transmitting device 102 may then use the selected decimation pattern in one or more pictures of the video data.

FIG. 9 is a conceptual diagram illustrating an example decimation pattern 900 adaptively selected by receiving device 104 according to one or more techniques of this disclosure. In contrast to the decimation pattern 600 of FIG. 6, non-anchor blocks in decimation pattern 900 do not necessarily occur at regular spacings or intervals.

Receiving device 104 may determine a decimation pattern based on information about previous pictures of the video data. The previous pictures may or may not have been decimated. In some examples, receiving device 104 may send a request to transmitting device 102 for an undecimated version of a picture. Transmitting device 102 may send the undecimated version of the picture to receiving device 104 in response to the request. After receiving the undecimated version of the picture, receiving device 104 may determine a decimation pattern based on the undecimated version of the picture. For example, receiving device 104 may perform a rate-distortion optimization process that evaluates multiple potential decimation patterns in order to identify which of the decimation patterns results in a best combination of bit rate and distortion.

In some examples, transmitting device 102 and receiving device 104 may continue using a selected decimation pattern for a predetermined number of pictures, after which transmitting device 102 and/or receiving device 104 may adaptively select another decimation pattern. In some examples, transmitting device 102 may send a message to receiving device 104 requesting transmitting device 102 select another decimation pattern. In some examples, receiving device 104 may determine that an event or condition has occurred that would make selecting another decimation pattern advantageous. For instance, receiving device 104 may determine that it may be advantageous to select another decimation pattern when receiving device 104 determines that a scene change has occurred, that motion in the video data has crossed one or more thresholds, or other characteristics of the video data have changed.

Receiving device 104 may signal a selected decimation pattern to transmitting device 102 in one of a variety of ways. For example, receiving device 104 may signal the selected decimation scheme to transmitting device 102 by indicating differences from an existing decimation scheme, such as the decimation scheme currently in use. For instance, in this example, receiving device 104 may indicate the selected decimation scheme to transmitting device 102 by specifying a change in down-sampling or up-sampling along specific axes, specifying changes in specific regions of pictures, eliminating specific transform blocks, enabling specific transform blocks, and so on.

In some examples, there may be a predefined mapping of index values to predefined decimation patterns. In such examples, receiving device 104 may select a decimation pattern from among the predefined decimation patterns and signal an index value of the selected decimation pattern to transmitting device 102.

Figure 10:
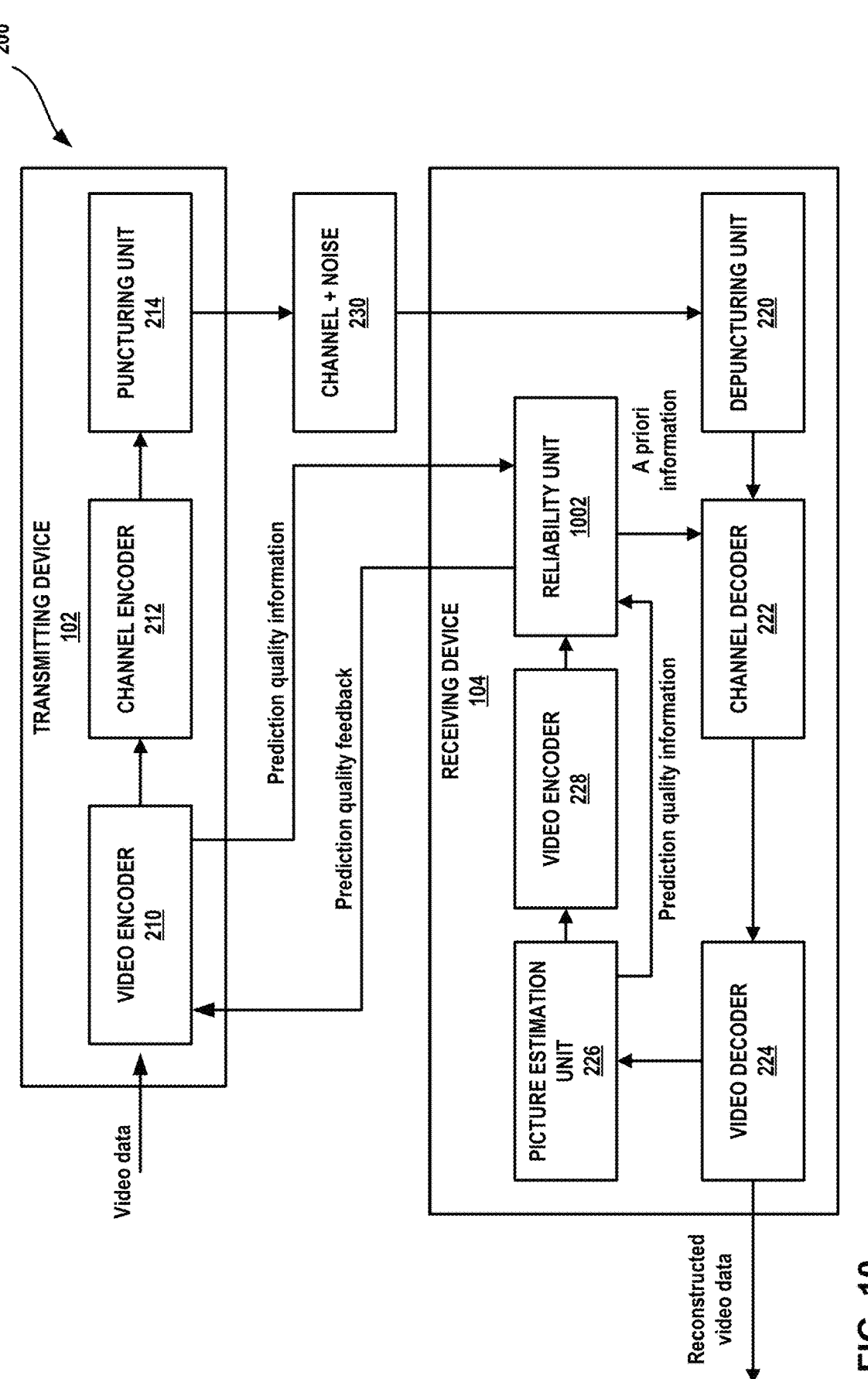
FIG. 10 is a block diagram illustrating example components of a transmitting device and a receiving device according to techniques of this disclosure.

FIG. 10 is a block diagram illustrating example components of a transmitting device and a receiving device according to techniques of this disclosure. In the example of FIG. 10, transmitting device 102 may include the same components as shown in FIG. 2. However, in the example of FIG. 10, receiving device 104 may additionally include a reliability unit 1002. Unless otherwise noted, similarly named components of transmitting device 102 and receiving device 104 in FIG. 2 and FIG. 10 perform the same function.

In general, it may be easier to accurately predict more-significant bits (MSBs) of transform coefficients than less-significant bits (LSBs) of transform coefficients. This is because MSBs translate to higher Euclidean distance in the video picture domain. Additionally, blocks of video pictures that experience high motion may be harder to accurately predict than blocks that are in low-motion regions.

According to one or more techniques of this disclosure, transmitting device 102 and receiving device 104 may implement a system in which bit-level reliability values are used. Use of the bit-level reliability values may enable transmitting device 102 and receiving device 104 to correctly weigh a priori information. This may result in an increase in system performance (e.g., a decrease in the amount of transmitted data and/or increased video quality). For example, decoding performance may be improved if "soft" information is used. In other words, when receiving device 104 is "informed" with the reliability of each bit (what is the a-priori probability the bit value is '0' or '1'), receiving device 104 can make use of this information and the performance may be improved.

In the example of FIG. 10, reliability unit 1002 of receiving device 104 receives encoded video data from video encoder 228 of receiving device 104. The encoded video data may include transform coefficients of transform blocks of the video data. Additionally, in some examples, reliability unit 1002 receives prediction quality information from picture estimation unit 226 of receiving device 104.

In a constant scaling process, for each bit position of the transform coefficients of a transform block, the prediction quality information includes a reliability value for the bit position. For example, the most significant bits of the transform coefficients have a first reliability value, the second most-significant bits of the transform coefficients have a second reliability value, the third most-significant bits of the transform coefficients have a third reliability value, and so on. The reliability value for a bit position is a measure of how likely a bit at the bit position is to have an erroneous value. For example, the bit at a bit position may have an erroneous value when the bit value is predicted '0' but the actual value is '1' or the bit is predicted '1' but the actual value is '0'.

Picture estimation unit 226 may determine the reliability value of a bit position by collecting statistics regarding rates of errors that occur in bits at the bit position. For example, picture estimation unit 226 may determine a probability that the most significant bits of the transform coefficients contain an error, determine a probability that the second most-significant bits of the transform coefficients contain an error, determine a probability that the third most-significant bits of the transform coefficients contain an error, and so on. Picture estimation unit 226 may collect these statistics by counting the number of times a predicted bit (i.e., a bit in an estimated picture) was incorrect out of the number of tested events. For instance, picture estimation unit 226 may estimate a picture and video encoder 228 may encode the video data of the estimated picture. Subsequently, video decoder 224 may decode error-corrected encoded video data of the picture. Picture estimation unit 226 may compare bits in transform coefficients of the encoded video data of the estimated picture and the error corrected video data of the picture to determine whether the bits of the encoded video data of the estimated picture are erroneous.

Reliability unit 1002 may convert the probability values into LLR values. In some examples, reliability unit 1002 may convert the probability values into LLR values using the following formula:

$$M = \ln\frac{1 - P_{error}}{P_{error}} \qquad (8)$$

In the formula above, M indicates an LLR value, $P_{error}$ indicates an error probability value, and ln indicates the natural log function. In some examples, the LLR values are reliability values.

Figure 11:
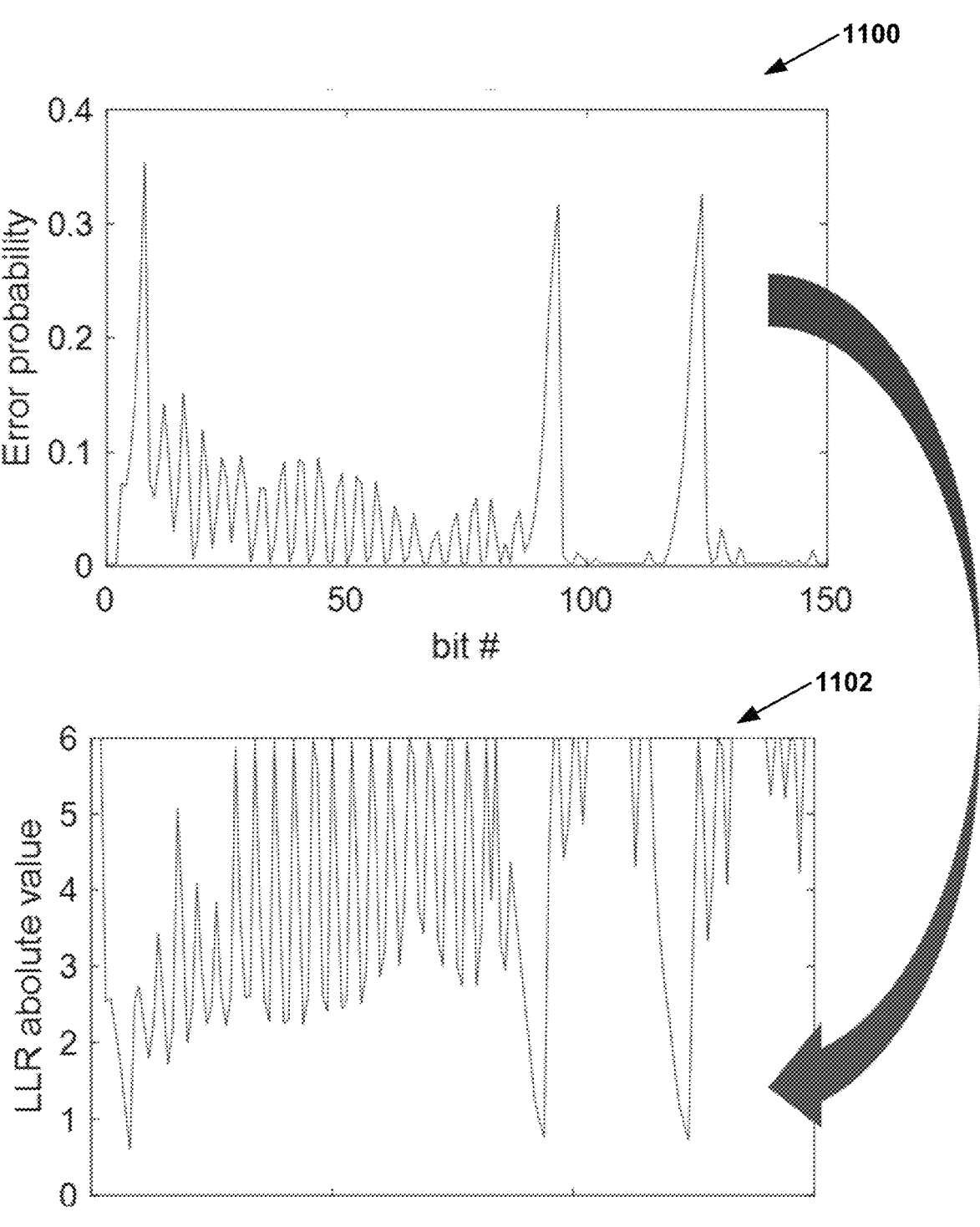
FIG. 11 illustrates charts of example error probabilities and corresponding log likelihood ratio (LLR) absolute values, according to one or more techniques of this disclosure.

FIG. 11 illustrates charts of example error probabilities and corresponding log likelihood ratio (LLR) absolute values, according to one or more techniques of this disclosure. In the example of FIG. 11, each transform block is represented using 150 bits. Graph 1100 plots error probability for individual bit positions within a transform block. As one can see in graph 1100, bits at specific positions have greater probability of error. Graph 1102 shows error probabilities converted to LLR absolute values. The LLR absolute values may be scaled.

In some examples, receiving device 104 uses a dynamic scaling process. In the dynamic scaling process, picture estimation unit 226 determines the prediction quality information dynamically based on the video data. For example, some regions of pictures are harder to predict (e.g., regions in which prediction accuracy is diminished) than regions which are easier to predict. Examples of regions of pictures that are harder to predict may include regions with higher motion. For instance, if a total magnitude of motion vectors in a region crosses a threshold, picture estimation unit 226 may determine that the region is a hard-to-predict region. Accordingly, picture estimation unit 226 may identify such regions and generate reliability values for bits of transform coefficients of transform blocks based at least in part on whether the transform blocks are inside or outside of such regions. In some examples, picture estimation unit 226 determines a reliability value for a bit of a transform coefficient based on general statistics regarding errors for a position of the bit modified based on whether or not the transform block containing the transform coefficient is in a hard-to-predict region.

Reliability unit 1002 may use the reliability values to scale bits of the transform coefficients in the encoded video data generated by video encoder 228. For example, the bits of encoded video data generated by video encoder 228 may be considered "hard" bits and may have values of exactly 0 or exactly 1. Reliability unit 1002 may the prediction quality information generated by picture estimation unit 226 and the encoded video data generated by video encoder 228 to determine "soft" bits that are between 0 and 1. For example, if the value of a bit of the encoded video data is 1, reliability unit 1002 may generate a "soft" value of the bit by multiplying the LLR absolute value for the bit by negative 1 (i.e., −1). If the value of the bit of the encoded video data is 0, reliability unit 1002 may generate a "soft" value of the bit by multiplying the LLR absolute value for the bit by positive 1 (i.e., +1). Thus, the "soft" or scaled values of the bits of a transform coefficient may be M or −M.

Thus, in some examples, each bit may be transformed into a scaled value that has a more positive value if there is greater confidence that the bit has a value of 0 and a more negative value if there is greater confidence that the bit has a value of 1. Reliability unit 1002 provides the scaled values to channel decoder 222 as a priori information.

Channel decoder 222 performs a channel decoding process using the scaled values. For example, reliability unit 1002 and channel encoder 212 may encode encoded video data into codewords (e.g., low-density parity check codes). Bits of the codewords generated by reliability unit 1002 may scale the bits of the codewords as described above. Bits of the codewords generated by channel encoder 212 may be altered during transit through channel 230 such that the bits of the codewords may be received as values between −1 and 1. Channel decoder 222 may apply an LPDC decoding process to the codewords to correct errors in the codewords. The bit values in the corrected codewords are 0 or 1. The LPDC decoding process may then convert the codeword back into the original data from the encoded video data. In other examples, other coding schemes may be used. In this example, the error correction data received by channel decoder 222 may include cyclic redundancy check (CRC) data that is not used in the LPDC decoding process. In this way, channel decoder 222 may determine values for each bit of the transform coefficients.

In some examples, channel encoder 212 may use the prediction quality feedback to sort bits of transform coefficients before applying unequal protection channel coding, such as polar or spinal codes. Unequal protection channel coding involves allocating coding redundancy depending on the importance of the information bits. For instance, channel encoder 212 can use the reliability data to protect different bits according to their predictability by receiving device 104.

In some examples, reliability unit 1002 sends prediction quality feedback to transmitting device 102. Video encoder 210 may adjust one or more encoding parameters of the video encoding process that video encoder 210 applies to video data. For example, transmitting device 102 may determine a compression rate of the limited video encoding process based on the predictability (reliability) of receiving device 104. For instance, if the predictability is low, transmitting device 102 may reduce the quality of the encoded video by reducing the number of transform coefficients or the bit width per transform coefficient such that less information is communicated.

In some examples, transmitting device 102 may adjust one or more channel coding parameters used by channel encoder 212 based on the prediction quality feedback. For example, channel encoder 212 may use unequal protection codes, where the protection is dependent on the prediction quality feedback. In some examples, channel encoder 212 may select different LDPC graphs depending on the reliability. In some examples, channel encoder 212 may change the encoding scheme for generating error correction data to increase error correction capabilities for bit positions or regions of pictures having lower reliability, or decrease error correction capabilities for bit positions or regions of pictures having greater reliability.

In some examples, transmitting device 102 may update one or more bit puncturing parameters used by puncturing unit 214 based on the prediction quality feedback. For example, puncturing unit 214 may change a puncturing pattern to allow transmission of more error correction data for bit positions and/or picture regions that have lower reliability. Thus, transmitting device 102 may avoid puncturing of bits with lower reliability. In some examples, puncturing unit 214 may change a puncturing pattern to allow transmission of fewer error correction data for bit positions and/or picture regions that have higher reliability.

In some examples, the prediction quality feedback that reliability unit 1002 sends to transmitting device 102 is applicable to a complete picture. In some examples, reliability unit 1002 may send the prediction quality feedback to transmitting device 102 on a per region basis. Each region may be a defined area within a picture. Reliability unit 1002 may send the prediction quality feedback for some regions of a picture but not others.

In some examples, reliability unit 1002 may send the prediction quality feedback to transmitting device 102 on a periodic basis. For example, reliability unit 1002 may send the prediction quality feedback to transmitting device 102 every N pictures, where N is an integer value. In some examples, reliability unit 1002 sends the prediction quality feedback to transmitting device 102 after completion of a specific number of groups of pictures (GOPs). In other examples, reliability unit 1002 may send the prediction quality feedback on an aperiodic basis, such as in response to specific conditions or events.

In some examples, the prediction quality feedback may include prediction quality data based on one or more noise models, such as a Gaussian noise model or a Laplacian noise model. Noise model parameters may control the one or more noise models. Reliability unit 1002 may transmit the noise model parameters to transmitting device 102. The use of a noise model is an alternative for gathering error statistics. In this mode the prediction error (the statistics of the error between the estimated picture as estimated by picture estimation unit 226 and the actual picture reconstructed by video decoder 224) may be modeled using a few parameters that describe the error distribution function.

The parameters of the noise model may be easier for receiving device 104 to communicate to transmitting device 102 because the parameters of the noise model may include less data as compared to per-bit statistics. Transmitting device 102 may use the noise model in the same way as transmitting device 102 may use other types of prediction quality feedback.

In some examples, instead of reliability unit 1002 receiving prediction quality information from picture estimation unit 226 of receiving device 104, video encoder 210 may generate the prediction quality information and send the prediction quality information to reliability unit 1002. Video encoder 210 may determine the prediction quality information based on a priori information about the video encoding process. For example, video encoder 210 may evaluate, based on the compression parameters, the reliability per bit (e.g., that MSBs is more reliable than LSBs, low frequency transform coefficients are more reliable than higher frequency transform coefficients, etc.). Video encoder 210 may perform the prediction process to evaluate the statistics by itself, have predefined statistics for different light compression set of parameters. In addition, transmitting device 102 may evaluate the instantaneous motion using other sensors, and adjust the reliability accordingly.

FIG. 12 is a flowchart illustrating an example operation of transmitting device 102 using scaled bits according to techniques of this disclosure. In the example of FIG. 12, transmitting device 102 may obtain video data, e.g., from video source 120 (1200). Furthermore, transmitting device 102 may obtain prediction quality feedback (1202). In some examples, transmitting device 102 may obtain the prediction quality feedback from receiving device 104. The prediction quality feedback includes bit reliability information. In some examples, the prediction quality feedback is represented in terms of noise model parameters, such as parameters of a Gaussian noise model or a Laplacian noise model.

Transmitting device 102 may adapt one or more of video encoding parameters, channel encoding parameters, or bit puncturing parameters based on the prediction quality feedback (1204). Video encoder 210 of transmitting device 102 may perform the video encoding process to generate encoded video data (1206). The video encoding process may be controlled by the video encoding parameters. For example, the video encoding parameters may control the number of transform coefficients included in transform blocks, the number of bits included in transform coefficients, and so on. In some examples, the video encoding parameters include a quantization parameter, and video encoder 210 may adapt the quantization parameter based on the prediction quality feedback. For instance, if the prediction quality feedback indicates low reliability, the quantization parameter may be reduced to reduce the level of quantization. As part of performing the video encoding process, video encoder 210 may use the quantization parameters to quantize transform coefficients of transform blocks of the one or more pictures.

Channel encoder 212 of transmitting device 102 may perform a channel encoding process on the scaled bits to generate channel encoded data (1208). The channel encoding process may be controlled by the channel encoding parameters. For example, the channel encoding parameters may include control which LDPC graph the channel encoding process uses to generate codewords, the channel encoding parameter may control error correction capabilities, and so on. For example, the channel encoding parameters include a LDPC graph, channel encoder 212 may adapt the LPDC graph, and use the LDPC graph to generate codewords for transmission to the receiving device.

Furthermore, puncturing unit 214 of transmitting device 102 may perform a bit puncturing process on error correction data generated by channel encoder 212 (1210). The bit puncturing process may be controlled by the bit puncturing parameters. For example, the prediction quality feedback may indicate that certain parts of encoded video data are less reliable. Accordingly, transmitting device 102 may adjust the bit puncturing parameters to reduce bit puncturing on error correction data for the less reliable parts of the encoded video data. Transmitting device 102 may transmit the channel encoded data and bit-punctured error correction data to receiving device 104 (1212).

FIG. 13 is a flowchart illustrating an example operation of receiving device 104 using scaled bits according to techniques of this disclosure. In the example of FIG. 13, receiving device 104 may obtain error correction data from a transmitting device (1300). The error correction data provides error correction information regarding a picture of the video data.

Picture estimation unit 226 may generate prediction data for the picture (1302). The prediction data for the picture may comprise predictions of blocks of the picture based at least in part on one or more previously reconstructed pictures of the video data. For example, picture estimation unit 226 may use inter prediction and/or intra prediction to generate the predictions of the blocks.

Furthermore, receiving device 104 may generate encoded video data based on the prediction data for the picture (1304). For example, video encoder 228 of receiving device 104 may perform a video encoding process that generates the encoded video data. The encoded video data includes transform blocks that comprises transform coefficients.

Receiving device 104 may scale bits of the transform coefficients of the transform blocks based on reliability values for bit positions (1306). In some examples, receiving device 104 generates the reliability values. For instance, receiving device 104 may generate the reliability values based on statistics regarding occurrence of errors in the bit positions. In some examples, receiving device 104 may generate the reliability values based on reliability characteristics for individual regions of pictures of the video data. In some examples, receiving device 104 may generate the reliability values based on a noise model. Furthermore, in some examples, receiving device 104 may send the reliability value to transmitting device 102. In other examples, receiving device 104 may receive the reliability values from transmitting device 102.

Additionally, channel decoder 222 of receiving device 104 may generate error-corrected encoded video data using the error correction data to perform an error correction operation on the scaled bits of the transform coefficients of the transform blocks (1308).

Video decoder 224 of channel decoder 222 may reconstruct the picture based on the error-corrected encoded video data (1310).

This disclosure describes techniques that may reduce the complexity of video encoding at a transmitting device, such as an extended reality (XR) headset. The transmitting device may obtain multiview video data. The multiview video data may include pictures from two or more viewpoints. For example, an XR headset may include two cameras for a stereoscopic view of a scene that a user is viewing. In this example, the multiview video data may include pictures from each of the cameras.

Processing the content of multiview video data may consume considerable processing resources. For instance, the context of augmented reality (AR) or mixed reality (MR), considerable processing resources may be required in order to determine where to position a virtual element and how the virtual element should appear. The multiview video data may help in processing virtual elements. As an example, the same virtual element may need to be darker when the virtual element is to be positioned in a shaded area of a scene and brighter when the virtual element is positioned in a sunny area of a scene. As another example, the system may need to analyze the content of a scene to determine whether a virtual element is to be occluded by physical elements in the scene, such as rocks or trees. Multiview video data may be useful in determining the depths of objects in a scene. To keep the XR headset light and to preserve battery power at the XR headset, it may be desirable to minimize the processing of video data performed at the XR headset. Processing the video data at another device, such as the user's smartphone or other nearby device may therefore help to reduce the demands for processing resources at the XR headset.

While multiview video data may be very useful in particular circumstances, simply transmitting unencoded multiview video data may be impractical since the amount of data needed to transmit multiple parallel streams of video data concurrently may be very large. However, there is often considerable redundancy between pictures of different views of multiview video data. As an example, what a person's left eye sees is often not that different from what a person's right eye sees. Accordingly, video compression techniques have been developed to reduce this redundancy in order to reduce the amount of data needed to transmit multiview video data.

However, some of the techniques for multiview video coding themselves require considerable computational resources. For example, a video encoder may determine differences between a set of two or more concurrent pictures to determine a depth map of a scene. The depth map is an array of values indicating the depths/distances from the cameras of objects shown in the pictures. In this example, one of the concurrent pictures may be an anchor picture and one or more of the concurrent pictures may be non-anchor pictures. The video encoder may use the depth map to calculate disparity vectors for blocks in the non-anchor pictures. A disparity vector for a block indicates a lateral displacement between the block and a corresponding block in another concurrent picture, such as the anchor picture. In general, blocks representing deeper objects have lower magnitude disparity vectors than blocks representing closer objects. The video encoder may use a disparity vector of a block to determine a prediction block, generate residual data based on the prediction block, apply a transform to the residual data, quantize transform coefficients of the resulting transform block, and signal the quantized transform coefficients. In this example, considerable computational resources may be involved in generating the depth map.

In another example, the illumination level may differ between concurrent pictures from different viewpoints. These differences in illumination may undermine the coding efficiency of multiview video coding. Illumination compensation may therefore be applied to non-anchor pictures to temporarily modify illumination levels of the non-anchor pictures in accordance with illumination compensation factors to make the non-anchor pictures more consistent with an illumination level of an anchor picture during video encoding. The original illumination levels of the non-anchor pictures may be restored during video decoding. Determining illumination compensation factors may consume computational resources.

The techniques of this disclosure may shift some of the processing associated with multiview video encoding from the transmitting device (e.g., the XR headset) to a receiving device (e.g., a mobile device). For example, the transmitting device may obtain a first set of multiview pictures of the video data. The first set of multiview pictures includes first pictures and second pictures. The first pictures are from a first viewpoint and the second pictures are from a second viewpoint. The transmitting device may transmit first encoded video data to a receiving device. The first encoded video data is based on the first set of multiview pictures. The transmitting device may receive multiview encoding cues from the receiving device. Furthermore, the transmitting device may obtain a second set of multiview pictures of the video data. The second set of multiview pictures includes third pictures and fourth pictures. The third pictures are from the first viewpoint and the fourth pictures are from the second viewpoint. The transmitting device may perform, based on the multiview encoding cues received from the receiving device, a multiview encoding process on the second set of multiview pictures to generate second encoded video data. The multiview encoding process reduces inter-view redundancy between the third pictures and the fourth pictures. The transmitting device may then transmit the second encoded video data to the receiving device.

Similarly, the receiving device may obtain first encoded video data from a transmitting device. The first encoded video data is based on a first set of multiview pictures of the video data. The first set of multiview pictures may include first pictures and second pictures. The first pictures are from a first viewpoint and the second pictures are from a second viewpoint. The receiving device may determine multiview encoding cues based on the first encoded video data. The receiving device may transmit the multiview encoding cues to the transmitting device. Additionally, the receiving device may obtain second encoded video data from the transmitting device. The second encoded video data is based on a second set of multiview pictures that includes third pictures and fourth pictures. The second encoded video data is encoded using a multiview encoding process that reduces inter-view redundancy between the third pictures and the fourth pictures based on the multiview encoding cues.

Because the receiving device determines the multiview encoding cues and sends the multiview encoding cues to the transmitting device, the burden of determining the multiview encoding cues may be shifted from the transmitting device to the receiving device. This may reduce the demand for resources at the transmitting device.

With reference to FIG. 2, video encoder 210 may perform a multiview encoding process based on multiview encoding cues obtained from receiving device 104. For example, the multiview encoding cues may include a depth map. In this example, video encoder 210 may use the depth map to estimate disparity vectors for blocks of pictures in a non-anchor view of the multiview video data. Video encoder 210 may use the disparity vector of a current block of a current picture to determine a prediction block for the current block based on samples of a concurrent reference picture. The concurrent reference picture has the same picture order count (POC) value as the current picture. Video encoder 210 may determine residual data for the current block based on original samples of the current block and the prediction block for the current block. Video encoder 210 may apply one or more transforms to the residual data to generate one or more transform blocks. Video encoder 210 may quantize transform coefficients in the transform blocks. The encoded video data generated by video encoder 210 may be based on the quantized transform coefficients.

In some examples, the multiview encoding cues may include one or more illumination compensation factors. When encoding a current picture of the multiview video data, video encoder 210 may modify each sample of the current picture based on the one or more illumination compensation factors. In some examples, different illumination compensation factors may apply to different regions of the current picture. Modifying the samples of the current picture in this way may make the illumination level of the current picture more consistent with an illumination level of a concurrent reference picture. After modifying the samples of the current picture, video encoder 210 may perform a multiview encoding process, such as that described in the previous paragraph, to encode blocks of the current picture.

Furthermore, in accordance with some examples of this disclosure, video decoder 224 may perform a multiview decoding process. For example, video decoder 224 may use disparity vectors of blocks of a current picture to generate prediction blocks. Video decoder 224 may use the prediction blocks and residual data received from channel decoder 222 to reconstruct samples of the blocks of the current picture. In some examples where video encoder 210 applied illumination compensation to a picture, video decoder 224 may use illumination parameters to reverse the illumination compensation applied to the picture. In other examples, video decoder 224 may apply other multiview decoding operations.

Furthermore, in accordance with one or more techniques of this disclosure, video decoder 224 may determine multiview encoding cues based on encoded video data received from transmitting device 102. For example, video decoder 224 may determine depth maps, determine illumination compensation parameters, and other information that may be used in a multiview encoding operation. Receiving device 104 may transmit the multiview encoding cues back to transmitting device 102 so that transmitting device 102 may use the multiview encoding cues to perform a multiview encoding process on subsequent pictures.

Picture estimation unit 226 may generate an estimate of a next picture of the video data. In some examples, picture estimation unit 226 may estimate a picture based on one or more previously reconstructed reference pictures associated with different views. For instance, picture estimation unit 226 may use information, such as disparity vectors or depth maps, from pictures for a previous time instant to extrapolate the content of the picture from a picture in the same time instant. In another example, picture estimation unit 226 may extrapolate the picture based on one or more pictures associated with the same view regardless of pictures associated with other views, in much the same way as discussed elsewhere in this disclosure with regard to picture estimation unit 226 estimating pictures of single view video data.

Video encoder 228 may perform the same operation as video encoder 210 on the estimated next picture. For instance, video encoder 228 may perform intra prediction to predict blocks, use the prediction blocks and the corresponding predicted blocks of the picture generated by picture estimation unit 226 to generate residual data. In some examples, video encoder 228 may perform the same multiview encoding processes as video encoder 210 using the multiview encoding cues. Video encoder 228 may apply a transform (e.g., a DCT transform) to the residual data to generate transform coefficients. Video encoder 228 may apply quantization to the transformed coefficients.

Figure 14:
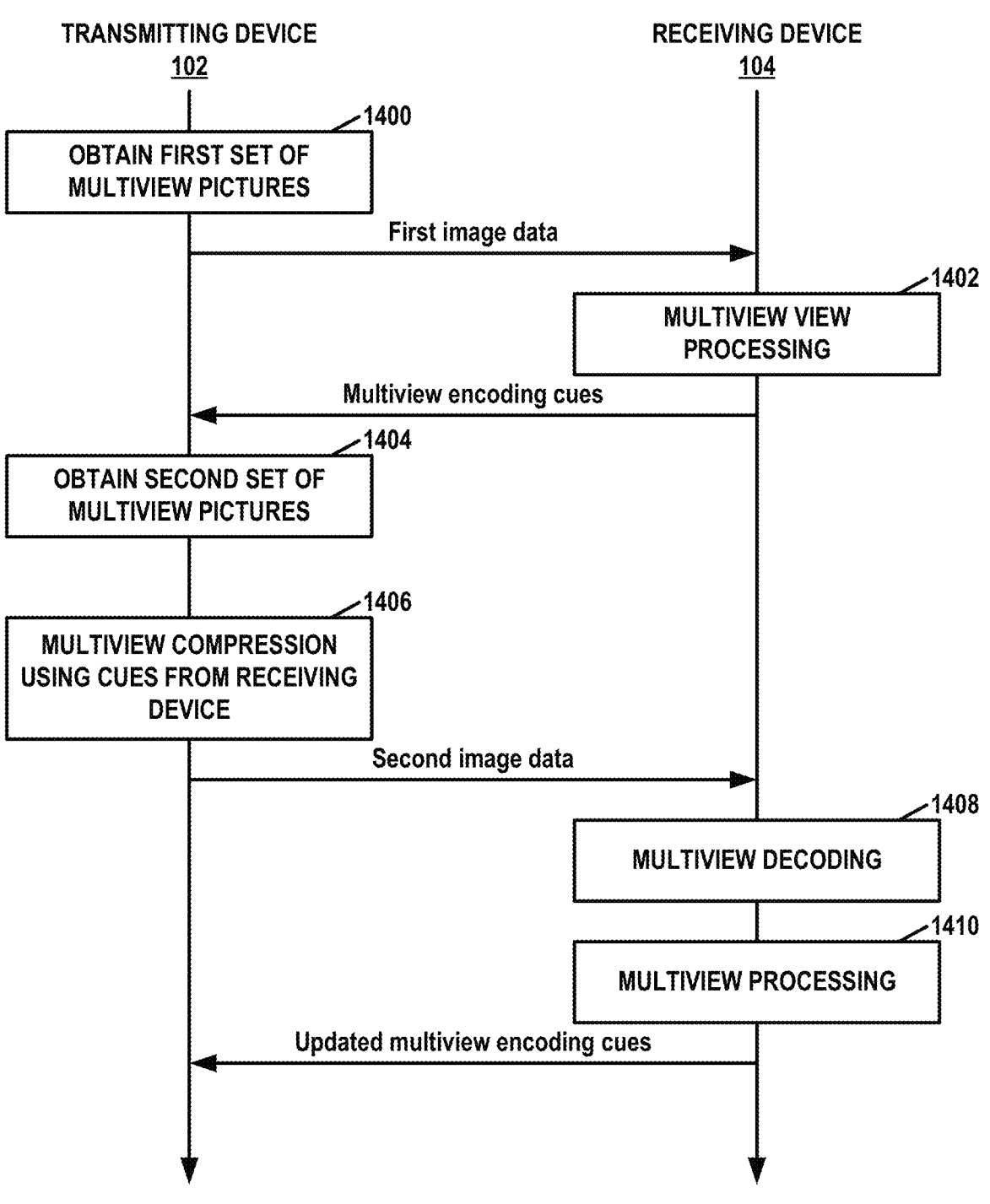
FIG. 14 is a flow diagram illustrating an example exchange of data between a transmitting device and a receiving device related to multiview processing according to one or more techniques of this disclosure.

FIG. 14 is a flow diagram illustrating an example exchange of data between transmitting device 102 and receiving device 104 related to multiview processing according to one or more techniques of this disclosure. In the example of FIG. 14, transmitting device 102 may obtain a first set of multiview pictures (1400). Transmitting device 102 may transmit first encoded video data based on the first set of multiview pictures to receiving device 104. In some examples, transmitting device 102 performs light compression on first set of multiview pictures to generate the first encoded video data. In other examples, the first encoded video data may include unencoded versions of the first set of multiview pictures.

Receiving device 104 may perform multiview view processing on the first set of multiview pictures (1402). For example, receiving device 104 may decode the first set of multiview pictures, if necessary. Additionally, receiving device 104 may determine multiview encoding cues, e.g., as described elsewhere in this disclosure. Receiving device 104 may transmit the multiview encoding cues to transmitting device 102.

Furthermore, in the example of FIG. 14, transmitting device 102 may obtain a second set of multiview pictures (1404). Transmitting device 102 may perform a multiview encoding process on the second set of multiview pictures to generate second encoded video data (1406). The second encoded video data may include encoded anchor and secondary (non-anchor) pictures. Receiving device 104 may perform multiview decoding on the second encoded video data to reconstruct the second set of multiview pictures (1408). Receiving device 104 may also perform multiview processing on the second set of multiview pictures to determine updated multiview encoding cues (1410). Receiving device 104 may send the updated multiview encoding cues to transmitting device 102. Transmitting device 102 may use the updated multiview encoding cues for multiview encoding of subsequent sets of multiview pictures.

FIG. 15 is a flowchart illustrating an example operation of transmitting device 102 for multiview processing according to techniques of this disclosure. In the example of FIG. 5, transmitting device 102 may obtain a first set of multiview pictures of the video data (1500). The first set of multiview pictures includes first pictures and second pictures. The first pictures are from a first viewpoint and the second pictures are from a second viewpoint. Communication interface 118 (FIG. 1) of transmitting device 102 may transmit first encoded video data to receiving device 104 (1502). The first encoded video data is based on the first set of multiview pictures. Transmitting device 102 may receive multiview encoding cues from receiving device 104 (1504). In some examples, the multiview encoding cues include one or more of: a relative shift between blocks of the first pictures (i.e., pictures of the first viewpoint) and the second pictures (i.e., pictures of the second viewpoint), a brightness correction between the first pictures and the second pictures, an inter block shift between an anchor block and a reconstructed block, or motion data for reference shift. Transmitting device 102 may receive the multiview encoding cues in one of a variety of ways. For example, transmitting device 102 may receive the multiview encoding cues via an Uplink Control Information (UCI)/Media Access Control-Control Element (MAC-CE) message, a Radio Resource Control (RRC) message, or another type of message.

Furthermore, transmitting device 102 may obtain a second set of multiview pictures of the video data (1506). The second set of multiview pictures includes third pictures and fourth pictures. The third pictures are from the first viewpoint and the fourth pictures are from the second viewpoint. Video encoder 210 may perform, based on the multiview encoding cues received from the receiving device, a multiview encoding process on the second set of multiview pictures to generate second encoded video data (1508). The multiview encoding process reduces inter-view redundancy between the third pictures and the fourth pictures. Transmitting device 102 may then transmit the second encoded video data to receiving device 104 (1510).

The operation of FIG. 15 may be performed multiple times for subsequent sets of multiview pictures. For example, after transmitting the second encoded video data to the receiving device, transmitting device 102 may receive updated multiview encoding cues from receiving device 104. Transmitting device 102 may obtain a third set of multiview pictures of the video data. The third set of multiview pictures may include fifth pictures and sixth pictures, the fifth pictures being from the first viewpoint and the sixth pictures being from the second viewpoint. Video encoder 210 of transmitting device 102 may encode the third set of multiview pictures based on the updated multiview encoding cues received from the receiving device to generate third encoded video data. Transmitting device 102 may transmit the third encoded video data to receiving device 104.

FIG. 16 is a flowchart illustrating an example operation of receiving device 104 for multiview processing according to techniques of this disclosure. In the example of FIG. 16, receiving device 104 may obtain first encoded video data from transmitting device 102 (1600). For instance, receiving device 104 may obtain the first encoded video data via communication interface 134 (FIG. 1). The first encoded video data is based on a first set of multiview pictures of the video data. The first set of multiview pictures may include first pictures and second pictures. The first pictures are from a first viewpoint and the second pictures are from a second viewpoint. Receiving device 104 may determine multiview encoding cues based on the first encoded video data (1602).

Receiving device 104 may transmit the multiview encoding cues to transmitting device 102 (1604). Receiving device 104 may transmit the multiview encoding cues in one of a variety of ways. For example, receiving device 104 may transmit the decimation pattern indication via an Uplink Control Information (UCI)/Media Access Control-Control Element (MAC-CE) message, a Radio Resource Control (RRC) message, or another type of message.

Additionally, receiving device 104 may obtain second encoded video data from transmitting device 102 (1606). The second encoded video data is based on a second set of multiview pictures that includes third pictures and fourth pictures. The second encoded video data is encoded using a multiview encoding process that reduces inter-view redundancy between the third pictures and the fourth pictures based on the multiview encoding cues. Video decoder 224 of receiving device 104 may decode the second encoded video data.

In some examples, the multiview encoding cues include a depth map indicating depths of objects represented in the first and second pictures. Receiving device 104 may, as part of determining the multiview encoding cues, determine the depth map based on the first and second pictures. In some examples, the multiview encoding cues includes one or more illumination compensation factors and receiving device 104 may, as part of determining the multiview encoding cues, determine the illumination compensation factors based on the first and second pictures.

The process of FIG. 16 may be repeated multiple times. For example, receiving device 104 may determine second multiview encoding cues based on the second encoded video data. Receiving device 104 may transmit the second multiview encoding cues to transmitting device 102. Subsequently, receiving device 104 may obtain third encoded video data from transmitting device 102. The third encoded video data is based on a third set of multiview pictures that includes fifth pictures and sixth pictures, the third encoded video data being encoded using the multiview encoding process that reduces inter-view redundancy between the fifth pictures and the sixth pictures based on the second multiview encoding cues.

In accordance with one or more techniques of this disclosure, transmitting device 102 may receive a decimation pattern indication from receiving device 104. The decimation pattern indication may indicate a decimation pattern. As described in greater detail elsewhere in this disclosure, receiving device 104 may determine the decimation pattern. The decimation pattern may be a pattern of encoded video data non-transmission.

Transmitting device 102 may receive the decimation pattern indication in one of a variety of ways. For example, transmitting device 102 may receive the decimation pattern indication via an Uplink Control Information (UCI)/Media Access Control-Control Element (MAC-CE) message, a Radio Resource Control (RRC) message, Sidelink Control Information (SCI), or another type of message.

Transmitting device 102 may apply the decimation pattern to the encoded video data generated by video encoder 210, thereby generating decimated video data. For example, the decimation pattern may indicate a pattern of skipping transmission of encoded video data of full pictures. Accordingly, in this example, transmitting device 102 (e.g., channel encoder 212 of transmitting device 102) may transmit encoded video data of some pictures and not transmit encoded video data of other picture in accordance with the indicated pattern. For example, transmitting device 102 may skip transmission of encoded video data of every other picture. In another example, transmitting device 102 may transmit encoded video data of one picture and then not transmit encoded video data of the next two or more pictures.

In another example, the decimation pattern may indicate a pattern of skipping transmission of encoded video data of specified regions within pictures. Specific regions of a series of pictures may not change much, if at all, from picture-to-picture. For instance, the background of a scene from a static viewpoint may not change significantly while changes occur in a more confined region of interest. Because regions outside the regions of interest do not change much, such regions may be easier to predict accurately. Hence, in accordance with a technique of this disclosure, receiving device 104 may identify the regions outside the regions of interest. Accordingly, transmitting device 102 may transmit encoded video data for the regions of interest and not transmit encoded video data of other regions.

In another example, the video data is multiview video data and the decimation pattern may indicate a pattern of skipping transmission of encoded video data of pictures from specified views. For instance, two views may have very similar content, such as views primarily showing distant objects. Accordingly, in this example, transmitting device 102 may transmit encoded video data of one of the views and not transmit encoded video data of one or more other views, as indicated by the decimation pattern.

In another example, the decimation pattern may indicate a pattern of bits to omit from syntax elements indicating transform coefficients. For instance, the decimation pattern may indicate that a specific number of least significant bits are to be omitted from transform coefficients. In some examples, the decimation pattern may indicate that specific transform coefficients (e.g., high frequency transform coefficients) are to be omitted.

Figure 17:
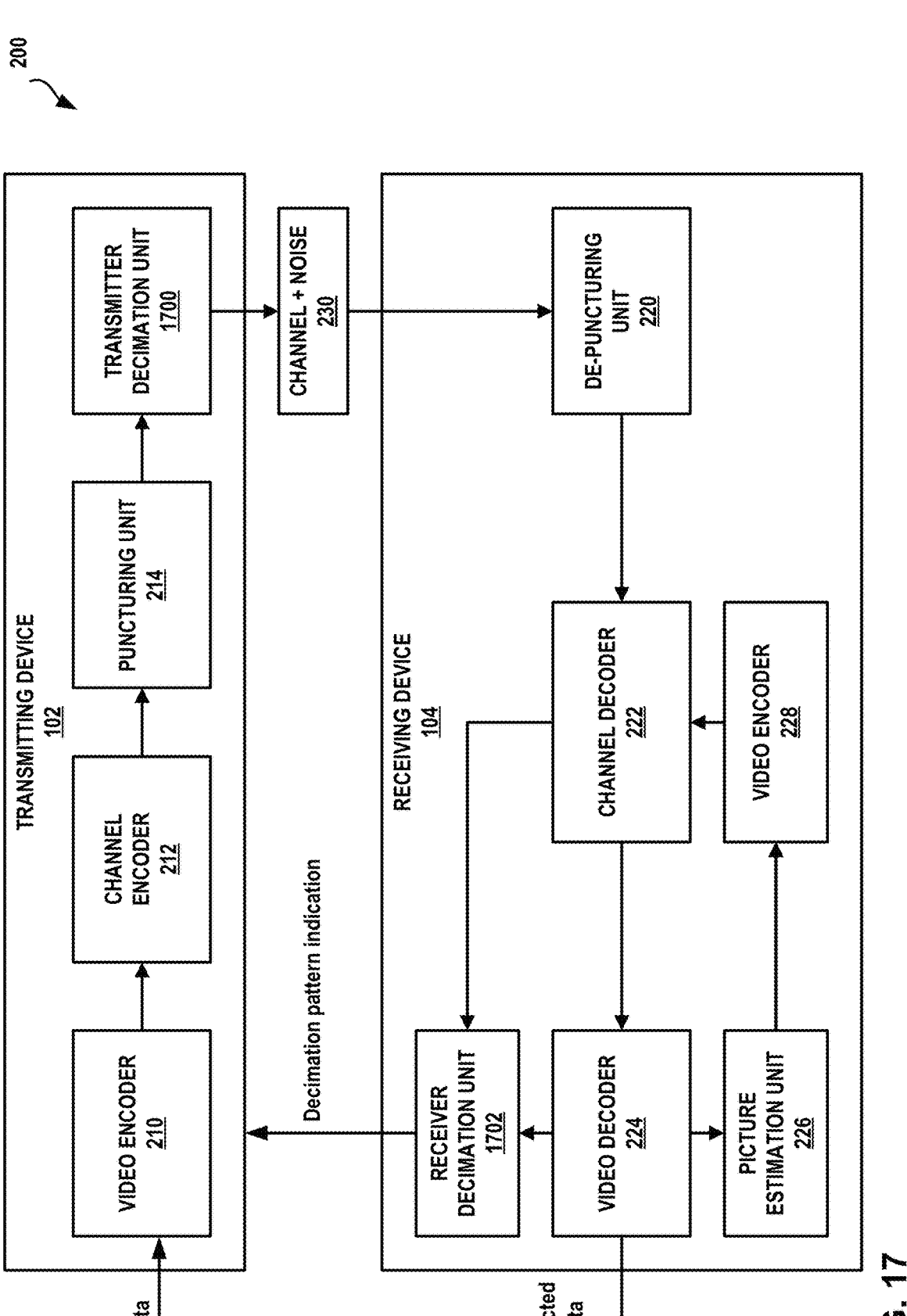
FIG. 17 is a block diagram illustrating example components of a transmitting device and a receiving device that perform decimation on encoded video data according to techniques of this disclosure.

FIG. 17 is a block diagram illustrating example components of a transmitting device and a receiving device that perform decimation on encoded video data according to techniques of this disclosure. In the example of FIG. 17, transmitting device 102 includes video encoder 210, channel encoder 212, puncturing unit 214, and also a transmitter decimation unit 1700. Receiving device 104 includes de-puncturing unit 220, channel decoder 222, video decoder 224, picture estimation unit 226, video encoder 228, and also a receiver decimation unit 1702. Video encoder 210, channel encoder 212, puncturing unit 214, de-puncturing unit 220, channel decoder 222, video decoder 224, picture estimation unit 226, and video encoder 228 may operate in the same way as described elsewhere in this disclosure.

However, in the example of FIG. 17, transmitter decimation unit 1700 may apply a decimation pattern to encoded video data after channel encoder 212 generates error correction data for the encoded video data. The decimation pattern indicates a pattern of non-transmission of encoded video data. For example, transmitter decimation unit 1700 may cause transmitting device 102 not to transmit encoded video data for specific pictures, regions of pictures, a pattern of blocks within pictures, specific views, and so on. Receiver decimation unit 1702 may determine a decimation pattern indication based on pictures reconstructed by video decoder 224. Receiver decimation unit 1702 may transmit a decimation pattern indication indicating a decimation pattern to transmitting device 102. Transmitter decimation unit 1700 may apply the decimation pattern indicated by the decimation pattern indication.

Although FIG. 17 is described with respect to a DVC-based scheme, the techniques of this disclosure related to sending a decimation pattern indication from receiving device 104 to transmitting device 102 are not necessarily so limited. For instance, in some examples, picture estimation unit 226 and video encoder 228 may be omitted.

Figure 18:
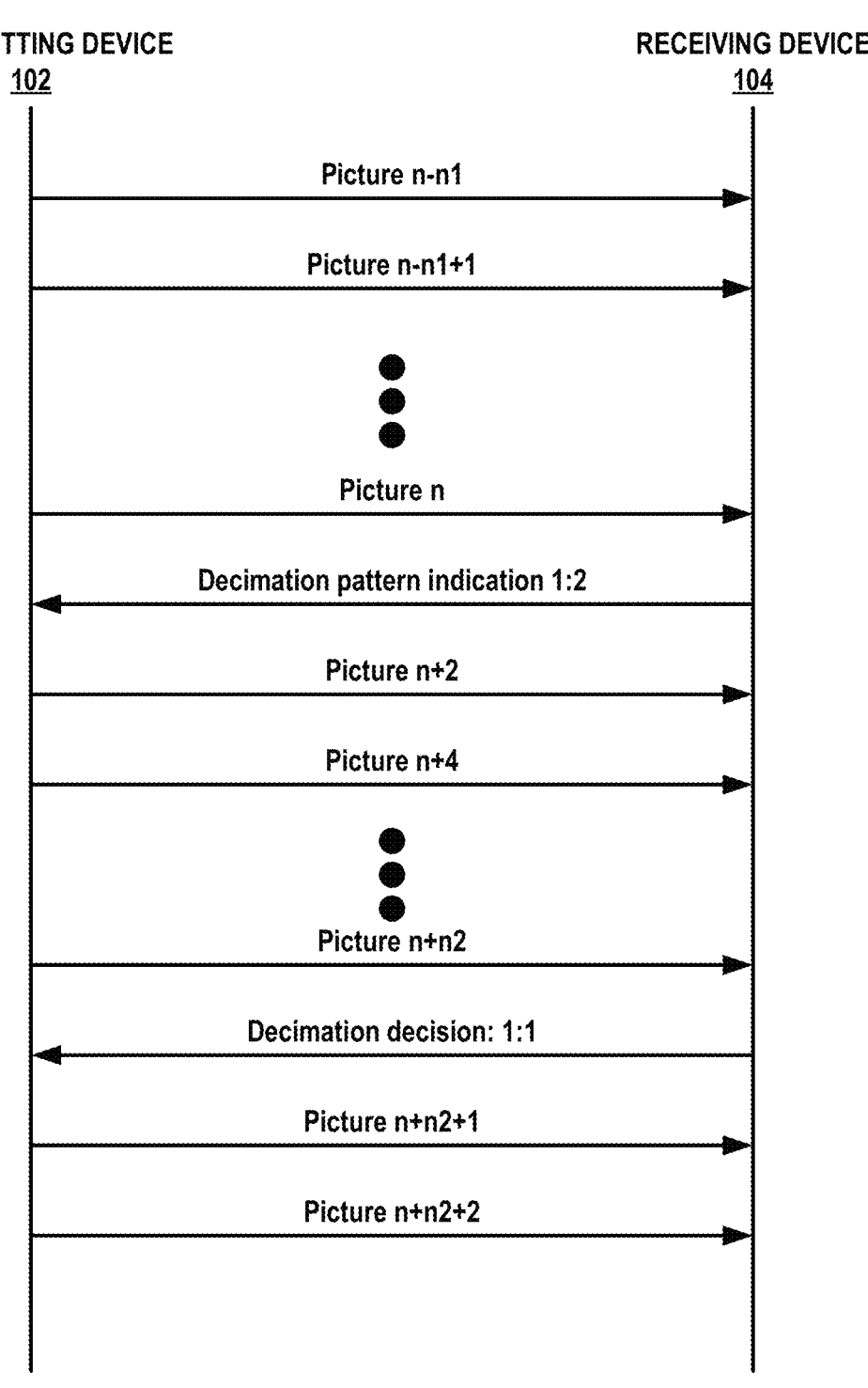
FIG. 18 is a conceptual diagram illustrating an example exchange of information that includes decimation pattern indications according to techniques of this disclosure.

FIG. 18 is a conceptual diagram illustrating an example exchange of information that includes decimation pattern indications according to techniques of this disclosure. In the example of FIG. 18, transmitting device 102 may transmit encoded video data for a first set of pictures (e.g., picture $n-n_1$, picture $n-n_{n1+1}$, and picture n) to receiving device 104. Transmitting device 102 may also transmit error correction data for the first set of pictures.

Receiving device 104 may transmit, and transmitting device 102 may receive, a decimation pattern indication that indicates a decimation pattern determined based on the first set of encoded pictures. In the example of FIG. 18, the decimation pattern decimates pictures according to a 1:2 ratio. In other words, the encoded video data for one picture out of every two pictures is to be transmitted.

Accordingly, transmitting device 102 may transmit encoded video data for a second set of pictures to receiving device 104. In accordance with the decimation pattern indicated by the received decimation pattern indication, transmitting device 102 skips transmission of encoded video data of every other picture in the second set of pictures. As shown in the example of FIG. 18, the index values (e.g., n+2, n+4, n+n2) of pictures in the second set of pictures increase by 2 instead of 1, as was the case for the first set of pictures.

Subsequently, receiving device 104 may determine, based on the second set of pictures, that a more appropriate decimation pattern would be a 1:1 decimation pattern (i.e., a decimation pattern in which transmitting device 102 transmits encoded video data for each picture). Accordingly, in the example of FIG. 18, receiving device 104 may transmit, and transmitting device 102 may receive, a second decimation pattern indication that indicates a second decimation pattern. Subsequently, transmitting device 102 may transmit encoded video data for a third set of pictures. In accordance with the second decimation pattern, transmitting device 102 does not skip transmission of encoded video data of any picture of the third set of pictures. Thus, as shown in the example of FIG. 18, the index values (e.g., n+n2+1, n+n2+2, etc.) increase by 1 instead of 2.

Figure 19:
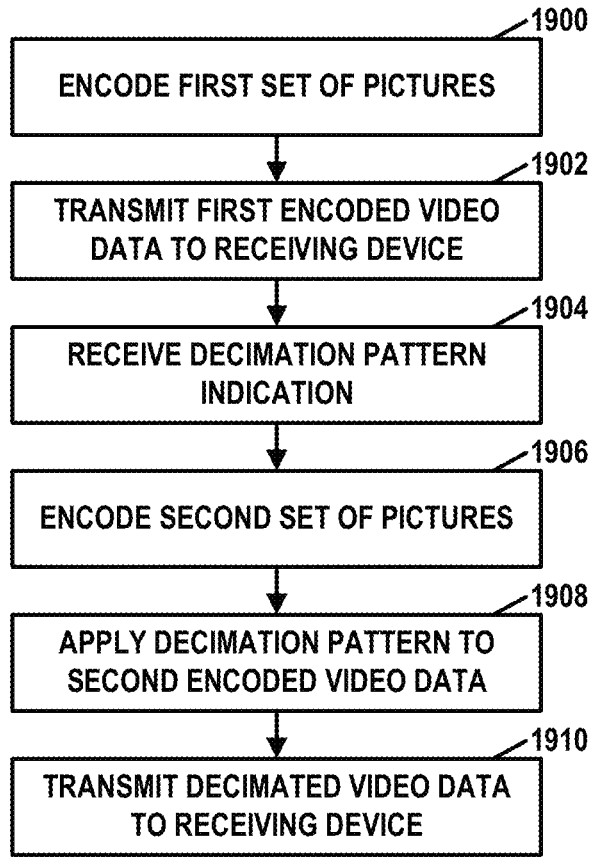
FIG. 19 is a flowchart illustrating an example operation of a transmitting device in which the transmitting device receives a decimation pattern indication according to techniques of this disclosure.

FIG. 19 is a flowchart illustrating an example operation of transmitting device 102 in which transmitting device 102 receives a decimation pattern indication according to techniques of this disclosure. In the example of FIG. 19, video encoder 210 of transmitting device 102 may encode a first set of pictures of the video data to generate first encoded video data (1900). Transmitting device 102 may transmit the first encoded video data to receiving device 104 (1902).

Furthermore, transmitting device 102 may receive, from receiving device 104, a decimation pattern indication that indicates a decimation pattern determined based on the first set of pictures (1904). The decimation pattern may be a pattern of encoded video data non-transmission. For instance, in some examples, the decimation pattern indicates a pattern of skipping transmission of encoded video data for full pictures. In other words, transmitting device 102 may not transmit any encoded video data for specific pictures and may transmit some or all of the encoded video data for other pictures. In some examples, the decimation pattern indicates a pattern of skipping transmission of encoded video data of specific regions within pictures. For instance, the decimation pattern may indicate that transmitting device 102 is to skip transmission of encoded video data associated with specific blocks of pictures, e.g., as shown in FIGS. 6 and 9. In some examples where the video data is multiview video data, the decimation pattern may indicate a pattern of skipping transmission of encoded video data of pictures from specific views. In such examples, the views may be associated with sensors on the same piece of user equipment (e.g., same XR headset) or views associated with sensors on different pieces of user equipment (e.g., different XR headsets worn by different users) or cameras. In some examples, there may be different decimation patterns for different regions without pictures. For instance, no decimation may be applied to a region of interest and a decimation pattern that limits transmission of blocks or less significant bits or higher frequency transform coefficients may be applied with respect to areas of pictures outside the region of interest.

Video encoder 210 may encode a second set of pictures of the video data to generate second encoded video data (1906). Additionally, transmitter decimation unit 1700 may apply the decimation pattern to the second encoded video data to generate decimated video data (1908). Transmitting device 102 may transmit the decimated video data to the receiving device (1910).

In some examples, transmitter decimation unit 1700 may determine a decimation pattern. Thus, in the context of FIG. 19, transmitting device 102 may encode a third set of pictures of the video data to generate third encoded video data, determine a second decimation pattern indicating a second pattern of encoded video data non-transmission, and apply the second decimation pattern to the third encoded video data to generate second decimated video data. Transmitting device 102 may transmit the second decimated video data to receiving device 104. Transmitting device 102 may transmit a second decimation pattern indication to the receiving device. The second decimation pattern indication indicating that the second decimation pattern was applied to the third encoded video data.

Transmitter decimation unit 1700 may determine the decimation pattern in various ways. For example, transmitter decimation unit 1700 may test various decimation patterns. When testing a decimation pattern, transmitter decimation unit 1700 may apply the decimation pattern to a picture and reconstruct the picture from error correction data for the picture and one or more previous original pictures of the video data. Transmitter decimation unit 1700 may compare the reconstructed picture to the picture to determine a level of distortion. Transmitter decimation unit 1700 may compare the levels of distortion associated with the different decimation patterns to determine a decimation pattern.

In some examples, the operation of FIG. 19 is performed in the context of DVC. Thus, channel encoder 212 of transmitting device 102 may generate first error correction data based on the first encoded video data. Transmitting device 102 may transmit the first error correction data to receiving device 104. Channel encoder 212 may generate second error correction data based on the second encoded video data. Transmitting device 102 may transmit the second error correction data to the receiving device.

Figure 20:
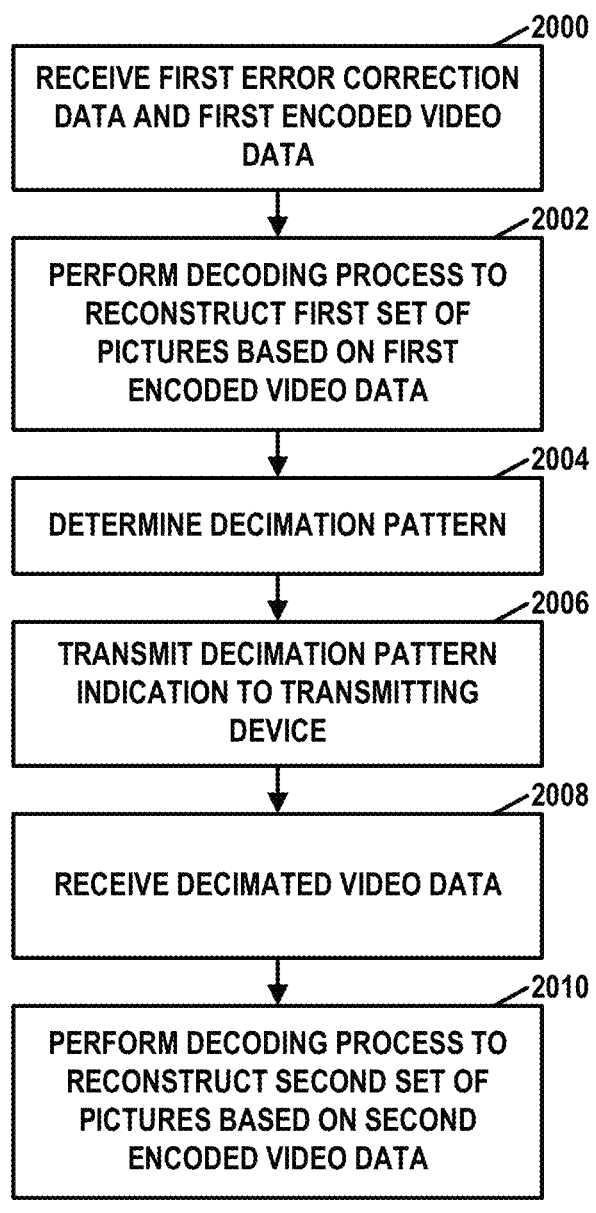
FIG. 20 is a flowchart illustrating an example operation of a receiving device in which the receiving device transmits a decimation pattern indication according to techniques of this disclosure.

FIG. 20 is a flowchart illustrating an example operation of receiving device 104 in which receiving device 104 transmits a decimation pattern indication according to techniques of this disclosure. In the example of FIG. 20, receiving device 104 may receive, from transmitting device 102, first encoded video data (2000). Video decoder 224 may perform a decoding process to reconstruct a first set of pictures based on the first error-corrected encoded video data (2002).

Additionally, receiver decimation unit 1702 may determine, based on the first set of pictures, a decimation pattern that indicates a pattern of encoded video data non-transmission (2004). In some examples, the decimation pattern indicates a pattern of skipping transmission of encoded video data of full pictures. In some examples, the decimation pattern indicates a pattern of skipping transmission of encoded video data of specified regions or blocks within pictures, such as in the examples of FIG. 6 and FIG. 9. In some examples where the video data is multiview video data and the decimation pattern indicates a pattern of skipping transmission of encoded video data of pictures from specified views.

Receiver decimation unit 1702 may determine the decimation pattern in one of a variety of ways. For example, receiver decimation unit 1702 may, for one or more trial decimation patterns, apply the trial decimation pattern to the error-corrected encoded video data generated by channel decoder 222 for the first set of pictures to generate decimated encoded video data. Receiver decimation unit 1702 may then cause channel decoder 222 to apply the error correction process to modify the decimated encoded video data based on the first error correction data to generate trial error-corrected video data. Receiver decimation unit 1702 may then cause video decoder 224 to apply the decoding process to reconstruct the first set of pictures based on the trial error-corrected video data. Receiver decimation unit 1702 may determine whether the decimation pattern satisfies one or more criteria based on a comparison of the first set of pictures as reconstructed based on the trial error-corrected video data and the first set of pictures as reconstructed based on the first error-corrected video data. For ease of explanation, this disclosure may refer to pictures reconstructed based on the trial error-corrected video data as "trial pictures" and may refer to pictures reconstructed based on the first error-corrected video data as "baseline pictures." Receiver decimation unit 1702 may repeat this procedure with multiple trial decimation patterns until receiver decimation unit 1702 identifies a decimation pattern that satisfies the criteria.

For example, receiver decimation unit 1702 may compare each trial picture to a corresponding baseline picture to determine whether the trial picture satisfies a criterion. For instance, receiver decimation unit 1702 may determine that a trial picture satisfies the criterion if a sum of differences between the trial picture and the corresponding baseline picture is less than a specific amount. If at least a given quantity of the trial pictures exceed a threshold, receiver decimation unit 1702 may select the decimation pattern associated with the trial pictures.

In a more general example, receiver decimation unit 1702 may apply a function to the trial pictures and corresponding baseline pictures to generate a value. If the value is less than a threshold, receiver decimation unit 1702 may select the decimation pattern associated with the trial pictures.

Furthermore, in some examples, receiver decimation unit 1702 may cancel use of a decimation pattern (e.g., revert to a pattern in which all encoded video data is transmitted) or change to a less aggressive decimation pattern if particular conditions occur. For example, receiver decimation unit 1702 may cancel use of a decimation pattern in response to determining that a given number of baseline pictures fail to satisfy a criterion. For instance, receiver decimation unit 1702 may determine that a trial picture fails the criterion if a sum of differences between the trial picture and the corresponding baseline picture is greater than a specific amount. If at least a given quantity of the trial pictures failing the criteria exceed a threshold, receiver decimation unit 1702 may cancel use of the decimation pattern or revert to a less aggressive decimation pattern. In a more general example, receiver decimation unit 1702 may apply a function to the trial pictures and corresponding baseline pictures to generate a value. If the value is greater than a second threshold, receiver decimation unit 1702 may cancel use of the decimation pattern or revert to a less aggressive decimation pattern.

Receiver decimation unit 1702 may transmit, to transmitting device 102, a decimation pattern indication that indicates the determined decimation pattern (2006). Receiver decimation unit 1702 may transmit the decimation pattern indication using an Uplink Control Information (UCI)/Media Access Control-Control Element (MAC-CE) message, a Radio Resource Control (RRC) message, a Sidelink Control Information (SCI) message, or another type of message.

Receiving device 104 may receive, from transmitting device 102, decimated video data (2008). The decimated video data may comprise second encoded video data to which the decimation pattern has been applied. The second encoded video data is generated based on a second set of pictures of the video data.

Video decoder 224 may perform the decoding process to reconstruct the second set of pictures based on the second error-corrected encoded video data (2010). Video decoder 224 may perform the same decoding process as described elsewhere in this disclosure.

In some examples, receiving device 104 may receive and use a decimation pattern indication from transmitting device 102. Thus, in the example of FIG. 20, receiving device 104 may receive a second decimation pattern indication indicating a second pattern of encoded video data non-transmission. Receiving device 104 may receive, from transmitting device 102, third error correction data and second decimated video data. The second decimated video data may comprise third encoded video data to which the second decimation pattern has been applied. The third encoded video data may be generated based on a third set of pictures of the video data. Channel decoder 222 may apply the error correction process to generate third error-corrected encoded video data based on the third encoded video data and the third error correction data. Video decoder 224 may apply the decoding process to reconstruct the third set of pictures based on the third error-corrected encoded video data.

In some examples, the process of FIG. 20 may be performed in a DVC-based implementation. Thus, receiving device 104 may receive, from transmitting device 102, first error correction data. Receiving device 104 apply an error correction process to modify the first encoded video data based on the first error correction data to generate first error-corrected encoded video data. Receiving device 104 may perform the decoding process to reconstruct the first set of pictures based on the first error-corrected encoded video data. Additionally, receiving device 104 may receive, from transmitting device 102, second error correction data. Receiving device 104 may apply the error correction process to generate second error-corrected encoded video data based on the second encoded video data, predicted encoded video data generated by video encoder 228, and the second error correction data. Receiving device 104 may perform the decoding process to reconstruct the second set of pictures based on the second error-corrected encoded video data.

During the video encoding process, a video encoder typically analyzes multiple encoding options and selects the best option. For example, the video encoder may analyze multiple ways of partitioning a largest coding unit (LCU) or macroblock into coding units (CUs) and/or prediction units (PUS). In another example, the video encoder may analyze multiple intra prediction modes when performing intra prediction to generate a prediction block for a PU. In another example, the video encoder may analyze multiple reference pictures and motion vectors when performing inter prediction to generate a prediction block for a PU. Such analysis and selection may be resource intensive. For instance, to be effective, the video encoder may need to process multiple options in parallel, which increases the hardware complexity of the video encoder and increases power requirements. The analysis and selection may also involve multiple requests to read and write data to memory, which further increases power requirements.

In accordance with one or more techniques of this disclosure, much of the process of analyzing and selecting encoding operations is shifted from the transmitting device (e.g., transmitting device 102) to the receiving device (e.g., receiving device 104). For example, the transmitting device may encode a first picture of the video data to generate first encoded video data. The transmitting device may transmit the first encoded video data to a receiving device. The receiving device may receive first encoded video data from the transmitting device and reconstruct the first picture based on the first encoded video data. Additionally, the receiving device may estimate a second picture of the video data based on the first picture. The second picture may be a picture occurring after the first picture in decoding order. The receiving device may generate encoding selection data for the estimated second picture. The encoding selection data indicate encoding selections used to encode the estimated second picture. The receiving device may transmit the encoding selection data for the second picture. The transmitting device may receive the encoding selection data for the second picture of the video data. The transmitting device may encode the second picture based on the encoding selection data to generate second encoded video data. The transmitting device may transmit the second encoded video data to the receiving device. The receiving device may receive second encoded video data from the transmitting device. The receiving device may reconstruct the second pictured based on the second encoded video data. In this way, because the transmitting device receives the encoding selection data from the receiving device, the transmitting device does not need to perform the resource intensive analysis and selection process while encoding the second picture because the analysis and selection process already occurred for the second picture at the receiving device. This may reduce the resource requirements of the transmitting device.

The transmitting device and the receiving device may communicate using a low range, low power links over an ultra-wideband (e.g., large bandwidth) communication link. In some examples, the transmitting device and the receiving device may communicate using a time division duplexing (TDD) scheme, a sub-band non-overlapping full duplex (SBFD) scheme, or a SFFD scheme. The low latency associated with this type of communication may allow the transmitting device to receive the encoding selection data quick enough for the transmitting device to continue transmitting encoded video data to satisfy a predetermined picture rate.

Figure 21:
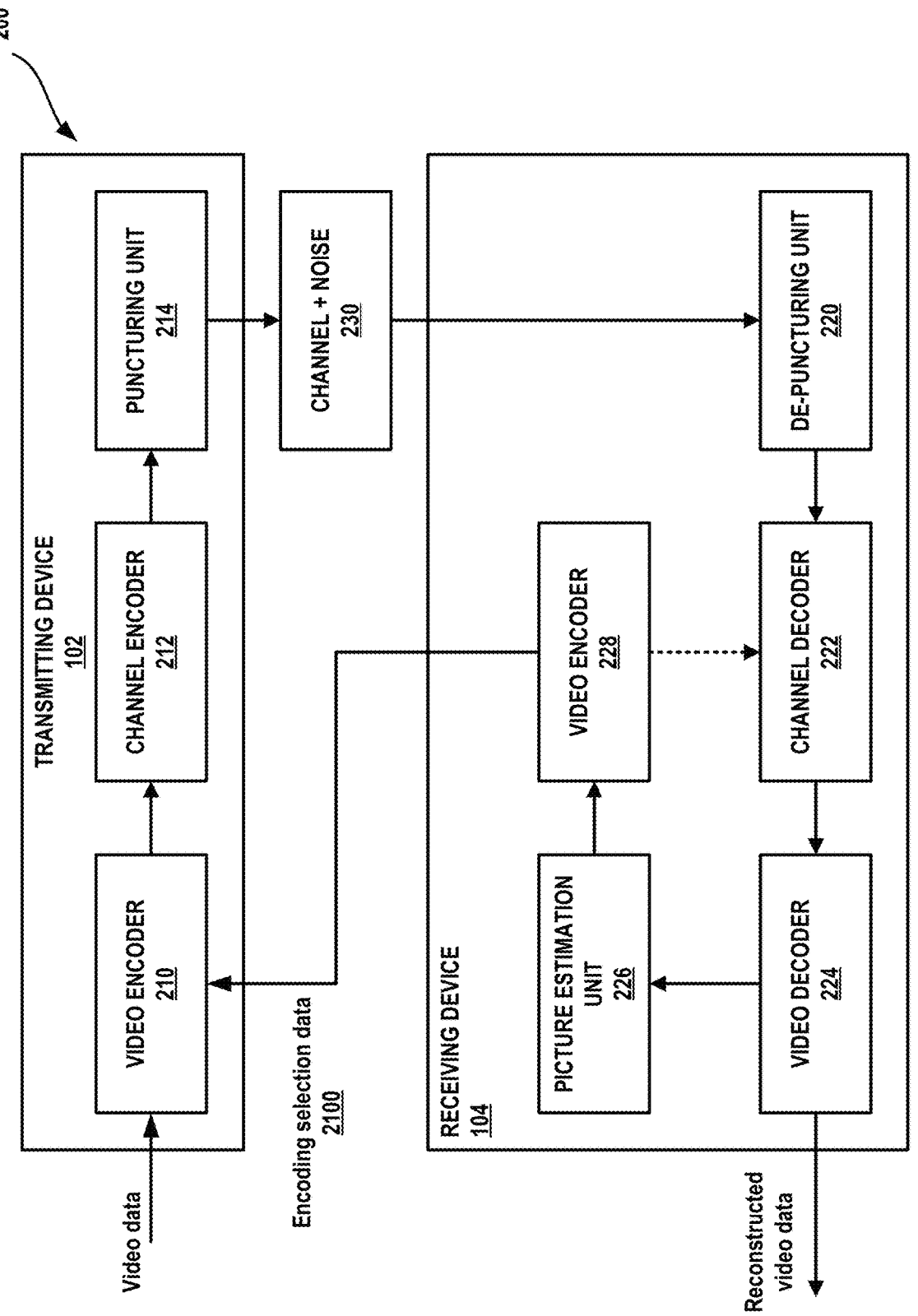
FIG. 21 is a block diagram illustrating example components of a transmitting device and a receiving device that transmits encoding selection data to the transmitting device according to techniques of this disclosure.

FIG. 21 is a block diagram illustrating example components of transmitting device 102 and receiving device 104 that transmits encoding selection data to the transmitting device according to techniques of this disclosure. In the example of FIG. 21, transmitting device 102 may include video encoder 210, channel encoder 212, and puncturing unit 214. Receiving device 104 may include de-puncturing unit 220, channel decoder 222, video decoder 224, picture estimation unit 226, and video encoder 228.

In the example of FIG. 21, video encoder 210 may encode pictures of video data. Unlike some of the examples provided above, video encoder 210 may perform a full video encoding process that may include intra and inter prediction. In some examples, video encoder 210 may encode the video data using a video codec, such as H.264/AVC, H.265/HEVC, H.266/VVC, Essential Video Coding (EVC), AV1, and so on. Channel encoder 212, puncturing unit 214, de-puncturing unit 220, and channel decoder 222 may operate in the same manner as described elsewhere in this disclosure.

Furthermore, in the example of FIG. 21, video decoder 224 of receiving device 104 may perform a video decoding process on error-corrected encoded video data generated by channel decoder 222. Video decoder 224 may perform a full video decoding process that includes intra and inter prediction. Video decoder 224 may use the same video codec as video encoder 210.

After video decoder 224 reconstructs at least part of a picture of the video data, picture estimation unit 226 may estimate corresponding parts of a subsequent picture that that follows the reconstructed picture. Picture estimation unit 226 may estimate the subsequent picture in the same manner as described elsewhere in this disclosure. Moreover, video encoder 228 may apply a video encoding process to the subsequent picture. In examples where video encoder 210 and video decoder 224 use a video codec, video encoder 228 may use the same codec.

However, in accordance with one or more techniques of this disclosure, receiving device 104 may transmit encoding selection data 2100 to transmitting device 102. Encoding selection data 2100 indicate encoding selections used to encode the estimated subsequent picture. For example, the encoding selection data may include motion parameters for blocks in the estimated subsequent picture. The motion parameters for a block may include motion vectors, reference picture indicators, merge candidate indices, affine motion parameters, and other data used to determine a prediction block for the block in one or more reference pictures. Thus, in this example, video encoder 228 may encode the block using inter prediction and encoding selection data 2100 may include motion parameters that indicate how video encoder 228 encoded the block using inter prediction.

In some examples, the encoding selection data may include intra prediction parameters for blocks in the estimated subsequent picture. The intra prediction parameters may include data indicating intra prediction modes (e.g., planar mode, DC mode, directional prediction modes, etc.) that video encoder 228 used for intra prediction of the blocks. In some examples, the encoding selection data may include other information, such as information that describes how video encoder 228 partitioned the estimated subsequent picture into blocks, whether residual prediction is used, whether and how intra block copy (IBC) is used, whether specific filters are used, and so on.

Video encoder 210 may use encoding selection data 2100 when encoding the actual (non-estimated) subsequent picture. That is, instead of searching through different possibilities during the video encoding process, video encoder 210 may use the video encoding selections indicated by the encoding selection data 2100. For example, the encoding selection data 2100 may indicate that a specific block of the subsequent picture is encoded with a specific intra prediction mode. Accordingly, in this example, when encoding the subsequent picture, video encoder 210 may encode the specific block with the specific intra prediction mode without analyzing different potential intra prediction modes to select the specific intra prediction mode. In another example, encoding selection data 2100 may indicate a motion vector and reference picture for a specific block of the subsequent picture. Accordingly, in this example, when encoding the subsequent picture, video encoder 210 may use the motion vector to determine a prediction block in the reference picture without analyzing potential reference pictures and motion vectors. Video encoder 210 may use the prediction block to encode the specific block.

Transmitting device 102 may handle encoded video data for the subsequent picture in the same manner as other pictures. Additionally, receiving device 104 may handle the encoded video data for the subsequent picture in the same manner as other encoded video data. Thus, after video decoder 224 reconstructs at least part of the subsequent picture, picture estimation unit 226 may predict corresponding parts of a picture that follows the subsequent picture, video encoder 228 may encode video data of that estimated following picture and transmit encoding selection data for the estimated following picture, and the cycle can repeat. In this way, some of the burden of encoding video data may be shifted from video encoder 210 of transmitting device 102 to video encoder 228 of receiving device 104. This may reduce the resource requirements of transmitting device 102.

The process described with respect to FIG. 21 may be adapted for use with DVC techniques. For example, transmitting device 102 may apply a decimation pattern to encoded video data (e.g., according to any of the examples provided elsewhere in this disclosure) such that transmitting device 102 only transmits some encoded video data but still transmits error correction data for the decimated video data. Channel decoder 222 of receiving device 104 may receive error correction data for a specific picture from transmitting device (e.g., by way of de-puncturing unit 220). In this example, channel decoder 222 may apply the error correction process to generate error-corrected encoded video data based on the error correction data for the specific picture and the encoded video data for the specific picture generated by video encoder 228 of receiving device 104. Video decoder 224 may decode the error-corrected encoded video data to reconstruct the specific feature.

In some instances, transmitting device 102 needs to transmit encoded video data according to a schedule. For instance, transmitting device 102 may need to transmit encoded video data to receiving device 104 according to predetermined picture per minute rate in order to support a specific application. Thus, circumstances may occur in which transmitting device 102 does not receive encoding selection data for a picture in time for transmitting device 102 to encode and transmit encoded video data for the picture. Accordingly, in some examples, based on determining that encoding selection data for a picture is not received from receiving device 104 prior to expiration of a time limit, video encoder 210 may encode the picture without use the encoding selection data for the picture. Video encoder 210 may use a limited video encoding process to encode the picture. Furthermore, in some examples, the encoded video data for the picture may include encoding selection data generated by video encoder 210. In some examples, the encoded video data for the picture may include data indicating that the encoded video data for the picture was not generated based on encoding selection data generated by receiving device 104. The time limit may be subject to or defined based on the capabilities of transmitting device 102.

The encoding selection data and time limit can be defined in per image segment (e.g., slice, region, etc.) basis. Thus, in this disclosure, discussion of encoding selection data, encoded video data, or other types of data for a picture may apply only with respect to an individual segment of the picture.

Figure 22:
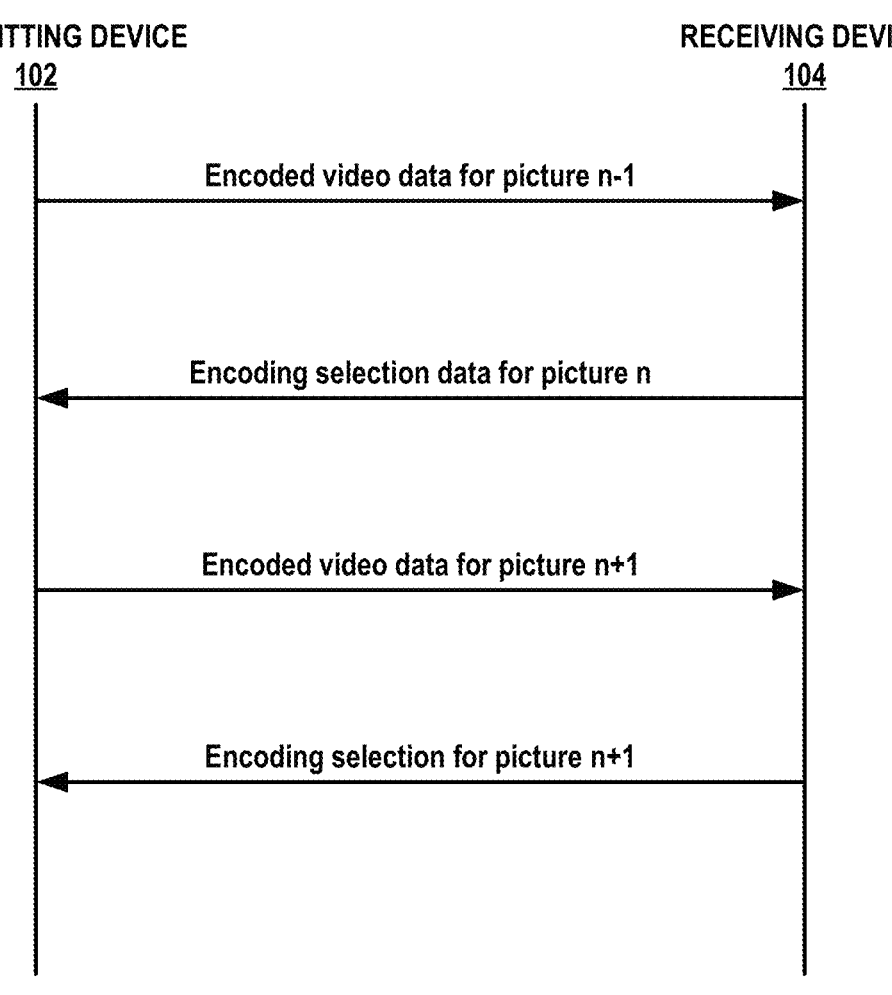
FIG. 22 is a communication diagram illustrating an example exchange of data between a transmitting device and a receiving device that includes transmission and reception of encoding selection data according to techniques of this disclosure.

FIG. 22 is a communication diagram illustrating an example exchange of data between transmitting device 102 and receiving device 104 that includes transmission and reception of encoding selection data according to techniques of this disclosure. In the example of FIG. 22, transmitting device 102 transmits encoded video data for a picture n−1 to receiving device 104. Receiving device 104 may reconstruct picture n−1 based on the encoded video data for picture n−1. Additionally, receiving device 104 may estimate and encode a picture n based on picture n−1. Receiving device 104 may transmit encoding selection data for picture n to transmitting device 102. Transmitting device 102 may encode picture n based on the encoding selection data for picture n and transmit the resulting encoded video data for picture n to receiving device 104. The process may repeat multiple times. Thus, in the example of FIG. 22, receiving device 104 may reconstruct picture n based on the encoded video data for picture n, estimate a picture n+1 based on picture n and/or one or more other previously reconstructed pictures, encode picture n+1, and transmit encoding selection data for picture n+1 to transmitting device 102.

Figure 23:
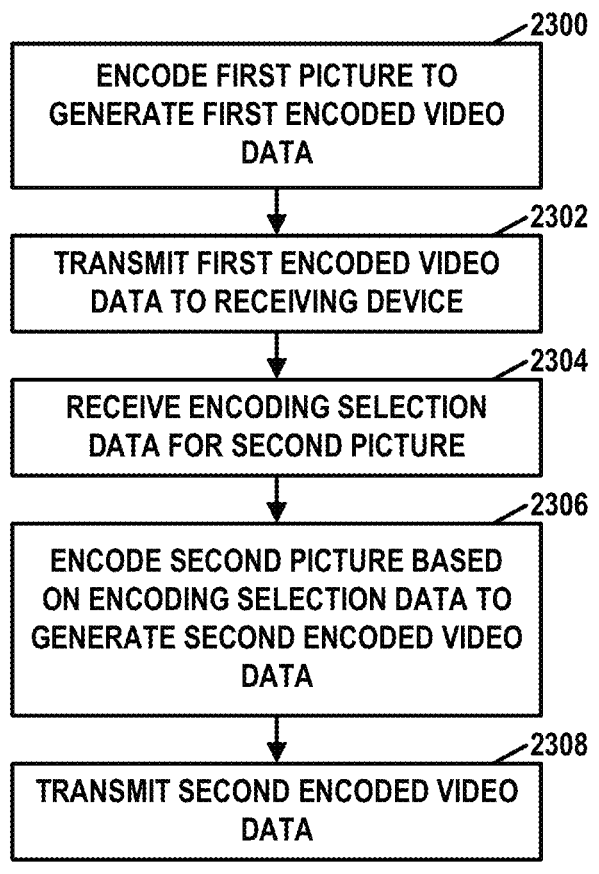
FIG. 23 is a flowchart illustrating an example operation of a transmitting device in which the transmitting device receives encoding selection data according to techniques of this disclosure.

FIG. 23 is a flowchart illustrating an example operation of transmitting device 102 in which transmitting device 102 receives encoding selection data according to techniques of this disclosure. In the example of FIG. 23, video encoder 210 encodes a first picture of video data to generate first encoded video data (2300). In some examples, if transmitting device 102 has not received encoding selection data for the first picture, transmitting device 102 may perform a limited video encoding process on the first picture. The limited video encoding process may use relatively less computationally intensive coding tools than a full video encoding process. For example, the limited video encoding process may use intra prediction but not inter prediction.

Transmitting device 102 may transmit the first encoded video data to receiving device 104 (2302). In some examples, transmitting device 102 may apply channeling encoding process to the first encoded video data to generate error correction data for the first encoded video data. Transmitting device 102 may transmit the first encoded video data and the error correction data to receiving device 104.

Subsequently, transmitting device 102 may receive from receiving device 104, encoding selection data for a second picture of the video data (2304). The encoding selection data may indicate encoding selections used to encode an estimate of the second picture. The second picture follows the first picture in decoding order. In some examples, the second picture may occur before or after the first picture in output coder. In some examples, the encoding selection data is entropy encoded. Accordingly, in such examples, transmitting device 102 may entropy decode the encoding selection data. For example, transmitting device 102 may apply CABAC decoding, Golomb-Rice decoding, or another type of entropy decoding to the encoding selection data. In some examples, the encoding selection data is channel encoded. Accordingly, transmitting device 102 may apply an error correction operation to the encoding selection data based on error correction data for the encoding selection data.

Video encoder 210 of transmitting device 102 may encode the second picture based on the encoding selection data to generate second encoded video data (2306). For example, the encoding selection data may include data indicating how to partition specific macroblocks into CUs. In this example, video encoder 210 may partition the macroblocks into CUs in the manner indicated by the encoding selection data. In another example, the encoding selection data may indicate an intra prediction mode for a block (e.g., a CU or PU) and video encoder 210 may use the indicated intra prediction mode for encoding the block. Thus, in this example, the encoding selection data received from receiving device 104 may include intra prediction parameters for blocks of the second picture and video encoder 210 may, as part of encoding the second picture, perform intra prediction based on the intra prediction parameters for the blocks of the second picture to generate predictive blocks. The second encoded video data may include encoded video data based on the predictive blocks.

In another example, the encoding selection data received from receiving device 104 includes motion parameters for blocks of the second picture and transmitting device 102 may, as part of encoding the second picture, perform motion compensation based on the motion parameters for the blocks of the second picture to generate predictive blocks. The second encoded video data includes encoded video data based on the predictive blocks.

Transmitting device 102 may transmit the second encoded video data to the receiving device (2308). In some examples the second encoded video data does not include encoding selection data indicating encoding selections that transmitting device 102 used in encoding the second picture or that receiving device 104 used in encoding the estimate of the second picture. It may be unnecessary for the second encoded video data to include the encoding selection data because receiving device 104 generated the encoding selection data and therefore already has the encoding selection data.

In some examples, the operation of FIG. 23 may be used with DVC techniques. For example, transmitting device 102 may receive encoding selection data for a third picture of the video data. The encoding selection data for the third picture may indicate encoding selections used to encode an estimate of the third picture. Video encoder 210 may encode the third picture based on the encoding selection data for the third picture to generate third encoded video data. Channel encoder 212 may apply a channel encoding process that generates error correction data for the third encoded video data. Transmitting device 102 may transmit the error correction data for the third encoded video data to the receiving device without transmitting at least a portion of the third encoded video data.

FIG. 24 is a flowchart illustrating an example operation of receiving device 104 in which receiving device 104 transmits encoding selection data according to techniques of this disclosure. In the example of FIG. 24, receiving device 104 may receive first encoded video data from transmitting device (2400).

Video decoder 224 of receiving device 104 may reconstruct a first picture of the video data based on the first encoded video data (2402). Picture estimation unit 226 may receiving device 104 may estimate a second picture of the video data based on the first picture (2404). The second picture may be a picture occurring after the first picture in decoding order.

Video encoder 228 of receiving device 104 may generate encoding selection data for the estimated second picture (2406). The encoding selection data indicates encoding selections used to encode the estimated second picture. For example, as part of encoding the estimated second picture, video encoder 228 may perform motion compensation based on motion parameters for the blocks of the second picture to generate predictive blocks. In this example, the encoding selection data may include the motion parameters for blocks of the second picture the one or more processors. In some examples, as part of encoding the second picture, video encoder 228 may perform intra prediction based on the intra prediction parameters for the blocks of the second picture to generate predictive blocks. In this example, the encoding selection data may include intra prediction parameters for blocks of the second picture.

Receiving device 104 may transmit, to transmitting device 102, the encoding selection data for the second picture (2408). In some examples, receiving device 104 may apply entropy encoding (e.g., CABAC encoding, Golomb-Rice coding, etc.) to the encoding selection data for the second picture prior to transmitting the encoding selection data for the second picture. In some examples, receiving device 104 may perform a channel encoding process on encoding selection data to generate error correction data for the encoding selection data. Receiving device 104 may transmit the encoding selection data and error correction data for the encoding selection data to transmitting device 102. In some examples, communication interface 134 (FIG.

1) of receiving device 104 may modulate the encoding selection data at a lower modulation order as compared to other data transmissions in a data link (e.g., wireless sidelink channel 112, wireless uplink/downlink channels, etc.) between receiving device 104 and transmitting device 102. This may increase the likelihood of transmitting device 102 receiving the encoding selection data correctly.

Subsequently, receiving device 104 may receive second encoded video data from the transmitting device (2410). Video decoder 224 may reconstruct the second picture based on the second encoded video data (2412). In some examples, the second encoded video data does not include the encoding selection data. Video decoder 224 may apply the decoding process comprises using the encoding selection data to reconstruct the second picture based on the second encoded video data.

The process of FIG. 24 may be used with DVC techniques. For example, picture estimation unit 226 may estimate a third picture of the video data based on one or more of the first or second pictures. Video encoder 228 may encode the estimated third picture to generate third encoded video data. Receiving device 104 may transmit third encoding selection data to transmitting device 102. The third encoding selection data may indicate encoding selections used to encode the estimated third picture. Subsequently, receiving device 104 may receive error correction data for the third picture. Channel decoder 222 may apply an error correction process to generate error-corrected encoded video data for the third picture based on the error correction data for the third picture and the third encoded video data. Video decoder 224 may apply a decoding process that reconstructs the third picture based on the error-corrected encoded video data for the third picture. In some examples in which transmitting device 102 and receiving device 104 use DVC techniques, the error-corrected video data for the third picture does not include the third encoding selection data. However, video decoder 224 may apply the decoding process using the third encoding selection data generated by video encoder 228 of receiving device 104 to reconstruct the third picture based on the error-corrected encoded video data for the third picture.

Figure 25:
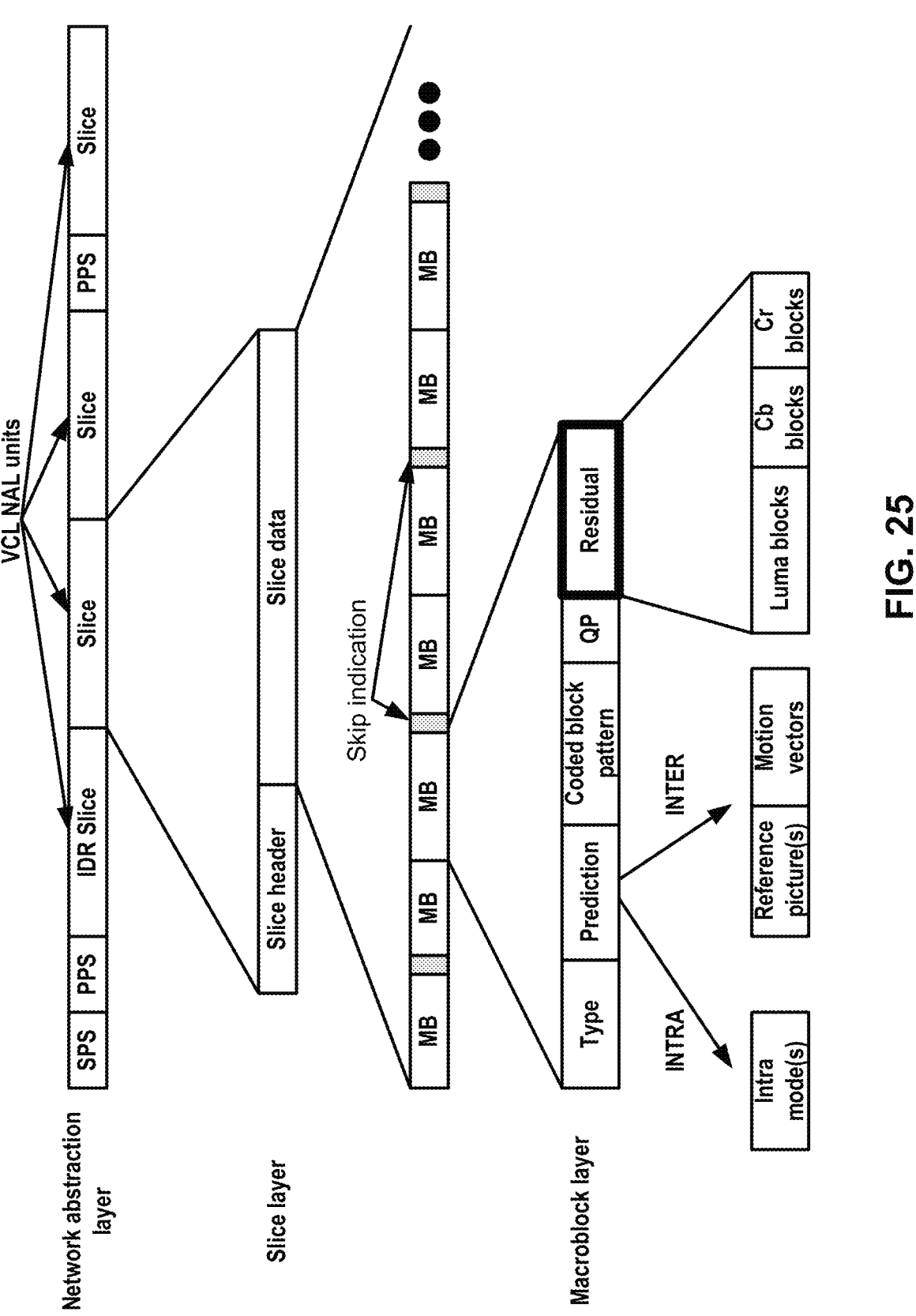
FIG. 25 is a conceptual diagram illustrating an example hierarchy of encoded video data according to techniques of this disclosure.

FIG. 25 is a conceptual diagram illustrating an example hierarchy of encoded video data according to techniques of this disclosure. More specifically, FIG. 25 illustrates a hierarchy of encoded video data generated using the H.264/AVC video coding standard. As shown in the example of FIG. 25, a network abstraction layer (NAL) is the highest level of the hierarchy. At the network abstraction layer, data is organized into NAL units. In some examples, NAL units are assigned to different packets or coding blocks for transmission. The NAL units of the network abstraction layer may include sequence parameter sets (SPSs) and picture parameter sets (PPSs) that contain high-level syntax. The NAL units of the network abstraction layer may also include video coding layer (VCL) NAL units. The VCL NAL units may include slice NAL units that contain slice level data. A slice may be a series of macroblocks within a picture. The slices may include instantaneous decoder refresh (IDR) slices and regular slices. Decoding of a IDR slice does not depend on any other slice. Regular slices may have dependencies to other slices.

Each slice NAL unit may include a slice header and slice data. The slice header of a slice NAL unit includes information for decoding the slice data of the slice NAL unit. The slice data of a slice NAL unit includes a series of macroblocks (MBs). Skip indications may be interspersed among the MBs. Each of the MBs contains encoded video data for a specific block of a slice. Furthermore, as shown FIG. 25, a MB may include a type indicator, a prediction information, a coded block pattern, a quantization parameter (QP) and encoded residual data. If the MB is encoded using intra prediction, the prediction data may indicate one or more intra modes used to encode the MB. If the MB is encoded using inter prediction, the prediction data may indicate one or more reference pictures and one or more motion vectors. The encoded residual data for a MB may include encoded residual data for luma blocks within the MB, encoded residual data for Cb blocks within the MB, and encoded residual data for Cr blocks within the MB. In general, the encoded residual data is the most voluminous part of the encoded video data.

In accordance with the techniques of this disclosure, everything in the hierarchy at the macroblock layer except the encoded residual data may be encoding selection data. Thus, in some examples, receiving device 104 may the type data, the prediction data, the coded block pattern, and the QP to transmitting device 102 for each MB of an estimated picture. Furthermore, in some examples, transmitting device 102 may transmit only encoded residual data of a MB to receiving device 104 and does not transmit the type data, the prediction data, the coded block pattern, or the QP of the MB. In some examples, the encoding selection data transmitted by receiving device 104 may include slice header data, SPS data, and PPS data. Transmitting device 102 and receiving device 104 may exchange information or may be preconfigured with information indicating encoder and decoder capabilities.

In some examples, transmitting device 102 may send data in addition to encoded residual data for some pictures, some MBs, or some slices. Transmitting device 102 may signal information (e.g., a bit) at the network abstraction layer (e.g., as a picture level control field) that may indicate if DVC-based approach is used or if a regular compression may should be used for a specific picture.

Figure 26:
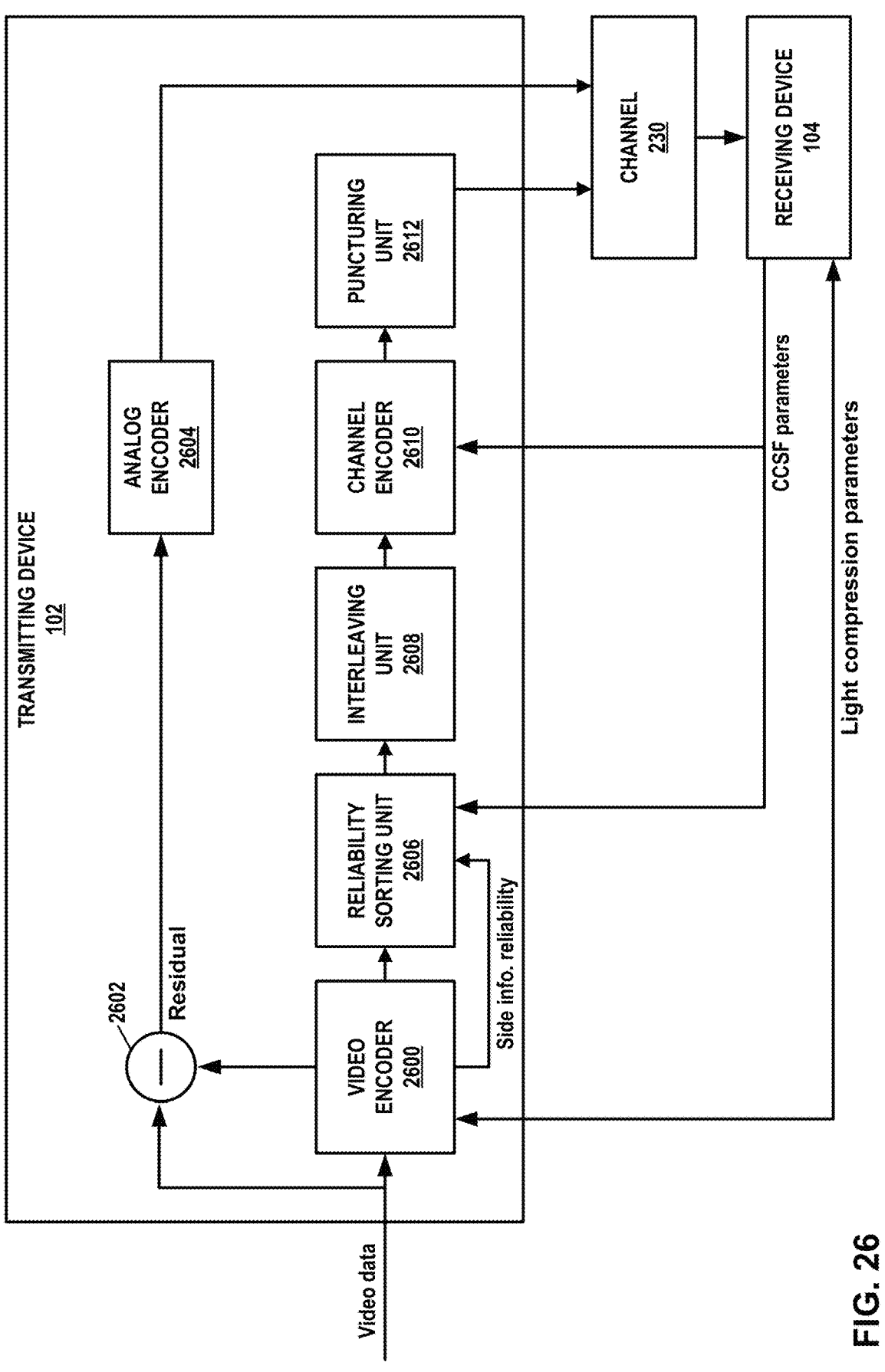
FIG. 26 is a block diagram illustrating alternative example components of a transmitting device according to one or more techniques of this disclosure.

FIG. 26 is a block diagram illustrating alternative example components of transmitting device 102 according to one or more techniques of this disclosure. In the example of FIG. 26, transmitting device 102 performs digital encoding and analog encoding on video data. Transmitting device 102 transmits digitally encoded video data and analog encoded video data to receiving device 104 via channel 230.

In the example of FIG. 26, includes a video encoder 2600, a residual generation unit 2602, an analog encoder 2604, a reliability sorting unit 2606, an interleaving unit 2608, a channel encoder 2610, and a puncturing unit 2612. Video encoder 2600 may obtain video data and operate in much the same way as video encoder 210 of FIG. 2. As shown in the example of FIG. 26A, video encoder 2600 may receive values of encoding parameters (e.g., encoding selection parameters) sent by receiving device 104. In some examples, video encoder 2600 may send values of encoding parameters and/or encoding selection data to receiving device 104. In this way, video encoder 2600 of transmitting device 102, a video encoder of receiving device 104, and video decoder of receiving device 104 may operate based on the same values of the encoding parameters.

Video encoder 2600 may also output the prediction data to residual generation unit 2602. Additionally, video encoder 2600 may apply a higher level of quantization than video encoder 210. Residual generation unit 2602 may generate residual data based on the prediction data and the video data.

Analog encoder 2604 may perform an analog encoding operation on the residual data. Example details of the analog encoding operation may be found in U.S. Pat. No. 11,553, 184, filed Dec. 29, 2020, entitled "Hybrid Digital-Analog Modulation for Transmission of Video Data"; U.S. Pat. No. 11,431,962, filed Dec. 29, 2020, entitled "Analog Modulated Video Transmission with Variable Symbol Rate"; and U.S. Pat. No. 11,457,224, filed Dec. 29, 2020, entitled "Interlaced Coefficients in Hybrid Digital-Analog Modulation for Transmission of Video Data."

For instance, in some examples, analog encoder 2604 may generate coefficients based on the residual data. For example, analog encoder 2604 may binarize the residual data to generate coefficients. Analog encoder 2604 may quantize the coefficients. In other examples of generating coefficients based on video data, analog encoder 2604 may perform more, fewer, or different steps. For instance, in some examples, analog encoder 2604 does not perform a quantization step. In still other examples, analog encoder 2604 does not perform a step of binarizing the residual data.

Furthermore, analog encoder 2604 may generate coefficient vectors. Each of the coefficient vectors includes n of the coefficients. Analog encoder 2604 may generate the coefficient vectors in one of a variety of ways. For instance, in one example, analog encoder 2604 may generate a coefficient vector as a group of n consecutive coefficients according to a coefficient coding order. Various coefficient coding orders may be used, such as raster scan order, zigzag scan order, reverse raster scan order, vertical scan order, and so on. In some examples, a coefficient vector may include one or more negative coefficients and one or more positive coefficients (i.e., signed coefficients). In some examples, a coefficient vector only includes non-negative coefficients (i.e., unsigned coefficients).

For each of the coefficient vectors, analog encoder 2604 may determine an amplitude value for the coefficient vector based on a mapping pattern. For each respective allowed coefficient vector in a plurality of allowed coefficient vectors, the mapping pattern maps the respective allowed coefficient vector to a respective amplitude value in a plurality of amplitude values. The respective amplitude value is adjacent in an n-dimensional space to at least one other amplitude value in the plurality of amplitude values that is adjacent to the respective amplitude value in a monotonic number line of the amplitude values.

In some examples, to determine the amplitude value for the coefficient vector, analog encoder 2604 may determine a position in the n-dimensional space. Coordinates of the position in the n-dimensional space are based on the coefficients of the coefficient vector, and the mapping pattern maps different positions in the n-dimensional space to different amplitude values in the plurality of amplitude values. Analog encoder 2604 may determine the amplitude value for the coefficient vector as the amplitude value corresponding to the determined position in the n-dimensional space.

Analog encoder 2604 may modulate an analog signal based on the amplitude values for the coefficient vectors. For instance, analog encoder 2604 may determine an analog symbol based on a pair of the amplitude values. The analog symbol may correspond to a phase shift and a power of a point in an I-Q plane that having coordinates indicated by the amplitude value pair. Analog encoder 2604 may modulate the analog signal during a symbol sampling instant based on the determined phase shift and power. A modem (e.g., communication interface 118) of transmitting device 102 may be configured to output the analog signal.

Furthermore, in the example of FIG. 26A, reliability sorting unit 2606 may obtain the encoded video data generated by video encoder 2600. Reliability sorting unit 2606 may obtain reliability side information from video encoder 2600. In some examples, reliability sorting unit 2606 may receive values of channel and compression state feedback (CCSF) parameters. The values of the CCSF parameters may provide information about the conditions of channel 230 (e.g., signal-to-noise ratio, latency time, network bandwidth congestion, etc.). In some examples, the values of the CCSF parameters provide information related to the prediction reliability and quality. For example, the values of the CCSF parameters may include a decimation pattern indicator. In some examples, the values of the CCSF parameters may enable channel encoder 2610 to determine a decimation pattern.

Interleaving unit 2608 may perform an interleaving process that may ensure that reliable and unreliable bits are equally spread across code blocks. For example, encoded video data may be divided into code blocks. Channel encoder 2610 may generate separate sets of error correction data for each of the code blocks. Prior to channel encoder 2610 generating the error correction data, interleaving unit 2608 may interleave encoded video data among the code blocks according to a predefined interleaving pattern. For instance, encoded video data representing different adjacent pixels may be interleaved into different code blocks. A de-interleaving process performed at receiving device 104 reverses the interleaving process after application of the channel decoding process. Thus, if one of the code blocks is corrupted during transmission, the pixels decoded from the corrupted code block may be spatially dispersed within a picture among pixels decoded from uncorrupted code blocks.

Channel encoder 2610 of transmitting device 102 may perform a channel encoding process on the video data obtained from interleaving unit 2608. Channel encoder 2610 may perform channel encoding process in accordance with any of the examples provided with respect to channel encoder 212 (FIG. 2). Puncturing unit 2612 may perform a bit puncturing operation on error correction data generated by channel encoder 2610. Puncturing unit 2612 may perform the bit puncturing operation on the error correction data in accordance with any of the examples provided with respect to puncturing unit 214 (FIG. 2). Transmitting device 102 may transmit encoded video data and error correction data (e.g., bit-punctured error correction data) to receiving device 104 via channel 230.

Figure 27:
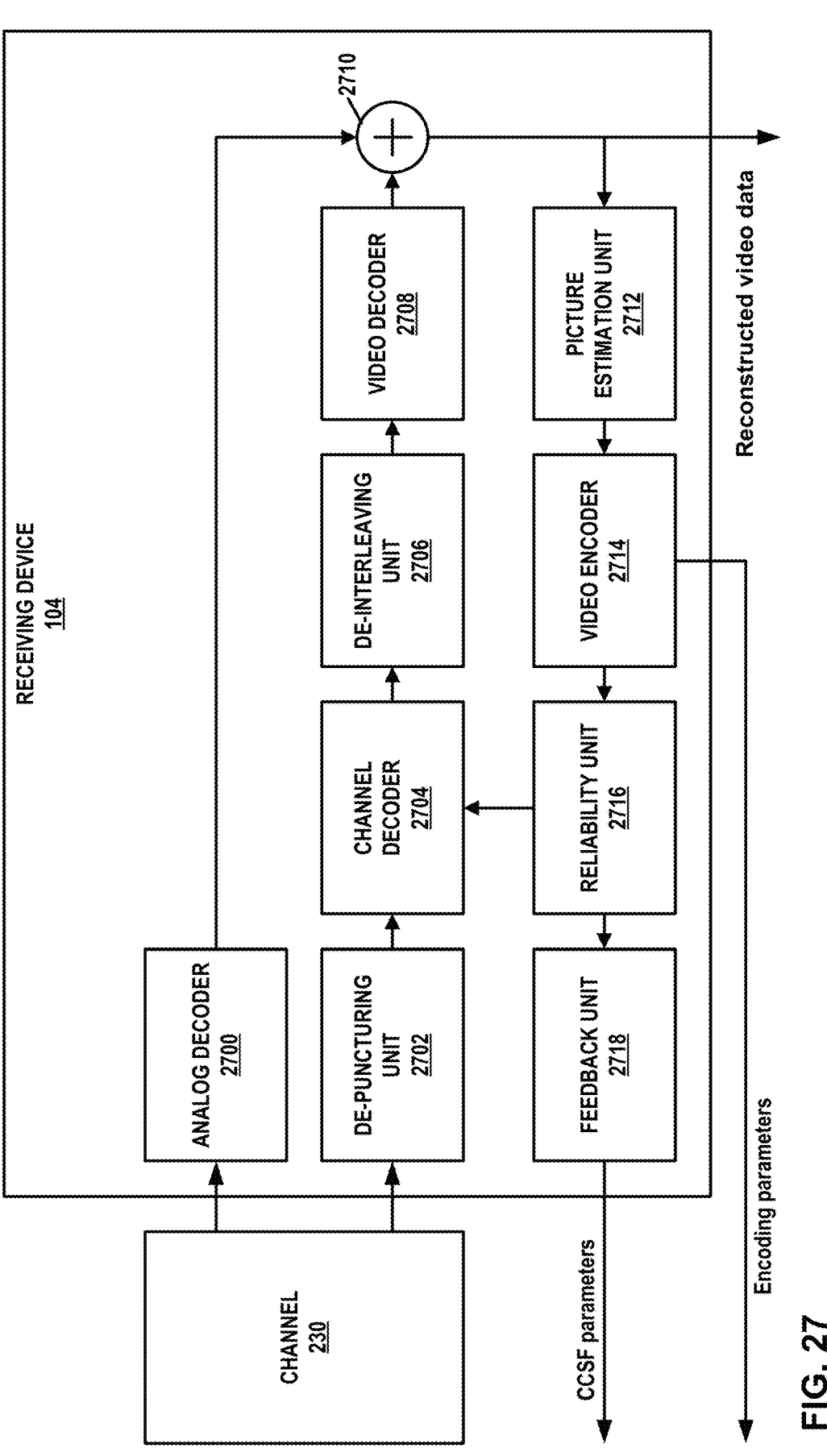
FIG. 27 is a block diagram illustrating example alternative components of a receiving device according to one or more techniques of this disclosure.

FIG. 27 is a block diagram illustrating example alternative components of receiving device 104 according to one or more techniques of this disclosure. The version of receiving device 104 shown in FIG. 27 may be compatible with the version of transmitting device 102 shown in FIG. 26. In the example of FIG. 27, receiving device 104 includes an analog decoder 2700, a de-puncturing unit 2702, a channel decoder 2704, a de-interleaving unit 2706, a video decoder 2708, a reconstruction unit 2710, a picture estimation unit 2712, a video encoder 2714, a reliability unit 2716, and a feedback unit 2718.

Analog decoder 2700 may obtain analog encoded video data. Analog decoder 2700 may perform an analog decoding operation to reconstruct residual data. Example details of the analog decoding operation may be found in U.S. Pat. Nos. 11,553,184, 11,431,962, and 11,457,224.

For instance, in some examples, analog decoder 2700 may determine, based on an analog signal, amplitude values for a plurality of coefficient vectors. For instance, analog decoder 2700 may determine a phase shift and a power for a symbol sampling instant of the analog signal. Analog decoder 2700 may determine a point in an I-Q plane indicated by the determined phase shift and power. Analog decoder 2700 may then determine an amplitude value pair as the coordinates in the point in the I-Q plane.

For each of the coefficient vectors, analog decoder 2700 may determine coefficients in the coefficient vector based on the amplitude value for the coefficient vector and a mapping pattern. For each respective allowed coefficient vector in a plurality of allowed coefficient vectors, the mapping pattern may map the respective allowed coefficient vector to a respective amplitude value in a plurality of amplitude values. The respective amplitude value is adjacent in an n-dimensional space to at least one other amplitude value in the plurality of amplitude values that is adjacent to the respective amplitude value in a monotonic number line of the amplitude values. Each of the coefficient vectors may include n of the coefficients. The value n may be greater than or equal to 2. In some examples, analog decoder 2700 may determine the coefficients in the coefficient vector as coordinates of a position in the n-dimensional space that corresponds to the amplitude value. The mapping pattern maps different positions in the n-dimensional space to different amplitude values in the plurality of amplitude values. In some examples, the coefficient vector includes one or more negative coefficients and one or more positive coefficients. In other examples, the coefficient vector may include only non-negative coefficients.

In some examples, as part of determining the coefficients, analog decoder 2700 may obtain sign values, where the sign values indicate positive/negative signs of the coefficients in the coefficient vector. In such examples, analog decoder 2700 may determine, based on the amplitude value for the coefficient vector and the mapping pattern, absolute values of the coefficients in the coefficient vector. Analog decoder 2700 may reconstruct the coefficients in the coefficient vector at least in part by applying the sign values to the absolute values of the coefficients in the coefficient vector. In some examples, as part of determining the coefficients, analog decoder 2700 may obtain data representing a shift value. In such examples, the shift value indicates a most-negative coefficient of the coefficients in the coefficient vector. Additionally, in such examples, analog decoder 2700 may determine, based on the amplitude value for the coefficient vector and the mapping pattern, intermediate values of the coefficients in the coefficient vector. Analog decoder 2700 may reconstruct the coefficients in the coefficient vector at least in part by adding the shift value to each of the intermediate values of the coefficients in the coefficient vector.

Furthermore, analog decoder 2700 may generate residual data based on the coefficients in the coefficient vectors. For instance, in one example, analog decoder 2700 may dequantize the coefficients of the coefficient vectors. In this example, analog decoder 2700 may perform a de-binarization process to convert the coefficients into digital sample values. For instance, analog decoder 2700 may apply an inverse DCT to the coefficients to convert the coefficients into digital sample values. In this way, analog decoder 2700 may generate digital residual sample values.

De-puncturing unit 2702 may obtain encoded video data and bit-punctured error correction data. De-puncturing unit 2702 may apply a de-puncturing process to the bit-punctured error correction data to reconstruct the error correction data. De-puncturing unit 2702 may apply the de-puncturing process in accordance with any of the examples provided elsewhere in this disclosure with respect to de-puncturing unit 220 of FIG. 2.

Channel decoder 2704 may perform a channel decoding process that modifies encoded video data (e.g., encoded video data received via channel 230 or encoded video data generated by video encoder 2714 and, in some examples, modified by reliability unit 714) based on the error correction data. Channel decoder 2704 may perform the channel decoding process in accordance with any of the examples provided elsewhere in this disclosure with respect to channel decoder 222 of FIG. 2.

De-interleaving unit 2706 may perform a de-interleaving operation on the error-corrected encoded video data generated by channel decoder 2704. For example, the de-interleaving process may reverse the interleaving process performed by interleaving unit 2608 of transmitting device 102. For instance, the de-interleaving process may perform the de-interleaving process according to an interleaving pattern used by interleaving unit 2608.

Video decoder 2708 may obtain encoded video data (e.g., de-interleaved encoded video data generated by de-interleaving unit 2706). Video decoder 2708 may perform a video decoding process on the encoded video data to reconstruct pictures of the video data. The video decoding process performed by video decoder 2708 may be the same as that described in any of the examples provided elsewhere in this disclosure with respect to video decoder 224. Reconstruction unit 2710 of receiving device 104 may add residual data generated by analog decoder 2700 to corresponding samples of the reconstructed video data generated by video decoder 2708, thereby fully reconstructing pictures of the video data.

Furthermore, in the example of FIG. 27, picture estimation unit 2712 may estimate one or more pictures based on previously reconstructed pictures. As previously mentioned in this disclosure, discussion of pictures may apply with respect to segments of pictures, such as slices. Picture estimation unit 2712 may estimate the pictures in accordance with any of the examples provided elsewhere in this disclosure with respect to picture estimation unit 226. Video encoder 2714 may perform a video encoding process on the estimated pictures. As part of performing the video encoding process, video encoder 2714 may determine encoding selection data, such as encoding selection data 2100, as previously discussed. Receiving device 104 may transmit the encoding selection data to transmitting device 102. In some examples, video encoder 2714 may send encoding parameters, such as those discussed with respect to FIG. 4 and FIG. 5, to transmitting device 102 that video encoder 2600 of transmitting device 102 may perform a limited encoding process in the same way as video encoder 2714 of receiving device 104. In some examples, video encoder 2714 may determine and send multiview encoding cues to transmitting device 102.

Reliability unit 2716 may operate in much the same way as reliability unit 1002 (FIG. 10). Feedback unit 2718 may send prediction quality feedback (e.g., CCSF parameters) based on the output of reliability unit 1002 to transmitting device 102.

In some examples of this disclosure, video encoder 2600 of transmitting device 102 generate prediction data for a set of pictures and residual generation unit 2602 may generate residual data based on the first prediction data and the first set of pictures. Video encoder 2600 may apply transform the prediction data to generate transform blocks, quantize transform coefficients of the transform blocks, and apply entropy encoding to syntax elements representing the quantized transform coefficients to generate entropy encoded syntax elements. The first encoded video data may include the entropy encoded syntax elements. Channel encoder 2610 may perform a channel encoding process that generates error correction data for encoded video data, including the entropy encoded syntax elements. Analog encoder 2604 may perform analog modulation on the residual data to generate analog modulated residual data. A communication interface of transmitting device 102 may transmit the analog modulated residual data, the error correction data, and the encoded video data.

a communication interface of receiving device 104 may receive analog modulated residual data and receive, from the transmitting device, error correction data and decimated video data. The decimated video data may include encoded video data to which a decimation pattern has been applied. The encoded video data is generated based on a set of pictures of the video data. Channel decoder 2704 may apply an error correction process to generate error-corrected encoded video data based on the encoded video data and the error correction data. The error-corrected encoded video data includes entropy-encoded syntax elements representing quantized transform coefficients. Video decoder 2708 may perform the decoding process to reconstruct the second set of pictures based on the error-corrected encoded video data. As part of applying the decoding process to reconstruct the set of pictures, video decoder 2708 may apply entropy decoding to the syntax elements to obtain the quantized transform coefficients, inverse quantize the quantized transform coefficients to generate inverse quantized transform coefficients, and apply an inverse transform to the inverse quantized transform coefficients to generate prediction data. Analog decoder 2700 may demodulate the analog modulated residual data to obtain residual data. Reconstruction unit 2710 may reconstruct the set of pictures based on the prediction data and the residual data.

The following is a non-limiting list of clauses that are in accordance with one or more techniques of this disclosure.

Clause 1A. A method of decoding video data, the method comprising: obtaining, at a receiving device and from a transmitting device, error correction data, wherein the error correction data provides error correction information and is generated based on encoded video data of one or more blocks of a picture of the video data; generating, at the receiving device, prediction data for the picture using one or more coding tools not used for generating the encoded video data of the one or more blocks, wherein the prediction data for the picture comprises predictions of the blocks of the picture based at least in part on blocks of one or more previously reconstructed pictures of the video data; generating, at the receiving device, encoded video data based on the prediction data for the picture; generating, at the receiving device, error-corrected encoded video data using the error correction data to perform an error correction operation on the encoded video data; and performing, at the receiving device, a reconstruction operation that reconstructs the blocks of the picture based on the error-corrected encoded video data, wherein the reconstruction operation is controlled by values of one or more parameters.

Clause 2A. The method of clause 1A, further comprising receiving, at the receiving device and from the transmitting device, the values of the parameters.

Clause 3A. The method of clause 1A, further comprising determining, at the receiving device, the values of the parameters without receiving the values of the parameters from the transmitting device.

Clause 4A. The method of any of clauses 1A-3A, wherein: the parameters include one or more quantization parameters, generating the encoded video data comprises using the quantization parameters to quantize transform coefficients generated based on the prediction data for the picture, and performing the reconstruction operation comprises using the quantization parameters to inverse quantize transform coefficients of the error-corrected encoded video data.

Clause 5A. The method of clause 4A, wherein the method further comprises: calculating the quantization parameters based on an entropy ratio of quantized transform coefficients and unquantized transform coefficients.

Clause 6A. The method of any of clauses 1A-5A, wherein: the parameters include a transform size parameter, generating the encoded video data comprises applying, to sample domain data for the picture, a forward transform having a transform size indicated by the transform size parameter, and performing the reconstruction operation comprises applying, to transform coefficients of the error-corrected encoded video data, an inverse transform having the transform size indicated by the transform size parameter.

Clause 7A. The method of any of clauses 1A-6A, wherein: the parameters include a parameter that indicates a quantity of transform coefficients; generating the encoded video data comprises including in the encoded video data, a set of transform coefficients that includes the indicated quantity of transform coefficients, and performing the reconstruction operation comprises parsing, from the error-corrected encoded video data, a set of transform coefficients that includes the indicated quantity of transform coefficients.

Clause 8A. The method of clause 7A, wherein: obtaining the encoded video data and the error correction data comprises receiving, at the receiving device, the encoded video data and the error correction data from the transmitting device via a communication channel, and the method further comprises applying an optimization process that determines a number of transform coefficients based on a signal-to-noise ratio of data transmitted on the communication channel.

Clause 9A. The method of any of clauses 1A-8A, wherein: the parameters include bit-width parameters for a plurality of index values, and for each respective index value of the plurality of index values: performing the reconstruction operation comprises parsing a first set of bits from the error-corrected encoded video data, wherein the first set of bits indicates a transform coefficient having the respective index value and a quantity of bits in the first set of bits is equal to a bit-width indicated by the bit-width parameter for the respective index value, generating the encoded video data comprises including a second set of bits in the encoded video data, wherein the second set of bits indicates a transform coefficient having the respective index value and the quantity of bits in the second set of bits is equal to the bit-width indicated by the bit-width parameter for the respective index value, and parsing a third set of bits from the error-corrected encoded video data, wherein the third set of bits indicates a transform coefficient having the respective index value and a quantity of bits in the third set of bits is equal to the bit-width indicated by the bit-width parameter for the respective index value.

Clause 10A. The method of any of clauses 1A-9A, wherein the method further comprises prior to generating the error-corrected encoded video data, performing the bit depuncturing operation on the error correction data.

Clause 11A. The method of any of clauses 1A-10A, wherein the parameters include one or more of: a color space, a transform size, quantization parameters, a number of transform coefficients in the first encoded video data, or a number of bits per transform coefficient in the first encoded video data.

Clause 12A. The method of any of clauses 1A-11A, wherein: a decimation pattern defines a pattern of anchor transform blocks and non-anchor transform blocks in the picture, the method further comprises receiving, at the receiving device, systemic bits of the anchor transform blocks and not systemic bits of the non-anchor transform blocks, the systemic bits of the anchor transform blocks represent transform coefficients in the anchor transform blocks, the systemic bits of the non-anchor transform blocks represent reduced bit depth versions of original transform coefficients in the non-anchor transform blocks; the error correction data includes error correction data for the anchor transform blocks and error correction data for the non-anchor transform blocks, wherein the error correction data for the non-anchor transform blocks are based on the original transform coefficients in the non-anchor transform blocks, generating the error-corrected encoded video data comprises: using the error correction data for the anchor transform blocks to perform error correction on the systemic bits of the anchor transform blocks; and using the error correction data for the non-anchor transform blocks to perform error correction on portions of the encoded video data corresponding to the non-anchor transform blocks.

Clause 13A. The method of clause 12A, further comprising: determining, at the receiving device, the decimation pattern; and sending, at the receiving device, the decimation pattern to the transmitting device.

Clause 14A. The method of any of clauses 1A-13A, wherein: a decimation pattern defines a pattern of anchor transform blocks and non-anchor transform blocks in the picture, transform coefficients in the non-anchor transform blocks have reduced bit depths relative to the anchor transform blocks, receiving, at the receiving device, systemic bits of the anchor transform blocks, systemic bits of the non-anchor transform blocks, and a correlation matrix, the systemic bits of the anchor transform blocks represent transform coefficients in the anchor transform blocks, the systemic bits of the non-anchor transform blocks represent reduced bit depth versions of original transform coefficients in the non-anchor transform blocks; performing the reconstruction operation comprises, for each non-anchor transform coefficient in the non-anchor transform blocks: calculating, at the receiving device, an interpolated value of the non-anchor transform coefficient based on the correlation matrix and a corresponding anchor transform coefficient; and calculating, at the receiving device, a reconstructed value of the non-anchor transform coefficient based on the interpolated value of the non-anchor transform coefficient and a value of the non-anchor transform coefficient in the error-corrected encoded video data.

Clause 15A. A method of encoding video data, the method comprising: obtaining, at a transmitting device, video data from a video source; generating, at the transmitting device, based on a set of parameters, encoded video data of a first picture of the video data and encoded video data of a second picture of the video data; performing, at the transmitting device, channel encoding on the encoded video data of the first picture and the encoded video data of the second picture to generate error correction data for the first picture and error correction data for the second picture; and transmitting, at the transmitting device, the encoded video data of the first picture, error correction data for the first picture, and error correction data for the second picture.

Clause 16A. The method of clause 15A, further comprising transmitting, at the transmitting device and to a receiving device, values of the parameters.

Clause 17A. The method of clause 16A, wherein: the parameters include one or more quantization parameters, and generating the encoded video data comprises using the quantization parameters to quantize transform coefficients of the first picture and transform coefficients of the second picture.

Clause 18A. The method of any of clauses 16A-17A, wherein: the parameters include a transform size parameter, and generating the encoded video data comprises applying a forward transform to blocks of residual data of the first picture and block of residual data of the second picture, wherein the forward transform has a transform size indicated by the transform size parameter.

Clause 19A. The method of any of clauses 16A-18A, wherein: the parameters include a parameter that indicates a quantity of transform coefficients, and generating the encoded video data of the first picture and the encoded video data of the second picture comprises including in the encoded video data of the first picture and the encoded video data of the second picture comprises, sets of transform coefficients that includes the indicated quantity of transform coefficients.

Clause 20A. The method of any of clauses 16A-10A, wherein the parameters include one or more of: a color space, a transform size, quantization parameters, a number of transform coefficients in the encoded video data, or a number of bits per transform coefficient in the encoded video data.

Clause 21A. A method of encoding video data, the method comprising: obtaining, at a transmitting device, video data from a video source; generating, at the transmitting device, transform blocks based on the video data; determining, at the transmitting device, which of the transform blocks are anchor transform blocks; calculating, at the transmitting device, a correlation matrix for a transform block set; generating, at the transmitting device, bit-reduced non-anchor transform matrixes; and transmitting, at the transmitting device, the anchor transform blocks, the non-anchor transform blocks, and the correlation matrix to a receiving device.

Clause 22A. The method of clause 21A, further comprising receiving, at the transmitting device, an indication of a decimation pattern from the receiving device.

Clause 23A. A device comprising: a memory configured to store video data; a communication interface; and one or more processing implemented in circuitry and coupled to the memory, the one or more processors configured to perform the methods of any of clauses 1A-22A.

Clause 24A. A device comprising means for performing the methods of any of clauses 1A-22A.

Clause 25A. A computer-readable data storage medium having instructions stored thereon that, when executed, cause a device to perform the methods of any of clauses 1A-22A.

Clause 1B. A device for processing video data, the device comprising: a memory configured to store video data; and a communication interface configured to obtain error correction data from a transmitting device, wherein the error correction data provides error correction information regarding a picture of the video data; one or more processing implemented in circuitry and coupled to the memory, the one or more processors configured to: generate prediction data for the picture, wherein the prediction data for the picture comprises predictions of blocks of the picture based at least in part on one or more previously reconstructed pictures of the video data; generate encoded video data based on the prediction data for the picture, wherein the encoded video data includes transform blocks that comprises transform coefficients; scale bits of the transform coefficients of the transform blocks based on reliability values for bit positions; generate error-corrected encoded video data using the error correction data to perform an error correction operation on the scaled bits of the transform coefficients of the transform blocks; and reconstruct the picture based on the error-corrected encoded video data.

Clause 2B. The device of clause 1B, wherein the one or more processors are further configured to generate the reliability values at the receiving device.

Clause 3B. The device of clause 2B, wherein the one or more processors are configured to generate the reliability values based on statistics regarding occurrence of errors in the bit positions.

Clause 4B. The device of any of clauses 2B or 3B, wherein the one or more processors are configured to generate the reliability values based on reliability characteristics for individual regions of pictures of the video data.

Clause 5B. The device of any of clauses 2B-4B, wherein the one or more processors are configured to generate the reliability values based on a noise model.

Clause 6B. The device of any of clauses 1B-5B, wherein the communication interface is further configured to send the reliability values to the transmitting device.

Clause 7B. The device of any of clause 1B-5B, wherein the communication interface is further configured to receive the reliability values from the transmitting device.

Clause 8B. A device for processing video data, the method comprising: a memory configured to store video data; and one or more processing implemented in circuitry and coupled to the memory, the one or more processors configured to: obtain video data; obtain prediction quality feedback, wherein the prediction quality feedback is based on reliability of estimated pictures generated by a receiving device; adapt one or more of video encoding parameters or channel encoding parameters based on the prediction quality feedback; perform a video encoding process to generate encoded video data based on one or more pictures of the obtained video data, wherein the video encoding process is controlled by the video encoding parameters; perform a channel encoding process on the encoded video data to generate channel encoded data, wherein the channel encoding process is controlled by the channel encoding parameters; and a communication interface configured to transmit the channel encoded data to the receiving device.

Clause 9B. The device of clause 8B, wherein: the video encoding parameters include a quantization parameter, the one or more processors are configured to, as part of adapting the video encoding parameters, adapt the quantization parameter, and the one or more processors are configured to, as part of performing the video encoding process, use the quantization parameter to quantize transform coefficients of transform blocks of the one or more pictures.

Clause 10B. The device of any of clauses 8B-9B, wherein: the channel encoding parameters include a low density parity check (LDPC) graph, the one or more processors are configured to, as part of adapting the channel encoding parameters, adapt the LPDC graph, and the one or more processors are configured to, as part of performing the channel encoding process, use the LDPC graph to generate codewords included in the channel encoded data.

Clause 11B. The device of any of clauses 8B-10B, wherein: the channel encoded data includes error correction data, one or more processors are further configured to adapt one or more bit puncturing parameters based on the prediction quality feedback, and the one or more processors are configured to perform a bit puncturing process on the error correction data, wherein the bit puncturing process is controlled by the one or more bit puncturing parameters.

Clause 11B. A method of processing video data, the method comprising: obtaining error correction data at a receiving device and from a transmitting device, wherein the error correction data provides error correction information regarding a picture of the video data; generating, at the receiving device, prediction data for the picture, wherein the prediction data for the picture comprises predictions of blocks of the picture based at least in part on one or more previously reconstructed pictures of the video data; generating, at the receiving device, encoded video data based on the prediction data for the picture, wherein the encoded video data includes transform blocks that comprises transform coefficients; scaling, at the receiving device, bits of the transform coefficients of the transform blocks based on reliability values for bit positions; generating, at the receiving device, error-corrected encoded video data using the error correction data to perform an error correction operation on the scaled bits of the transform coefficients of the transform blocks; and reconstructing, at the receiving device, the picture based on the error-corrected encoded video data.

Clause 12B. The method of clause 11B, further comprising generating the reliability values at the receiving device.

Clause 13B. The method of clause 12B, wherein generating the reliability values comprises generating, at the receiving device, the reliability values based on statistics regarding occurrence of errors in the bit positions.

Clause 14B. The method of any of clauses 12B or 13B, wherein generating the reliability values comprises generating, at the receiving device, the reliability values based on reliability characteristics for individual regions of pictures of the video data.

Clause 15B. The method of any of clauses 12B-14B, wherein generating the reliability values comprises generating, at the receiving device, the reliability values based on a noise model.

Clause 16B. The method of any of clauses 11B-15B, further comprising sending, at the receiving device, the reliability values to the transmitting device.

Clause 17B. The method of any of clause 11B-15B, further comprising receiving, at the receiving device, the reliability values from the transmitting device.

Clause 18B. A method of processing video data, the method comprising: obtaining video data; obtaining prediction quality feedback, wherein the prediction quality feedback is based on reliability of estimated pictures generated by a receiving device; adapting one or more of video encoding parameters or channel encoding parameters based on the prediction quality feedback; performing a video encoding process to generate encoded video data based on one or more pictures of the obtained video data, wherein the video encoding process is controlled by the video encoding parameters; performing a channel encoding process on the encoded video data to generate channel encoded data, wherein the channel encoding process is controlled by the channel encoding parameters; and transmitting the channel encoded data to the receiving device.

Clause 19B. The method of clause 18B, wherein: the video encoding parameters include a quantization parameter, adapting the video encoding parameters comprises adapting the quantization parameter, and performing the video encoding process comprises using the quantization parameter to quantize transform coefficients of transform blocks of the one or more pictures.

Clause 20B. The method of any of clauses 18B-19B, wherein: the channel encoding parameters include a low density parity check (LDPC) graph, adapting the channel encoding parameters comprises adapting the LPDC graph, and performing the channel encoding process comprises using the LDPC graph to generate codewords included in the channel encoded data.

Clause 21B. The method of any of clauses 18B-20B, wherein: the channel encoded data includes error correction data, and the method further comprises: adapting one or more bit puncturing parameters based on the prediction quality feedback, and performing a bit puncturing process on the error correction data, wherein the bit puncturing process is controlled by the one or more bit puncturing parameters.

Clause 22B. A device comprising means for performing the methods of any of clauses 11B-21B.

Clause 23B. A computer-readable data storage medium having instructions stored thereon that, when executed, cause a device to perform the methods of any of clauses 11B-21B.

Clause 1C. A device comprising: a memory configured to store video data; and one or more processors implemented in circuitry and coupled to the memory, the one or more processors configured to: obtain a first set of multiview pictures of the video data, wherein the first set of multiview pictures includes first pictures and second pictures, the first pictures being from a first viewpoint and the second pictures being from a second viewpoint; transmit first encoded video data to a receiving device, wherein the first encoded video data is based on the first set of multiview pictures; receive multiview encoding cues from the receiving device; obtain a second set of multiview pictures of the video data, wherein the second set of multiview pictures includes third pictures and fourth pictures, the third pictures being from the first viewpoint and the fourth pictures being from the second viewpoint; perform, based on the multiview encoding cues received from the receiving device, a multiview encoding process on the second set of multiview pictures to generate second encoded video data, wherein the multiview encoding process reduces inter-view redundancy between the third pictures and the fourth pictures; and transmit the second encoded video data to the receiving device.

Clause 2C. The device of clause 1, wherein the one or more processors are further configured to: after transmitting the second encoded video data to the receiving device, receive updated multiview encoding cues from the receiving device; obtain a third set of multiview pictures of the video data, wherein the third set of multiview pictures includes fifth pictures and sixth pictures, the fifth pictures being from the first viewpoint and the sixth pictures being from the second viewpoint; encode the third set of multiview pictures based on the updated multiview encoding cues received from the receiving device to generate third encoded video data; and transmit the third encoded video data to the receiving device.

Clause 3C. The device of any of clauses 1C-2C, wherein the multiview encoding cues include one or more of: a relative shift between blocks of the first pictures and the second pictures, a brightness correction between the first pictures and the second pictures, an inter block shift between an anchor block and a reconstructed block, or motion data for reference shift.

Clause 4C. The device of any of clauses 1C-3C, wherein: the device is an extended reality (XR) headset, the one or more processors are configured to: receive virtual element data from the receiving device generated based on the first and second sets of multiview pictures; and output the virtual element data for display in a XR scene.

Clause 5C. A device comprising: a memory configured to store video data; and one or more processors implemented in circuitry and coupled to the memory, the one or more processors configured to: obtain first encoded video data from a transmitting device, wherein the first encoded video data is based on a first set of multiview pictures of the video data, the first set of multiview pictures includes first pictures and second pictures, the first pictures being from a first viewpoint and the second pictures being from a second viewpoint; determine multiview encoding cues based on the first encoded video data; transmit the multiview encoding cues to the transmitting device; and obtain second encoded video data from the transmitting device, wherein the second encoded video data is based on a second set of multiview pictures that includes third pictures and fourth pictures, the second encoded video data being encoded using a multiview encoding process that reduces inter-view redundancy between the third pictures and the fourth pictures based on the multiview encoding cues.

Clause 6C. The device of clause 5C, wherein the one or more processors are further configured to decode the second encoded video data.

Clause 7C. The device of any of clauses 5C-6C, wherein the multiview encoding cues are first multiview encoding cues and the one or more processors are further configured to: determine second multiview encoding cues based on the second encoded video data; transmit the second multiview encoding cues to the transmitting device; obtain third encoded video data from the transmitting device, wherein the third encoded video data is based on a third set of multiview pictures that includes fifth pictures and sixth pictures, the third encoded video data being encoded using the multiview encoding process that reduces inter-view redundancy between the fifth pictures and the sixth pictures based on the second multiview encoding cues.

Clause 8C. The device of any of clauses 5C-7C, wherein: the multiview encoding cues include a depth map indicating depths of objects represented in the first and second pictures, and the one or more processors are configured to, as part of determining the multiview encoding cues, determine the depth map based on the first and second pictures.

Clause 9C. The device of clauses 5C-8C, wherein the multiview encoding cues includes one or more illumination compensation factors, and the one or more processors are configured to, as part of determining the multiview encoding cues, determine the illumination compensation factors based on the first and second pictures.

Clause 10C. The device of any of clauses 5C-9C, wherein: the transmitting device is an extended reality (XR) headset, and the one or more processors are further configured to: process the second set of pictures to generate virtual element data; and transmit the virtual element data to the XR headset.

Clause 11C. A method of processing video data, the method comprising: obtaining a first set of multiview pictures of the video data, wherein the first set of multiview pictures includes first pictures and second pictures, the first pictures being from a first viewpoint and the second pictures being from a second viewpoint; transmitting first encoded video data to a receiving device, wherein the first encoded video data is based on the first set of multiview pictures; receiving multiview encoding cues from the receiving device; obtaining a second set of multiview pictures of the video data, wherein the second set of multiview pictures includes third pictures and fourth pictures, the third pictures being from the first viewpoint and the fourth pictures being from the second viewpoint; performing, based on the multiview encoding cues received from the receiving device, a multiview encoding process on the second set of multiview pictures to generate second encoded video data, wherein the multiview encoding process reduces inter-view redundancy between the third pictures and the fourth pictures; and transmitting the second encoded video data to the receiving device.

Clause 12C. The method of clause 11C, further comprising: after transmitting the second encoded video data to the receiving device, receiving updated multiview encoding cues from the receiving device; obtaining a third set of multiview pictures of the video data, wherein the third set of multiview pictures includes fifth pictures and sixth pictures, the fifth pictures being from the first viewpoint and the sixth pictures being from the second viewpoint; encoding the third set of multiview pictures based on the updated multiview encoding cues received from the receiving device to generate third encoded video data; and transmitting the third encoded video data to the receiving device.

Clause 13C. The method of any of clauses 11C-12C, wherein the multiview encoding cues include one or more of: a relative shift between blocks of the first pictures and the second pictures, a brightness correction between the first pictures and the second pictures, an inter block shift between an anchor block and a reconstructed block, or motion data for reference shift.

Clause 14C. The method of any of clauses 11C-13C, wherein the method further comprises: receiving virtual element data from the receiving device generated based on the first and second sets of multiview pictures; and outputting the virtual element data for display in an extended reality (XR) scene.

Clause 15C. A method of processing video data, the method comprising: obtaining first encoded video data from a transmitting device, wherein the first encoded video data is based on a first set of multiview pictures of the video data, the first set of multiview pictures includes first pictures and second pictures, the first pictures being from a first viewpoint and the second pictures being from a second viewpoint; determining multiview encoding cues based on the first encoded video data; transmitting the multiview encoding cues to the transmitting device; obtaining second encoded video data from the transmitting device, wherein the second encoded video data is based on a second set of multiview pictures that includes third pictures and fourth pictures, the second encoded video data being encoded using a multiview encoding process that reduces inter-view redundancy between the third pictures and the fourth pictures based on the multiview encoding cues.

Clause 16C. The method of clause 15C, further comprising decoding the second encoded video data.

Clause 17C. The method of any of clauses 15C-16C, wherein the multiview encoding cues are first multiview encoding cues and the method further comprises: determining second multiview encoding cues based on the second encoded video data; transmitting the second multiview encoding cues to the transmitting device; obtaining third encoded video data from the transmitting device, wherein the third encoded video data is based on a third set of multiview pictures that includes fifth pictures and sixth pictures, the third encoded video data being encoded using the multiview encoding process that reduces inter-view redundancy between the fifth pictures and the sixth pictures based on the second multiview encoding cues.

Clause 18C. The method of any of clauses 15C-17C, wherein: the multiview encoding cues include a depth map indicating depths of objects represented in the first and second pictures, and determining the multiview encoding cues comprises determining the depth map based on the first and second pictures.

Clause 19C. The method of clauses 15C-18C, wherein the multiview encoding cues includes one or more illumination compensation factors, and determining the multiview encoding cues comprises determining the illumination compensation factors based on the first and second pictures.

Clause 20C. The method of any of clauses 15C-19C, wherein: the transmitting device is an extended reality (XR) headset, and the method further comprises: processing the second set of pictures to generate virtual element data; and transmitting the virtual element data to the XR headset.

Clause 21C. A device comprising: means for obtaining a first set of multiview pictures of video data, wherein the first set of multiview pictures includes first pictures and second pictures, the first pictures being from a first viewpoint and the second pictures being from a second viewpoint; means for transmitting first encoded video data to a receiving device, wherein the first encoded video data is based on the first set of multiview pictures; means for receiving multiview encoding cues from the receiving device; means for obtaining a second set of multiview pictures of the video data, wherein the second set of multiview pictures includes third pictures and fourth pictures, the third pictures being from the first viewpoint and the fourth pictures being from the second viewpoint; means for performing, based on the multiview encoding cues received from the receiving device, a multiview encoding process on the second set of multiview pictures to generate second encoded video data, wherein the multiview encoding process reduces inter-view redundancy between the third pictures and the fourth pictures; and means for transmitting the second encoded video data to the receiving device.

Clause 22C. A device comprising: means for obtaining first encoded video data from a transmitting device, wherein the first encoded video data is based on a first set of multiview pictures of the video data, the first set of multiview pictures includes first pictures and second pictures, the first pictures being from a first viewpoint and the second pictures being from a second viewpoint; means for determining multiview encoding cues based on the first encoded video data; means for transmitting the multiview encoding cues to the transmitting device; means for obtaining second encoded video data from the transmitting device, wherein the second encoded video data is based on a second set of multiview pictures that includes third pictures and fourth pictures, the second encoded video data being encoded using a multiview encoding process that reduces inter-view redundancy between the third pictures and the fourth pictures based on the multiview encoding cues.

Clause 1D. A device comprising: a memory configured to store video data; and one or more processors implemented in circuitry and coupled to the memory, the one or more processors configured to: encode a first set of pictures of the video data to generate first encoded video data; transmit the first encoded video data to a receiving device; receive, from the receiving device, a decimation pattern indication that indicates a decimation pattern determined based on the first set of pictures, the decimation pattern being a pattern of encoded video data non-transmission; encode a second set of pictures of the video data to generate second encoded video data; apply the decimation pattern to the second encoded video data to generate decimated video data; and transmit the decimated video data to the receiving device.

Clause 2D. The device of clause 1D, wherein the one or more processors are configured to: generate first error correction data based on the first encoded video data; transmit the first error correction data to the receiving device; generate second error correction data based on the second encoded video data; and transmit the second error correction data to the receiving device.

Clause 3D. The device of any of clauses 1D-2D, wherein the decimation pattern indicates a pattern of skipping transmission of encoded video data of full pictures.

Clause 4D. The device of any of clauses 1D-3D, wherein the decimation pattern indicates a pattern of skipping transmission of encoded video data of specific regions within pictures.

Clause 5D. The device of any of clauses 1D-4D, wherein the video data is multiview video data and the decimation pattern indicates a pattern of skipping transmission of encoded video data of pictures from specific views.

Clause 6D. The device of any of clauses 1D-5D, wherein: the decimation pattern indication is a first decimation pattern indication, the pattern of encoded video data non-transmission is a first pattern of encoded video data non-transmission, the decimated video data is first decimated video data, and the one or more processors are further configured to: encode a third set of pictures of the video data to generate third encoded video data; determine a second decimation pattern indicating a second pattern of encoded video data non-transmission; apply the second decimation pattern to the third encoded video data to generate second decimated video data; transmit the second decimated video data to the receiving device; and transmit a second decimation pattern indication to the receiving device, the second decimation pattern indication indicating that the second decimation pattern was applied to the third encoded video data.

Clause 7D. The device of any of clauses 1D-6D, wherein: the one or more processors are configured to, as part of encoding the first set of pictures: generate first prediction data for the first set of pictures; generate residual data based on the first prediction data and the first set of pictures; apply transform the first prediction data to generate transform blocks; quantize transform coefficients of the transform blocks; apply entropy encoding to syntax elements representing the quantized transform coefficients to generate first entropy encoded syntax elements, wherein the first encoded video data includes the first entropy encoded syntax elements; the one or more processors are further configured to perform analog modulation on the residual data to generate first analog modulated residual data, and the device further comprises a communication interface configured to transmit the first analog modulated residual data, and the first encoded video data.

Clause 8D. The device of any of clauses 1D-7D, wherein: the device is an extended reality (XR) headset and comprises a display system, and the one or more processors are further configured to: receive virtual element data from the receiving device; and the display system is configured to display one or more virtual elements in an XR scene based on the virtual element data.

Clause 9D. A device comprising: a memory configured to store video data; and one or more processors implemented in circuitry and coupled to the memory, the one or more processors configured to: receive, from a transmitting device, first encoded video data; perform a decoding process to reconstruct a first set of pictures based on the first encoded video data; determine, based on the first set of pictures, a decimation pattern that indicates a pattern of encoded video data non-transmission; transmit, to the transmitting device, a decimation pattern indication that indicates the determined decimation pattern; receive, from the transmitting device, decimated video data, wherein the decimated video data comprises second encoded video data to which the decimation pattern has been applied, wherein the second encoded video data is generated based on a second set of pictures of the video data; and perform the decoding process to reconstruct the second set of pictures based on the second encoded video data.

Clause 10D. The device of clause 9D, wherein the one or more processors are further configured to: receive, from a transmitting device, first error correction data; apply an error correction process to modify the first encoded video data based on the first error correction data to generate first error-corrected encoded video data; wherein the one or more processors are configured to perform the decoding process to reconstruct the first set of pictures based on the first error-corrected encoded video data; wherein the one or more processors are further configured to: receive, from the transmitting device, second error correction data; apply the error correction process to generate second error-corrected encoded video data based on the second encoded video data and the second error correction data; and wherein the one or more processors are configured to perform the decoding process to reconstruct the second set of pictures based on the second error-corrected encoded video data.

Clause 11D. The device of any of clauses 9D-10D, wherein the decimation pattern indicates a pattern of skipping transmission of encoded video data of full pictures.

Clause 12D. The device of any of clauses 9D-11D, wherein the one or more processors are configured to, as part of determining the decimation pattern: apply the decimation pattern to the first encoded video data to generate decimated encoded video data; apply an error correction process to modify the decimated encoded video data based on the first error correction data to generate trial error-corrected video data; apply the decoding process to reconstruct the first set of pictures based on the trial error-corrected video data; determine whether the decimation pattern satisfies a criterion based on a comparison of the first set of pictures as reconstructed based on the trial error-corrected video data and the first set of pictures as reconstructed based on the first video data.

Clause 13D. The device of any of clauses 9D-12D, wherein the decimation pattern indicates a pattern of skipping transmission of encoded video data of specified regions within pictures.

Clause 14D. The device of any of clauses 9D-13D, wherein the video data is multiview video data and the decimation pattern indicates a pattern of skipping transmission of encoded video data of pictures from specified views.

Clause 15D. The device of any of clauses 9D-14D, wherein: the decimation pattern indication is a first decimation pattern indication, the pattern of encoded video data non-transmission is a first pattern of encoded video data non-transmission, the decimated video data is first decimated video data, and the one or more processors are further configured to: receive a second decimation pattern indication indicating a second pattern of encoded video data non-transmission; receive, from the transmitting device, second decimated video data, wherein the second decimated video data comprises third encoded video data to which the second decimation pattern has been applied, wherein the third encoded video data is generated based on a third set of pictures of the video data; and apply the decoding process to reconstruct the third set of pictures based on the third encoded video data.

Clause 16D. The device of any of clauses 9D-15D, wherein: the device further comprises a communication interface configured to receive analog modulated residual data, the second encoded video data includes entropy-encoded syntax elements representing quantized transform coefficients; the one or more processors are configured to, as part of applying the decoding process to reconstruct the second set of pictures: apply entropy decoding to the syntax elements to obtain the quantized transform coefficients; inverse quantize the quantized transform coefficients to generate inverse quantized transform coefficients; apply an inverse transform to the inverse quantized transform coefficients to generate prediction data; demodulate the analog modulated residual data to obtain residual data; and reconstruct the second set of pictures based on the prediction data and the residual data.

Clause 17D. The device of any of clauses 9D-16D, wherein: the one or more processors are further configured to process the second set of pictures to generate virtual element data, and the transmitting device is an extended reality (XR) headset configured to display one or more virtual elements in a XR scene based on the virtual element data.

Clause 18D. A method comprising: encoding a first set of pictures of video data to generate first encoded video data; transmitting the first encoded video data to a receiving device; receiving, from the receiving device, a decimation pattern indication that indicates a decimation pattern determined based on the first set of pictures, the decimation pattern being a pattern of encoded video data non-transmission; encoding a second set of pictures of the video data to generate second encoded video data; applying the decimation pattern to the second encoded video data to generate decimated video data; and transmitting the decimated video data to the receiving device.

Clause 19D. The method of clause 18D, further comprising: generating first error correction data based on the first encoded video data; transmitting the first error correction data to the receiving device; generating second error correction data based on the second encoded video data; and transmitting the second error correction data to the receiving device.

Clause 20D. The method of any of clauses 18D-19D, wherein the decimation pattern indicates a pattern of skipping transmission of encoded video data of full pictures.

Clause 21D. The method of any of clauses 18D-20D, wherein the decimation pattern indicates a pattern of skipping transmission of encoded video data of specific regions within pictures.

Clause 22D. The method of any of clauses 18D-21D, wherein the video data is multiview video data and the decimation pattern indicates a pattern of skipping transmission of encoded video data of pictures from specific views.

Clause 23D. The method of any of clauses 18D-22D, wherein: the decimation pattern indication is a first decimation pattern indication, the pattern of encoded video data non-transmission is a first pattern of encoded video data non-transmission, the decimated video data is first decimated video data, and the method further comprises: encoding a third set of pictures of the video data to generate third encoded video data; determining a second decimation pattern indicating a second pattern of encoded video data non-transmission; applying the second decimation pattern to the third encoded video data to generate second decimated video data; transmitting the second decimated video data to the receiving device; and transmitting a second decimation pattern indication to the receiving device, the second decimation pattern indication indicating that the second decimation pattern was applied to the third encoded video data.

Clause 24D. The method of any of clauses 18D-23D, wherein: encoding the first set of pictures comprises: generating first prediction data for the first set of pictures; generating residual data based on the first prediction data and the first set of pictures; applying transform the first prediction data to generate transform blocks; quantizing transform coefficients of the transform blocks; applying entropy encoding to syntax elements representing the quantized transform coefficients to generate first entropy encoded syntax elements, wherein the first encoded video data includes the first entropy encoded syntax elements; the method further comprises: performing analog modulation on the residual data to generate first analog modulated residual data, and transmitting the first analog modulated residual data and the first encoded video data.

Clause 25D The method of any of clauses 18D-24D, wherein the method further comprises: receiving virtual element data from the receiving device; and displaying one or more virtual elements in an extended reality (XR) scene based on the virtual element data.

Clause 26D. A method comprising: receiving, from a transmitting device, first encoded video data; applying a decoding process to reconstruct a first set of pictures based on the first encoded video data; determining, based on the first set of pictures, a decimation pattern that indicates a pattern of encoded video data non-transmission; transmitting, to the transmitting device, a decimation pattern indication that indicates the determined decimation pattern; receiving, from the transmitting device, decimated video data, wherein the decimated video data comprises second encoded video data to which the decimation pattern has been applied, wherein the second encoded video data is generated based on a second set of pictures of the video data; and performing the decoding process to reconstruct the second set of pictures based on the second encoded video data.

Clause 27D. The method of clause 26D, wherein the method further comprises: receiving, from a transmitting device, first error correction data; applying an error correction process to modify the first encoded video data based on the first error correction data to generate first error-corrected encoded video data; wherein performing the decoding process to reconstruct the first set of pictures comprises performing the decoding process to reconstruct the first set of pictures based on the first error-corrected encoded video data; wherein the method further comprises: receiving, from the transmitting device, second error correction data; applying the error correction process to generate second error-corrected encoded video data based on the second encoded video data and the second error correction data; and wherein performing the decoding process to reconstruct the second set of pictures comprises performing the decoding process to reconstruct the second set of pictures based on the second error-corrected encoded video data.

Clause 28D. The method of any of clauses 26D-27D, wherein the decimation pattern indicates a pattern of skipping transmission of encoded video data of full pictures.

Clause 29D. The method of any of clauses 26D-28D, wherein determining the decimation pattern comprises: applying the decimation pattern to the first encoded video data to generate decimated encoded video data; apply an error correction process to modify the decimated encoded video data based on the first error correction data to generate trial error-corrected video data; applying the decoding process to reconstruct the first set of pictures based on the trial error-corrected video data; determining whether the decimation pattern satisfies a criterion based on a comparison of the first set of pictures as reconstructed based on the trial error-corrected video data and the first set of pictures as reconstructed based on the first video data.

Clause 30D. The method of any of clauses 26D-29D, wherein the decimation pattern indicates a pattern of skipping transmission of encoded video data of specified regions within pictures.

Clause 31D. The method of any of clauses 26D-30D, wherein the video data is multiview video data and the decimation pattern indicates a pattern of skipping transmission of encoded video data of pictures from specified views.

Clause 32D. The method of any of clauses 26D-31D, wherein: the decimation pattern indication is a first decimation pattern indication, the pattern of encoded video data non-transmission is a first pattern of encoded video data non-transmission, the decimated video data is first decimated video data, and the method further comprises: receiving a second decimation pattern indication indicating a second pattern of encoded video data non-transmission; receiving, from the transmitting device, second decimated video data, wherein the second decimated video data comprises third encoded video data to which the second decimation pattern has been applied, wherein the third encoded video data is generated based on a third set of pictures of the video data; and applying the decoding process to reconstruct the third set of pictures based on the third encoded video data.

Clause 33D. The method of any of clauses 26D-32D, wherein: the method further comprises receiving analog modulated residual data, the second encoded video data includes entropy-encoded syntax elements representing quantized transform coefficients; applying the decoding process to reconstruct the second set of pictures comprises: applying entropy decoding to the syntax elements to obtain the quantized transform coefficients; inverse quantizing the quantized transform coefficients to generate inverse quantized transform coefficients; applying an inverse transform to the inverse quantized transform coefficients to generate prediction data; demodulating the analog modulated residual data to obtain residual data; reconstruct the second set of pictures based on the prediction data and the residual data.

Clause 34D. The method of any of clauses 26D-33D, wherein: the method further comprises processing the second set of pictures to generate virtual element data, and the transmitting device is an extended reality (XR) headset configured to display one or more virtual elements in a XR scene based on the virtual element data.

Clause 35D. A device comprising: means for encoding a first set of pictures of video data to generate first encoded video data; means for transmitting the first encoded video data to a receiving device; means for receiving, from the receiving device, a decimation pattern indication that indicates a decimation pattern determined based on the first set of pictures, the decimation pattern being a pattern of encoded video data non-transmission; means for encoding a second set of pictures of the video data to generate second encoded video data; means for applying the decimation pattern to the second encoded video data to generate decimated video data; and means for transmitting the decimated video data to the receiving device.

Clause 36D. A device comprising: means for receiving, from a transmitting device, first encoded video data; means for performing a decoding process to reconstruct a first set of pictures based on the first encoded video data; means for determining, based on the first set of pictures, a decimation pattern that indicates a pattern of encoded video data non-transmission; means for transmitting, to the transmitting device, a decimation pattern indication that indicates the determined decimation pattern; means for receiving, from the transmitting device, decimated video data, wherein the decimated video data comprises second encoded video data to which the decimation pattern has been applied, wherein the second encoded video data is generated based on a second set of pictures of the video data; and means for performing the decoding process to reconstruct the second set of pictures based on the second encoded video data.

Clause 1E. A device comprising: a memory configured to store video data; and one or more processors implemented in circuitry and coupled to the memory, the one or more processors configured to: encode a first picture of the video data to generate first encoded video data; transmit the first encoded video data to a receiving device; receive, from the receiving device, encoding selection data for a second picture of the video data, wherein: the encoding selection data for the second picture indicate encoding selections used to encode an estimate of the second picture, and the second picture follows the first picture in decoding order; encode the second picture based on the encoding selection data for the second picture to generate second encoded video data; and transmit the second encoded video data to the receiving device.

Clause 2E. The device of clause 1E, wherein: the encoding selection data received from the receiving device include motion parameters for blocks of the second picture, the one or more processors are configured to, as part of encoding the second picture, perform motion compensation based on the motion parameters for the blocks of the second picture to generate predictive blocks, and the second encoded video data includes encoded video data based on the predictive blocks.

Clause 3E. The device of any of clauses 1E-2E, wherein: the encoding selection data received from the receiving device include intra prediction parameters for blocks of the second picture, the one or more processors are configured to, as part of encoding the second picture, perform intra prediction based on the intra prediction parameters for the blocks of the second picture to generate predictive blocks, and the second encoded video data includes encoded video data based on the predictive blocks.

Clause 4E. The device of any of clauses 1E-3E, wherein the second encoded video data does not include the encoding selection data.

Clause 5E. The device of any of clauses 1E-4E, wherein the one or more processors are configured to entropy decode the encoding selection data for the second picture prior.

Clause 6E. The device of any of clauses 1E-5E, wherein the one or more processors are further configured to: generate first error correction data based on the first encoded video data; and transmit the first encoded video data and the first error correction data to the receiving device.

Clause 7E. The device of any of clauses 1E-6E, wherein the one or more processors are further configured to: based on determining that encoding selection data for a third picture are not received from the receiving device prior to expiration of a time limit, encode the third picture without use the encoding selection data for the third picture.

Clause 8E. The device of any of clauses 1E-7E, wherein the one or more processors are further configured to: receive encoding selection data for a third picture of the video data, wherein the encoding selection data for the third picture indicates encoding selections used to encode an estimate of the third picture; encode the third picture based on the encoding selection data for the third picture to generate third encoded video data; apply a channel encoding process that generates error correction data for the third encoded video data; and transmit the error correction data for the third encoded video data to the receiving device without transmitting a least a portion of the third encoded video data.

Clause 9E. The device of any of clauses 1E-8E, wherein: the device is an extended reality (XR) headset and comprises a display system, and the one or more processors are further configured to: receive virtual element data from the receiving device; and the display system is configured to display one or more virtual elements in an XR scene based on the virtual element data.

Clause 10E. A device comprising: a memory configured to store video data; and one or more processors implemented in circuitry and coupled to the memory, the one or more processors configured to: receive first encoded video data from a transmitting device; reconstruct a first picture of the video data based on the first encoded video data; estimate a second picture of the video data based on the first picture, the second picture being a picture occurring after the first picture in decoding order; generate encoding selection data for the estimated second picture, wherein the encoding selection data indicate encoding selections used to encode the estimated second picture; transmit, to the transmitting device, the encoding selection data for the second picture; receive second encoded video data from the transmitting device; and reconstruct the second picture based on the second encoded video data.

Clause 11E. The device of clause 10E, wherein: the one or more processors are configured to, as part of encoding the estimated second picture, perform motion compensation based on motion parameters for the blocks of the second picture to generate predictive blocks, and the encoding selection data includes the motion parameters for blocks of the second picture, the second encoded video data includes encoded video data based on the predictive blocks.

Clause 12E. The device of any of clauses 10E-11E, wherein: the one or more processors are configured to, as part of encoding the second picture, perform intra prediction based on the intra prediction parameters for the blocks of the second picture to generate predictive blocks, the encoding selection data includes intra prediction parameters for blocks of the second picture, and the second encoded video data includes encoded video data based on the predictive blocks.

Clause 13E. The device of any of clauses 10E-12E, wherein: the second encoded video data does not include the encoding selection data; and the one or more processors are configured to, as part of applying the decoding process, use the encoding selection data to reconstruct the second picture based on the second encoded video data.

Clause 14E. The device of any of clauses 10E-13E, wherein the one or more processors are configured to entropy encode the encoding selection data for the second picture prior to transmitting the encoding selection data for the second picture.

Clause 15E. The device of any of clauses 10E-14E, wherein: the one or more processors are further configured to: estimate a third picture of the video data based on one or more of the first or second pictures; perform an encoding process that encodes the estimated third picture to generate third encoded video data, wherein third encoding selection data indicates encoding selections used to encode the estimated third picture; transmit the third encoding selection data to transmitting device; receive, from the transmitting device, error correction data for the third picture; apply an error correction process to generate error-corrected encoded video data for the third picture based on the error correction data for the third picture and the third encoded video data; and apply a decoding process that reconstructs the third picture based on the error-corrected encoded video data for the third picture.

Clause 16E. The device of clause 15E, wherein: the error-corrected encoded video data for the third picture does not include the third encoding selection data, and the one or more processors are configured to, as part of applying the decoding process, use the third encoding selection data to reconstruct the third picture based on the error-corrected encoded video data for the third picture.

Clause 17E. The device of any of clauses 10E-16E, wherein the one or more processors are configured to: apply a channel encoding process to the encoding selection data for the second picture to generate error correction data for the encoding selection data for the second picture; and transmit, to the transmitting device, the error correction data for the encoding selection data for the second picture.

Clause 18E. The device of any of clauses 10E-17E, wherein device includes a communication interface configured to modulate the encoding selection data at a lower modulation order as compared to other data transmissions in a data link between the device and the transmitting device.

Clause 19E. The device of any of clauses 10E-18E, wherein: the one or more processors are further configured to process the second set of pictures to generate virtual element data, and the transmitting device is an extended reality (XR) headset configured to display one or more virtual elements in a XR scene based on the virtual element data.

Clause 20E. A method of processing video data, the method comprising: encoding a first picture of the video data to generate first encoded video data; transmitting the first encoded video data to a receiving device; receiving, from the receiving device, encoding selection data for a second picture of the video data, wherein: the encoding selection data for the second picture indicate encoding selections used to encode an estimate of the second picture, and the second picture follows the first picture in decoding order; encoding the second picture based on the encoding selection data for the second picture to generate second encoded video data; and transmitting the second encoded video data to the receiving device.

Clause 21E. The method of clause 20E, wherein: the encoding selection data received from the receiving device include motion parameters for blocks of the second picture, encoding the second picture comprises performing motion compensation based on the motion parameters for the blocks of the second picture to generate predictive blocks, and the second encoded video data includes encoded video data based on the predictive blocks.

Clause 22E. The method of any of clauses 20E-21E, wherein: the encoding selection data received from the receiving device include intra prediction parameters for blocks of the second picture, encoding the second picture comprises performing intra prediction based on the intra prediction parameters for the blocks of the second picture to generate predictive blocks, and the second encoded video data includes encoded video data based on the predictive blocks.

Clause 23E. The method of any of clauses 20E-22E, wherein the second encoded video data does not include the encoding selection data.

Clause 24E. The method of any of clauses 20E-23E, further comprising entropy decoding the encoding selection data for the second picture prior.

Clause 25E. The method of any of clauses 20E-24E, further comprising: generating first error correction data based on the first encoded video data; and transmitting the first encoded video data and the first error correction data to the receiving device.

Clause 26E. The method of any of clauses 20E-25E, further comprising: based on determining that encoding selection data for a third picture are not received from the receiving device prior to expiration of a time limit, encoding the third picture without use the encoding selection data for the third picture.

Clause 27E. The method of any of clauses 20E-26E, further comprising: receiving encoding selection data for a third picture of the video data, wherein the encoding selection data for the third picture indicates encoding selections used to encode an estimate of the third picture; encoding the third picture based on the encoding selection data for the third picture to generate third encoded video data; applying a channel encoding process that generates error correction data for the third encoded video data; and transmitting the error correction data for the third encoded video data to the receiving device without transmitting a least a portion of the third encoded video data.

Clause 28E. The method of any of clauses 20E-27E, wherein: the device is an extended reality (XR) headset and comprises a display system, and the method further comprises: receiving virtual element data from the receiving device; and displaying, on the display system, one or more virtual elements in an XR scene based on the virtual element data.

Clause 29E. A method of processing video data, the method comprising: receiving first encoded video data from a transmitting device; reconstructing a first picture of the video data based on the first encoded video data; estimating a second picture of the video data based on the first picture, the second picture being a picture occurring after the first picture in decoding order; generating encoding selection data for the estimated second picture, wherein the encoding selection data indicate encoding selections used to encode the estimated second picture; transmitting, to the transmitting device, the encoding selection data for the second picture; receiving second encoded video data from the transmitting device; and reconstructing the second picture based on the second encoded video data.

Clause 30E. The method of clause 29E, wherein: encoding the estimated second picture comprises performing motion compensation based on motion parameters for the blocks of the second picture to generate predictive blocks, and the encoding selection data includes the motion parameters for blocks of the second picture, the second encoded video data includes encoded video data based on the predictive blocks.

Clause 31E. The method of any of clauses 29E-30E, wherein: encoding the second picture comprises performing intra prediction based on the intra prediction parameters for the blocks of the second picture to generate predictive blocks, the encoding selection data includes intra prediction parameters for blocks of the second picture, and the second encoded video data includes encoded video data based on the predictive blocks.

Clause 32E. The method of any of clauses 29E-31E, wherein: the second encoded video data does not include the encoding selection data; and applying the decoding process comprises using the encoding selection data to reconstruct the second picture based on the second encoded video data.

Clause 33E. The method of any of clauses 29E-32E, wherein entropy encoding the encoding selection data for the second picture occurs prior to transmitting the encoding selection data for the second picture.

Clause 34E. The method of any of clauses 29E-33E, further comprising: estimating a third picture of the video data based on one or more of the first or second pictures; performing an encoding process that encodes the estimated third picture to generate third encoded video data, wherein third encoding selection data indicates encoding selections used to encode the estimated third picture; transmitting the third encoding selection data to transmitting device; receiving, from the transmitting device, error correction data for the third picture; applying an error correction process to generate error-corrected encoded video data for the third picture based on the error correction data for the third picture and the third encoded video data; and applying a decoding process that reconstructs the third picture based on the error-corrected encoded video data for the third picture.

Clause 35E. The method of any of clauses 34E, wherein: the error-corrected encoded video data for the third picture does not include the third encoding selection data, and applying the decoding process comprises using the third encoding selection data to reconstruct the third picture based on the error-corrected encoded video data for the third picture.

Clause 36E. The method of any of clauses 29E-35E, further comprising: applying a channel encoding process to the encoding selection data for the second picture to generate error correction data for the encoding selection data for the second picture; and transmitting, to the transmitting device, the error correction data for the encoding selection data for the second picture.

Clause 37E. The method of any of clauses 29E-36E, further comprising modulating the encoding selection data at a lower modulation order as compared to other data transmissions in a data link between the device and the transmitting device.

Clause 38E. The method of any of clauses 29E-37E, wherein: further comprising processing the second set of pictures to generate virtual element data, and the transmitting device is an extended reality (XR) headset configured to display one or more virtual elements in a XR scene based on the virtual element data.

Clause 39E. A device comprising: means for encoding a first picture of the video data to generate first encoded video data; means for transmitting the first encoded video data to a receiving device; means for receiving, from the receiving device, encoding selection data for a second picture of the video data, wherein: the encoding selection data for the second picture indicate encoding selections used to encode an estimate of the second picture, and the second picture follows the first picture in decoding order; means for encoding the second picture based on the encoding selection data for the second picture to generate second encoded video data; and means for transmitting the second encoded video data to the receiving device.

Clause 40E. A device comprising: means for receiving first encoded video data from a transmitting device; means for reconstructing a first picture of the video data based on the first encoded video data; means for estimating a second picture of the video data based on the first picture, the second picture being a picture occurring after the first picture in decoding order; means for generating encoding selection data for the second picture, wherein the encoding selection data for the second picture indicate encoding selections used to encode the second picture; means for transmitting, to the transmitting device, the encoding selection data for the second picture; means for receiving second encoded video data from the transmitting device; and means for reconstructing the second picture based on the second encoded video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors (e.g., programmable processors), such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device comprising:
a memory configured to store video data; and
one or more processors implemented in circuitry and coupled to the memory, the one or more processors configured to:
    obtain a first set of multiview pictures of the video data, wherein the first set of multiview pictures includes first pictures and second pictures, the first pictures being from a first viewpoint and the second pictures being from a second viewpoint;
    transmit first encoded video data to a receiving device, wherein the first encoded video data is based on the first set of multiview pictures;
    receive at least one multiview encoding cue from the receiving device, the at least one multiview encoding cue being indicative of a difference between at least one first picture among the first pictures and at least one second picture among the second pictures;
    obtain a second set of multiview pictures of the video data, wherein the second set of multiview pictures includes third pictures and fourth pictures, the third pictures being from the first viewpoint and the fourth pictures being from the second viewpoint;
    perform, based on the at least one multiview encoding cue received from the receiving device, a multiview encoding process on the second set of multiview pictures to generate second encoded video data, wherein the multiview encoding process reduces inter-view redundancy between the third pictures and the fourth pictures; and
    transmit the second encoded video data to the receiving device.

2. The device of claim 1, wherein the one or more processors are further configured to,
    after transmitting the second encoded video data to the receiving device, receive at least one updated multiview encoding cue from the receiving device;
obtain a third set of multiview pictures of the video data, wherein the third set of multiview pictures includes fifth pictures and sixth pictures, the fifth pictures being from the first viewpoint and the sixth pictures being from the second viewpoint;

encode the third set of multiview pictures based on the at least one updated multiview encoding cue received from the receiving device to generate third encoded video data; and
transmit the third encoded video data to the receiving device.

3. The device of claim 1, wherein the at least one multiview encoding cue include one or more of:
a relative shift between blocks of the at least one first picture and the at least one second picture,
a brightness correction between the at least one first picture and the at least one second picture, or
an inter block shift between an anchor block and a reconstructed block.

4. The device of claim 1, wherein:
the device is an extended reality (XR) headset,
the one or more processors are configured to:
    receive virtual element data from the receiving device generated based on the first and second sets of multiview pictures; and
    output the virtual element data for display in a XR scene.

5. A device comprising:
a memory configured to store video data; and
one or more processors implemented in circuitry and coupled to the memory, the one or more processors configured to:
    obtain first encoded video data from a transmitting device, wherein the first encoded video data is based on a first set of multiview pictures of the video data, the first set of multiview pictures includes first pictures and second pictures, the first pictures being from a first viewpoint and the second pictures being from a second viewpoint;
    determine at least one multiview encoding cue based on the first encoded video data, the at least one multiview encoding cue being indicative of a difference between at least one first picture among the first pictures and at least one second picture among the second pictures;
    transmit the at least one multiview encoding cue to the transmitting device; and
    obtain second encoded video data from the transmitting device, wherein the second encoded video data is based on a second set of multiview pictures that includes third pictures and fourth pictures, the second encoded video data being encoded using a multiview encoding process that reduces inter-view redundancy between the third pictures and the fourth pictures based on the at least one multiview encoding cue.

6. The device of claim 5, wherein the one or more processors are further configured to decode the second encoded video data.

7. The device of claim 5, wherein the at least one multiview encoding cue is a first multiview encoding cue and the one or more processors are further configured to:
determine at least one second multiview encoding cue based on the second encoded video data;
transmit the at least one second multiview encoding cue to the transmitting device; and
obtain third encoded video data from the transmitting device, wherein the third encoded video data is based on a third set of multiview pictures that includes fifth pictures and sixth pictures, the third encoded video data being encoded using the multiview encoding process that reduces inter-view redundancy between the fifth pictures and the sixth pictures based on the at least one second multiview encoding cue.

8. The device of claim 5, wherein:
the at least one multiview encoding cue include a depth map indicating at least one depth of at least one object represented in the first and second pictures, and the one or more processors are configured to, as part of determining the at least one multiview encoding cue, determine the depth map based on the first and second pictures.

9. The device of claim 5, wherein the at least one multiview encoding includes one or more illumination compensation factors, and
the one or more processors are configured to, as part of determining the at least one multiview encoding cue, determine the one or more illumination compensation factors based on the first and second pictures.

10. The device of claim 5, wherein:
the transmitting device is an extended reality (XR) headset, and
the one or more processors are further configured to:
process the second set of pictures to generate virtual element data; and
transmit the virtual element data to the XR headset.

11. A method of processing video data, the method comprising:
obtaining a first set of multiview pictures of the video data, wherein the first set of multiview pictures includes first pictures and second pictures, the first pictures being from a first viewpoint and the second pictures being from a second viewpoint;
transmitting first encoded video data to a receiving device, wherein the first encoded video data is based on the first set of multiview pictures;
receiving at least one multiview encoding cue from the receiving device, the at least one multiview encoding cue being indicative of a difference between at least one first picture among the first pictures and at least one second picture among the second pictures;
obtaining a second set of multiview pictures of the video data, wherein the second set of multiview pictures includes third pictures and fourth pictures, the third pictures being from the first viewpoint and the fourth pictures being from the second viewpoint;
performing, based on the at least one multiview encoding cue received from the receiving device, a multiview encoding process on the second set of multiview pictures to generate second encoded video data, wherein the multiview encoding process reduces inter-view redundancy between the third pictures and the fourth pictures; and
transmitting the second encoded video data to the receiving device.

12. The method of claim 11, further comprising:
after transmitting the second encoded video data to the receiving device, receiving at least one updated multiview encoding cue from the receiving device;
obtaining a third set of multiview pictures of the video data, wherein the third set of multiview pictures includes fifth pictures and sixth pictures, the fifth pictures being from the first viewpoint and the sixth pictures being from the second viewpoint;
encoding the third set of multiview pictures based on the at least one updated multiview encoding cue received from the receiving device to generate third encoded video data; and transmitting the third encoded video data to the receiving device.

13. The method of claim 11, wherein the at least one multiview encoding cue include one or more of:
a relative shift between blocks of the at least one first picture and the at least one second picture,
a brightness correction between the at least one first picture and the at least one second picture, or
an inter block shift between an anchor block and a reconstructed block.

14. The method of claim 11, wherein the method further comprises:
receiving virtual element data from the receiving device generated based on the first and second sets of multiview pictures; and
outputting the virtual element data for display in an extended reality (XR) scene.

15. A method of processing video data, the method comprising:
obtaining first encoded video data from a transmitting device, wherein the first encoded video data is based on a first set of multiview pictures of the video data, the first set of multiview pictures includes first pictures and second pictures, the first pictures being from a first viewpoint and the second pictures being from a second viewpoint;
determining at least one multiview encoding cue based on the first encoded video data, the at least one multiview encoding cue being indicative of a difference between at least one first picture among the first pictures and at least one second picture among the second pictures;
transmitting the at least one multiview encoding cue to the transmitting device; and
obtaining second encoded video data from the transmitting device, wherein the second encoded video data is based on a second set of multiview pictures that includes third pictures and fourth pictures, the second encoded video data being encoded using a multiview encoding process that reduces inter-view redundancy between the third pictures and the fourth pictures based on the at least one multiview encoding cue.

16. The method of claim 15, further comprising decoding the second encoded video data.

17. The method of claim 15, wherein the at least one multiview encoding cue is a first multiview encoding cue and the method further comprises:
determining at least one second multiview encoding cue based on the second encoded video data;
transmitting the at least one second multiview encoding cue to the transmitting device; and
obtaining third encoded video data from the transmitting device, wherein the third encoded video data is based on a third set of multiview pictures that includes fifth pictures and sixth pictures, the third encoded video data being encoded using the multiview encoding process that reduces inter-view redundancy between the fifth pictures and the sixth pictures based on the at least one second multiview encoding cue.

18. The method of claim 15, wherein:
the at least one multiview encoding cue include a depth map indicating at least one depth of at least one object represented in the first and second pictures, and determining the at least one multiview encoding cue comprises determining the depth map based on the first and second pictures.

19. The method of claim 15, wherein the at least one multiview encoding includes one or more illumination compensation factors, and determining the at least one multiview encoding cue comprises determining the illumination compensation factors based on the first and second pictures.

20. The method of claim 15, wherein:

the transmitting device is an extended reality (XR) headset, and the method further comprises:

processing the second set of pictures to generate virtual element data; and transmitting the virtual element data to the XR headset.

* * * * *